US010543577B2

(12) United States Patent
Masad et al.

(10) Patent No.: US 10,543,577 B2
(45) Date of Patent: Jan. 28, 2020

(54) SYSTEMS, METHODS, AND APPARATUS FOR FORMING OPTICAL ARTICLES, AND OPTICAL ARTICLES FORMED BY THE SAME

(71) Applicant: Clear and Dark Ltd., Zichron Yaacov (IL)

(72) Inventors: Amram Masad, Zichron Yaakov (IL); Gil Perlberg, Zichron Yaakov (IL)

(73) Assignee: CLEAR AND DARK LTD. (IL)

( * ) Notice: Subject to any disclaimer, the term of this patent is extended or adjusted under 35 U.S.C. 154(b) by 0 days.

(21) Appl. No.: 16/255,154

(22) Filed: Jan. 23, 2019

(65) Prior Publication Data
US 2019/0224803 A1    Jul. 25, 2019

Related U.S. Application Data

(60) Provisional application No. 62/620,929, filed on Jan. 23, 2018.

(51) Int. Cl.
*B24B 9/14* (2006.01)
*B24B 13/005* (2006.01)
(Continued)

(52) U.S. Cl.
CPC ............ *B24B 13/0052* (2013.01); *B24B 9/14* (2013.01); *B24B 13/005* (2013.01);
(Continued)

(58) Field of Classification Search
CPC .......... B24B 9/14; B24B 9/144; B24B 13/00; B24B 13/0006; B24B 13/0018;
(Continued)

(56) References Cited

U.S. PATENT DOCUMENTS 3,561,269 A    2/1971  Seitz
4,149,868 A    4/1979  Deeg
(Continued)

FOREIGN PATENT DOCUMENTS

CN    101446693 A    6/2009
CN    201359663 Y    12/2009
(Continued)

OTHER PUBLICATIONS

Bannach, Nancy, *Defining Curvilinear Coordinates for Anisotropic Materials*, COMSOL: https://www.comsol.com/blogs/author/nancy-bannach/, Mar. 11, 2014, pp. 1-18.
(Continued)

*Primary Examiner* — Eileen P Morgan
(74) *Attorney, Agent, or Firm* — The Belles Group, P.C.

(57) ABSTRACT

Optical articles and methods of manufacturing the same are disclosed herein. In one aspect, the methods and optical articles formed include light-blocking compositions applied to optical substrates in accordance with the optical properties of the optical substrate. In another aspect, a method is disclosed in which the light-absorbing compositions are printed onto the optical substrate in the shape and size of the final lens that is to be formed from the optical substrate. In another aspect, the methods and optical articles utilize at least two different light-blocking compositions to achieve desired functionality of the optical article.

18 Claims, 35 Drawing Sheets

(51) Int. Cl.
*B29D 11/00* (2006.01)
*G02C 13/00* (2006.01)
*B24B 13/00* (2006.01)

(52) U.S. Cl.
CPC ...... *B24B 13/0018* (2013.01); *B24B 13/0055* (2013.01); *B29D 11/00* (2013.01); *B29D 11/00009* (2013.01); *B29D 11/00932* (2013.01); *G02C 13/005* (2013.01)

(58) Field of Classification Search
CPC .............. B24B 13/005; B24B 13/0052; B24B 13/0055; B29D 11/00; B29D 11/00009; B29D 11/00317; B29D 11/00932
USPC .......................................................... 451/43
See application file for complete search history.

(56) References Cited

U.S. PATENT DOCUMENTS

| | | | |
|---|---|---|---|
| 4,289,497 A | 9/1981 | Hovey | |
| 4,794,435 A | 12/1988 | Suzuki et al. | |
| 4,906,069 A | 3/1990 | Brandstetter et al. | |
| 5,315,410 A | 5/1994 | Takanshi et al. | |
| 5,368,790 A * | 11/1994 | Greshes | B29C 43/021 264/2.4 |
| 5,440,359 A | 8/1995 | Bloch-Malem | |
| 5,441,418 A | 8/1995 | Brown et al. | |
| 5,645,767 A | 7/1997 | Van Gemert | |
| 5,975,696 A | 11/1999 | Kohan | |
| 6,159,296 A | 12/2000 | Aoyama et al. | |
| 6,220,927 B1 * | 4/2001 | Mizuno | B24B 9/14 451/10 |
| 6,290,569 B1 * | 9/2001 | Mizuno | B24B 9/14 451/43 |
| 6,315,410 B1 | 11/2001 | Doshi | |
| 6,500,176 B1 | 12/2002 | Truckai et al. | |
| 6,547,390 B1 | 4/2003 | Bernheim et al. | |
| 6,682,193 B1 * | 1/2004 | Morris | B29C 45/561 351/158 |
| 6,886,937 B2 | 5/2005 | Moravec et al. | |
| 7,077,874 B2 | 7/2006 | Inuzuka | |
| 7,139,636 B2 * | 11/2006 | Foreman | B29D 11/00 700/198 |
| 7,189,456 B2 | 3/2007 | King | |
| 7,288,578 B2 | 10/2007 | Phelan | |
| 7,329,695 B2 | 2/2008 | Tucker et al. | |
| 7,333,268 B2 | 2/2008 | Steenblik et al. | |
| 7,410,691 B2 | 8/2008 | Blackburn et al. | |
| 7,411,008 B2 | 8/2008 | Tucker et al. | |
| 7,452,611 B2 | 11/2008 | Blackburn et al. | |
| 7,808,707 B2 | 10/2010 | Cano et al. | |
| 7,891,809 B2 | 2/2011 | Ballet et al. | |
| 7,938,536 B2 | 5/2011 | Cano et al. | |
| 7,980,920 B2 * | 7/2011 | Akiyama | B24B 9/146 451/10 |
| 8,153,344 B2 | 4/2012 | Faler et al. | |
| 8,172,397 B2 | 5/2012 | Ballet et al. | |
| 8,205,551 B2 | 6/2012 | Begon et al. | |
| 8,289,274 B2 | 10/2012 | Silwa et al. | |
| 8,342,680 B2 | 1/2013 | Watson | |
| 8,409,670 B2 | 4/2013 | Mori et al. | |
| 8,545,015 B2 | 10/2013 | Kumar et al. | |
| 8,651,660 B2 | 2/2014 | Barzak et al. | |
| 8,722,195 B2 | 5/2014 | Labrot et al. | |
| 8,733,373 B2 | 5/2014 | Vacheron et al. | |
| 8,740,996 B2 | 6/2014 | Burguiere et al. | |
| 8,814,352 B2 | 8/2014 | Archambeau et al. | |
| 8,927,618 B2 | 1/2015 | Goto et al. | |
| 8,956,701 B2 | 2/2015 | Lim et al. | |
| 9,025,111 B2 | 5/2015 | Teller et al. | |
| 9,073,348 B2 | 7/2015 | Ookubo et al. | |
| 9,109,131 B2 | 8/2015 | Iftime et al. | |
| 9,307,654 B2 | 4/2016 | Riall et al. | |
| 9,372,353 B2 | 6/2016 | Trapani et al. | |
| 9,678,363 B2 | 6/2017 | Ang et al. | |
| 9,969,135 B2 | 5/2018 | Valeri et al. | |
| 2001/0025604 A1 | 10/2001 | Sakai | |
| 2004/0137155 A1 | 7/2004 | Bernheim et al. | |
| 2005/0285050 A1 | 12/2005 | Bruce | |
| 2007/0262061 A1 * | 11/2007 | Agmon | B41M 7/0027 219/121.6 |
| 2008/0111969 A1 * | 5/2008 | Covarrubias | B23K 26/0823 351/178 |
| 2008/0125317 A1 | 5/2008 | Alpert et al. | |
| 2008/0167183 A1 | 7/2008 | Hoekstra et al. | |
| 2008/0187760 A1 | 8/2008 | Wiand | |
| 2008/0252847 A1 * | 10/2008 | Nesty | G02C 7/10 351/159.64 |
| 2008/0273073 A1 * | 11/2008 | Oakley | B41J 2/0057 347/103 |
| 2010/0166950 A1 | 7/2010 | Nieminen | |
| 2010/0166978 A1 | 7/2010 | Nieminen | |
| 2010/0183805 A1 * | 7/2010 | Nieminen | B29C 66/5326 427/162 |
| 2012/0288690 A1 | 11/2012 | Forsythe | |
| 2013/0008374 A1 | 1/2013 | Ookubo et al. | |
| 2015/0205011 A1 * | 7/2015 | Gotou | C08G 64/06 351/49 |
| 2015/0219931 A1 | 8/2015 | Grasso | |
| 2016/0031058 A1 * | 2/2016 | Daimaru | B24B 9/14 451/5 |
| 2016/0059373 A1 * | 3/2016 | Daimaru | B24B 9/14 451/5 |
| 2017/0073537 A1 | 3/2017 | Chin et al. | |
| 2017/0139091 A1 | 5/2017 | De La Vega et al. | |
| 2017/0176775 A1 | 6/2017 | Mappes et al. | |
| 2017/0343835 A1 | 11/2017 | Carmon et al. | |
| 2018/0050549 A1 | 2/2018 | Frease et al. | |
| 2018/0056615 A1 | 3/2018 | Turpen et al. | |
| 2018/0095190 A1 | 4/2018 | Frease et al. | |
| 2018/0169821 A1 * | 6/2018 | Ha | B24B 9/14 |
| 2019/0033620 A1 * | 1/2019 | Yahagi | B32B 7/02 |
| 2019/0049754 A1 * | 2/2019 | Yahagi | G02C 7/12 |

FOREIGN PATENT DOCUMENTS

| | | |
|---|---|---|
| DE | 10052646 A1 | 5/2002 |
| DE | 102014018464 A1 | 6/2016 |
| DE | 102015219388 A1 | 4/2017 |
| EP | 3185064 A1 | 6/2017 |
| GB | 1520099 A | 8/1978 |
| GB | 2277602 A | 11/1994 |
| JP | 3129483 A | 6/1991 |
| JP | H 0820076 A | 1/1996 |
| JP | H 820080 A | 1/1996 |
| JP | 2006264109 A | 10/2006 |
| JP | 3874569 B2 | 1/2007 |
| JP | 4263432 B2 | 5/2009 |
| JP | 2012133273 A | 7/2012 |
| JP | 2012173675 A | 9/2012 |
| JP | 2012189755 A | 10/2012 |
| JP | 2013195702 A | 9/2013 |
| JP | 2016212382 A | 12/2016 |
| KR | 10-2008-0004235 A | 1/2008 |
| WO | WO 2003/040242 A2 | 5/2003 |
| WO | 2007030352 | 3/2007 |
| WO | WO 2009/004120 | 7/2008 |
| WO | WO 2009/074833 A1 | 6/2009 |
| WO | WO 2011/107658 A3 | 9/2011 |
| WO | WO 2016/142496 | 3/2015 |
| WO | WO 2016/144332 | 3/2015 |
| WO | WO 2016/144333 | 3/2015 |
| WO | WO 2017/074429 | 10/2015 |
| WO | WO 2017/074434 | 10/2015 |
| WO | WO 2017/074441 | 10/2015 |
| WO | WO 2018/010809 | 7/2016 |
| WO | WO 2018/121852 | 12/2016 |

(56) References Cited

FOREIGN PATENT DOCUMENTS

| WO | WO 2017/074444 | 1/2017 |
|----|----------------|--------|
| WO | WO 2018/078770 A1 | 5/2018 |

OTHER PUBLICATIONS

Larsen, Andreas, *Easing Linear Gradients*, CSS-Tricks: https://css-tricks.com/easing-linear-gradients/, May 12, 2017, pp. 1-18.

Meister, Darryl, ABOM, *Fundamentals of Progressive Lens Design*, VisionCare Product News, vol. 6, No. 9, Sep. 2006, pp. 1-6.

Burke, Paria S, Gradient Mesh—*Macworld Paint with Illustrators Gradient*, https://www.macworld.comarticle/1145930/gmesh1.html, Mar. 3, 2010, pp. 1-5.

*linear-gradient* (), CSS: Cascading Style Sheets—MDN: https://developer.moxilla.org/en-US/docs/Web/CSS/linear-gradient, print date Jun. 17, 2019, pp. 1-12.

*Using CSS gradients*, CSS: Cascading Style Sheets—MDN: https://developer.mozilla.,org/en-US/docs/Web/CSS/CSS_Images/Using_CSS_gradients, print date Jun. 17, 2019, pp. 1-18.

Sheedy, James E. et al., *Progressive Powered Lenses: the Minkwitz Theorem*, Optometry and Vision Science: Oct. 2005—vol. 82—Issue 10—Abstract, p. 1-3.

Sheedy, Jim, Ph.D. et al., *Progressive addition lenses—measurements and ratings*, Optometry—Journal of the American Optometric Association, vol. 77, Issue 1, Jan. 2006, Abstract, pp. 1-3.

*Overview of 2012 Rx Lens Sales*, Vision Expo East—Your Vision. Your World. Vision Expo., https.://east.visionexpo.com/Press/Vision-Voice-Newsletter/Overview-of-2012-Rx-Lens-Sales/, 2012, pp. 1-3.

*Color Gradient*, w3schools.com—https.www.w3schools.com/colors_gradient.asp., Copyright 1999-2019 by Refesnes Data powered by W3.CSS, pp. 1-7.

*CSS Gradients*, w3schools.com, https://www.w3schools.com/css/css3_gradients.asp, Copyright 1999-2019 by Refsnes Data powered by W3.CSS, pp. 1-15.

*Curvilinear coordinates*, Wikipedia: https://en.wikipedia.org/wiki/Curvilinear_coordinates, Wikimedia Foundation, Inc., last edited May 6, 2019, pp. 1-11.

*Color Gradient*, Wikipedia: https://en.wikipedia.org/wiki/Color_gradient, Wikimedia Foundation, Inc. last edited Jun. 17, 2019, pp. 1-2.

*Polygon mesh*, Wikipedia: https://en.wikipedia.org/wiki/Polygon_mesh, Wikipedia Foundation, Inc., last edited Dec. 10, 2018, pp. 1-11.

*Working with mesh points*, from the course (Instructor Justin Steeley—Senior Instructional Designer at AVADO, North America): Creating Gradient Meshes with Illustrator, LinkedIn Learning, formerly Lynda.com: https://www.linkedin.com/learning/creating-gradient-meshes-with-illustrator/working-with-mesh-points, LinkedIn Corporation, 2019, pp. 1-4.

International Search Report and Written Opinion for International Application No. PCT/IB19/00069 dated Nov. 1, 2019.

*Lens Design Solution*, powered by Crossbows optical Ltd., Satisloh: www.satisloh.com, Feb. 2013, pp. 1-36.

\* cited by examiner

EYEGLASS PRESCRIPTION

500

1. Vision Correction Data

510

|  | OD | | | OS | | | PD | LENS TYPE |
|---|---|---|---|---|---|---|---|---|
|  | SPH | CYL | AXIS | SPH | CYL | AXIS | | |
| Distance | -2,00 | -2,00 | 30° | -1,50 | -0,75 | 60° | 64 | |
| Near | +1,00 | +1,00 | 30° | +1,50 | -0,75 | 60° | 62 | |

PATIENT NAME _____ AGE _____

DATE _____ Dr. _____

2. Light-blocking Data

A. Primary Light-Blocking Data

520

|  | Vertical Distance of Boundary From FP (mm) | | Light-Blocking Density Value | Light-Blocking Density Gradient Profile |
|---|---|---|---|---|
|  | Upper | Lower | | |
| Horizontal Zone 1 (Distance) | +20 | | 80% | Linear |
|  | | -3 | 60% | |
| Horizontal Zone 2 (Intermediate) | -3 | | 55% | Linear |
|  | | -15 | 20% | |
| Horizontal Zone 3 (Near) | -15 | | 10% | Linear |
|  | | -25 | 0% | |

B. Secondary Light-Blocking Data

|  | Horizontal Distance of Boundary From FP (mm) | | Light-Blocking Density Value | Light-Blocking Density Gradient Profile |
|---|---|---|---|---|
|  | Nasal | Temporal | | |
| Vertical Zone 1 (Nasal Inner) | -25 | | 10% | Linear |
|  | | -10 | 5% | |
| Vertical Zone 2 (Nasal Middle) | -10 | | 5% | Linear |
|  | | 0 | 0% | |
| Vertical Zone 3 (Temporal Middle) | 0 | | 0% | Linear |
|  | | +10 | 5% | |
| Vertical Zone 4 (Temporal Outer) | +10 | | 5% | Linear |
|  | | +25 | 15% | |

FIG. 13

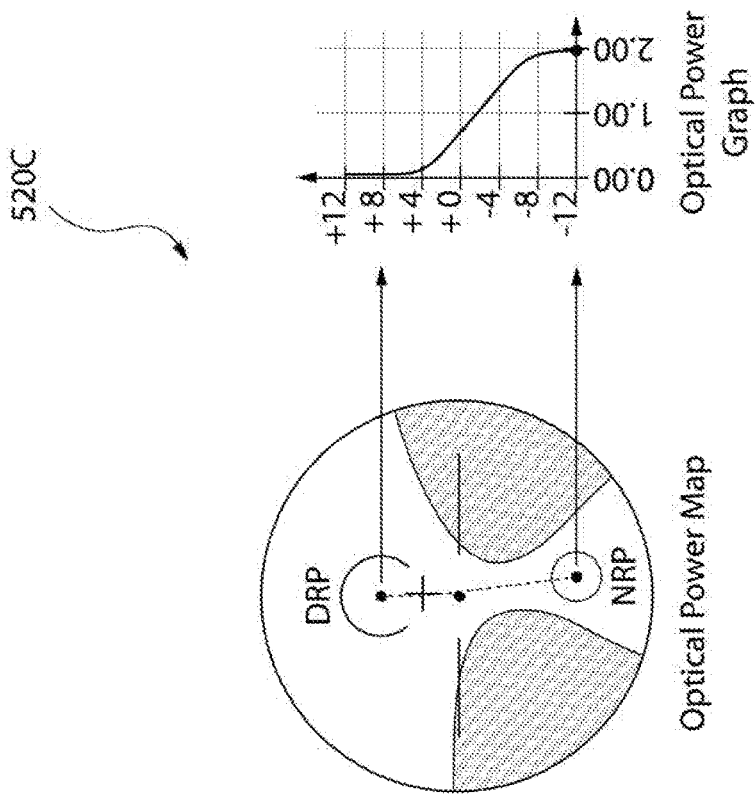
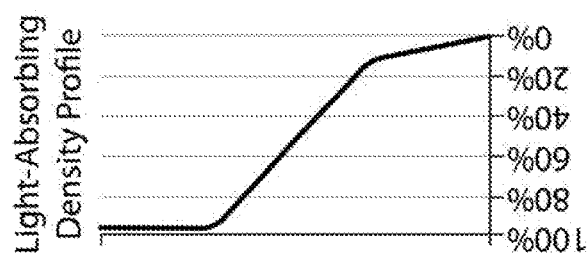
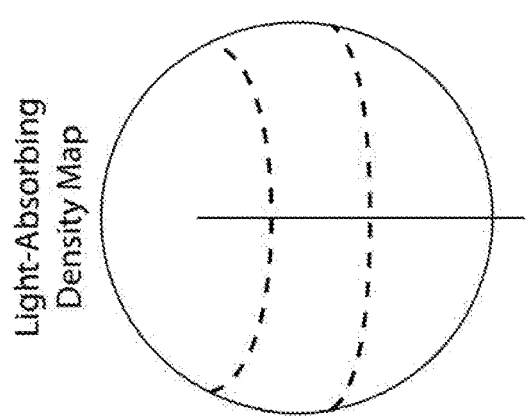
FIG. 16

SYSTEMS, METHODS, AND APPARATUS FOR FORMING OPTICAL ARTICLES, AND OPTICAL ARTICLES FORMED BY THE SAME

CROSS-REFERENCE TO RELATED PATENT APPLICATIONS

The present application claims the benefit of U.S. Provisional Patent Application Ser. No. 62/620,929, filed Jan. 23, 2018, the entirety of which is hereby incorporated by reference.

BACKGROUND

Optical articles having light-blocking properties are known to protect the eyes from light, such as visible light and ultraviolet light. Such optical articles can have permanent light-blocking properties, such as in the case of tinted or colored lenses, or can have the ability to color change from "clear" to "dark" upon being exposed to an activation energy, such as actinic energy (photochromic), thermal energy (thermochromic), or electrical energy (electrochromic).

While the application of light-blocking compositions, such photochromic compositions, tints, and colorants, to optical articles is generally known, existing techniques have been limited in their ability to apply the light-blocking compositions to the optical articles in complex patterns and gradients. Additionally, existing techniques and optical articles that include light-blocking composition applied thereto are not optimized for ophthalmic lenses, thereby potentially resulting in inferior visibility and/or inferior perceived lens performance. Additionally, during the manufacturing of lenses that are formed from stock lens blanks, the entire surface of the lens blank is coated with the light-blocking composition. Thus, when the final lens shape is edged from the lens blank, an amount of the light-blocking composition on the removed portion of the lens blank is wasted. This is particularly costly when dealing with expensive light-blocking compositions, such as photochromic, thermochromic, or electrochromic compositions.

Other issues exist with light-blocking compositions that change color upon exposure to activation energy. For example, photochromic materials are sensitive to temperature. Typically, in lower temperatures photochromic materials turn darker than they would in warmer temperatures and have slower rise and decay rates.

Accordingly, there is a need for optical articles, and methods of producing the same, that address the aforementioned and other deficiencies.

BRIEF SUMMARY

In one aspect the invention may be a method of manufacturing an optical article comprising: providing an optical substrate having a first optical region having a first average optical power, a second optical region having a second average optical power that is different than the first average optical power, and a third optical region located between the first and second optical regions, the third optical region having an optical power gradient that transitions from the first average optical power to the second average optical power; and applying a photochromic composition to the optical substrate in a pattern so that, upon exposure to an actinic energy, a first light-blocking zone is formed over the first optical region that has a first average photochromic density, a second light-blocking zone is formed over the second optical region that has a second average photochromic density that is less than the first average photochromic density, and a third light-blocking zone is formed over the third optical region that has a primary third photochromic density gradient that transitions from the first average photochromic density toward the second average photochromic density moving from the first optical region toward the second optical region.

In another aspect, the invention may be an optical article comprising: an optical substrate having a first optical region having a first average optical power, a second optical region having a second average optical power that is different than the first average optical power, and a third optical region located between the first and second optical regions, the third optical region having a optical power gradient that transitions from the first average optical power to the second average optical power; and a photochromic layer applied to the optical substrate so that, upon exposure to an actinic energy, a first light-blocking zone is formed over the first optical region that has a first average photochromic density, a second light-blocking zone is formed over the second optical region that has a second average photochromic density that is less than the first average photochromic density, and a third light-blocking zone is formed over the third zone that has a third photochromic density gradient that transitions from the first average photochromic density toward the second average photochromic density moving from the first optical region toward the second optical region.

In a further aspect, the invention may be a method of manufacturing a photochromic optical article comprising: a) providing an optical substrate having an optical region having an optical power gradient having a plurality optical power gradient characteristics; and b) applying a photochromic composition to the optical substrate in a pattern so that, upon exposure to an actinic energy, a light-blocking zone is formed over the optical region that has a primary photochromic density gradient having a plurality of primary photochromic density gradient characteristics, wherein at least one of the plurality of primary photochromic density gradient characteristics corresponds to at least one of the plurality optical power gradient characteristic.

In another aspect, the invention may be an optical article comprising: an optical substrate having an optical region having an optical power gradient having a plurality optical power gradient characteristics; a photochromic layer on the optical substrate in a pattern so that, upon exposure to an actinic energy, a light-blocking zone is formed over the optical region that has a primary photochromic density gradient having a plurality of primary photochromic density gradient characteristics; and wherein at least one of the plurality of primary photochromic density gradient characteristics corresponds to at least one of the plurality optical power gradient characteristic.

In yet another aspect, the invention can be a method of manufacturing a photochromic optical article comprising: a) providing a vision-correcting optical substrate having optical power properties corresponding to an optical power map; and b) applying a photochromic composition to the optical substrate in a pattern based on the optical power map.

In an even further aspect, the invention can be a method of manufacturing a light-blocking lens comprising: a) selecting a lens blank having a front surface and a rear surface; b) printing a light-blocking composition on the front surface of the lens blank in a final lens zone of the lens blank and leaving at least a portion of a material removal zone of the lens blank free of the light-blocking composition; and c) edging the lens blank about a perimeter of the final lens zone to remove the material removal zone, thereby forming a light-blocking lens that is sized and shaped to match a lens opening of a frame of selected eyeglasses.

In still another aspect, the invention can be a method of manufacturing an optical article comprising: a) providing an optical substrate; and b) printing a first color-changing composition and a second color-changing composition on the optical substrate, wherein the first color-changing composition undergoes a first color change when exposed to a first type of activation energy and the second color-changing composition undergoes a second color change when exposed to a second type of activation energy that is different than the first type of activation energy.

In a still further aspect, the invention can be an optical article comprising: an optical substrate; a color-changing layer on the optical substrate comprising a first color-changing composition and a second color-changing composition, wherein the first color-changing composition undergoes a first color change when exposed to a first type of activation energy and the second color-changing composition undergoes a second color change when exposed to a second type of activation energy that is different than the first type of activation energy.

In yet another aspect, the invention can be a method of manufacturing an ophthalmic lens comprising: receiving an eyeglass prescription containing light-blocking data; selecting a lens blank; and printing a light-blocking composition on the lens blank based on the light-blocking data of the eyeglass prescription.

In another the invention can be an eyeglass prescription comprising: vision-correction data based on a healthcare professional's assessment of a patient's visual impairment; and light-blocking data based on the vision-correction data.

In a further embodiment, the invention can be a method of manufacturing an optical article comprising: providing an optical substrate; and applying a light-blocking composition to the optical substrate in a pattern so that a first light-blocking zone is formed on the optical substrate having a first non-linear light-blocking density gradient front and a first light-blocking density gradient that extends along a linear first light-blocking density vector.

In another embodiment, the invention can be a method of manufacturing an optical article comprising: providing an optical substrate; and applying at least one light-blocking composition to the optical substrate in a pattern so that first and second light-blocking zones are formed on the optical substrate, the first viewing zone comprising a first light-blocking density gradient and the second viewing zone comprising a second light-blocking density gradient that is different than the first light-blocking density gradient, and wherein a non-linear interface is formed between the first and second light-blocking density gradients.

In yet another embodiment, the invention can be a method of manufacturing an optical article comprising: providing an optical substrate; and applying a light-blocking composition to the optical substrate in a pattern so that a first light-blocking zone is formed on the optical substrate having: (i) a primary photochromic density gradient extending along a primary density gradient vector; and (ii) a secondary photochromic density gradient that extends along a secondary light-blocking density gradient vector that is non-parallel to the primary photochromic gradient vector, the primary and secondary density gradients overlapping.

In a still further embodiment, the invention can be a method of manufacturing an optical article comprising: a) providing an optical substrate; and b) printing a photochromic layer on the optical substrate having an effective photochromic density gradient by: b-1) depositing, with a first array of printer nozzles, a first photochromic composition having a first photochromic density onto the optical substrate using a greyscale drop-on-demand technique in which drop volume decreases in a first direction; and b-2) depositing, with a second array of printer nozzles that are different than the first array of printer nozzles, a second photochromic composition having a second photochromic density over the first photochromic composition using a greyscale drop-on-demand technique in which drop volume increases in the first direction; and wherein the first and second photochromic densities are different.

In an even further embodiment, the invention can be an optical article comprising: an optical substrate having a first region and a second region; a first color-changing composition applied over the first region of the optical substrate, wherein for a set of environmental conditions the first color-changing composition has a first decay time and a first average rate of decay when changing from an activated state to a non-activated state upon cessation of a first activation energy; a second color-changing composition applied over the second region of the optical substrate, wherein for the set of environmental conditions the second color-changing composition has a second decay time and a second average rate of decay when changing from an activated state to a non-activated state upon cessation of a second activation energy; and wherein the second decay time is less than the first decay time and/or the second average rate of decay is greater than the first average rate of decay.

In another embodiment, the invention can be a method of manufacturing an optical article comprising: a) providing an optical substrate having a first region and a second region; and b) printing a first color-changing composition in the first region of the optical substrate, wherein for a set of environmental conditions the first color-changing composition has a first decay time and a first average rate of decay when changing from an activated state to a non-activated state upon cessation of a first activation energy; and c) printing a second color-changing composition in the second region of the optical substrate, wherein for a set of environmental conditions the first color-changing composition has a first decay time and a first average rate of decay when changing from an activated state to a non-activated state upon cessation of a first activation energy.

Further areas of applicability of the present invention will become apparent from the detailed description provided hereinafter. It should be understood that the detailed description and specific examples, while indicating an embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 13 is an eyeglass prescription that includes both vision-correction data and light-blocking data according to an embodiment of the present invention;

FIG. 16 is an alternative representation of light-blocking data that can be used in the eyeglass prescriptions of FIGS. 13 and 15;

DETAILED DESCRIPTION

Figure 1:
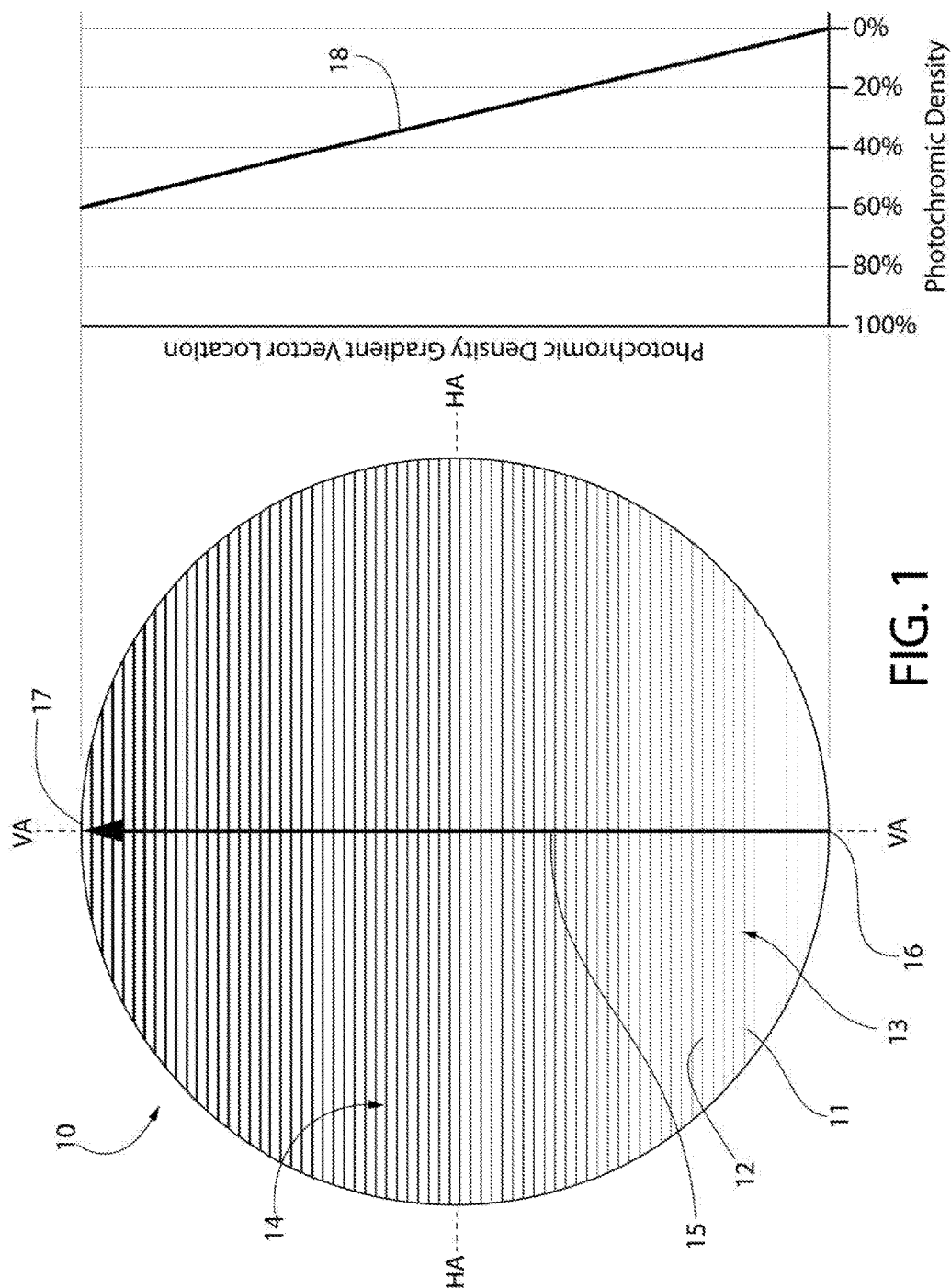
FIG. 1 is a schematic representation of an optical article according to an embodiment of the present invention, wherein a light-blocking composition has been applied in a light-blocking composition density gradient that extends along a linear light-blocking composition density gradient vector and has a linear gradient front and a linear light-blocking composition density gradient profile.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "mounted" and similar refer to a relationship wherein structures are secured or attached to one another either directly or indirectly through intervening structures, as well as both movable or rigid attachments or relationships, unless expressly described otherwise.

As used herein the term "optical article" is used broadly to include any device through which a user can view objects, including lenses, lens blanks, windows, display elements, goggles (including virtual reality and augmented reality goggles or glasses), visors, face shields, automotive transparencies, e.g., sunroofs and light covers, aerospace transparencies, and wearable transparencies. The term "lens" includes ophthalmic lenses. As used herein, the term "ophthalmic" means pertaining to or associated with the eye and vision. Non-limiting examples of ophthalmic lenses include corrective and noncorrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including, without limitation, contact lenses, intraocular lenses, magnifying lenses, and protective lenses or visors.

As used herein, the term "light-blocking composition" is used broadly to include any composition that can block, either partially or fully, the transmission of visible light, ultraviolet light, and/or infrared light therethrough, whether through absorption, reflection, combinations thereof, or otherwise. Light-blocking compositions have one or more constituent components, wherein at least one of the constituent components is a light-blocking material. The other constituent components of the light-blocking composition may include a carrier (such a clear base coat) or different light-blocking materials. Light-blocking compositions include static color compositions and color-changing compositions.

As used herein, the term "static color compositions" is used to refer to compositions whose light blocking density does not change when subjected to stimulus, such as an activation energy. Static color compositions include at least one static color material as a constituent component. Examples of static color material include without limitation, pigments, dyes, tints, such as BPI® Filter Vision™ Blue Barrier® tints, AO Calo-Lite, VDT Amber, or Opti-Safe Lens C250-01 NO RED BLACK, C250-04 WINTER BLACK, C250-27 MARRON.

As used herein, the term "color-changing composition" is used broadly to include any composition that can change from a non-activated state to an activated state as the result of being exposed to an activation energy. In the non-activated state, the color-changing composition blocks a first amount of light from passing therethrough while in the activated state blocks a second amount of light from passing therethrough, wherein the second amount is greater than the first amount. Color-changing compositions include at least one color-changing material as a constituent component. Examples of color-changing materials include without limitation photochromic materials, thermochromic materials, and electrochromic materials. Examples of color-changing compositions include photochromic compositions, thermochromic compositions, and electrochromic compositions.

Examples of "photochromic materials" include, without limitationtriarylmethanes, stilbenes, azastilbenes, nitrones, fulgides, naphthopyrans, spiro-oxazines, quinones, silver chloride, zinc halides, other silver halides, and yttrium hydride. As well as photochromic compositions that comprise at least one photochromic compound selected from the group consisting of pyrans, spiropyrans, oxazines, spiroxazines, fulgides, fulgimides, metallic dithizonates, diarylethenes, and mixtures thereof. Specific but non-limiting examples of suitable photochromic materials can include indeno-fused naphthopyrans, naphtho[1,2-b]pyrans, naphtho[2, 1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline) fluoroanthenoxazines, spiro(indoline)quinoxazines, fulgides, fulgimides, diarylethenes, diarylalkylethenes, and diarylalkenylethenes Examples of "thermochromic materials" include, without limitation, organic materials such as spirolactones, fluorans, spiropyrans, and fulgides. The acids include bisphenol A, parabens, 1,2,3-triazole derivates, and 4-hydroxycoumarin. Inorganic materials such astitanium dioxide, zinc oxide, indium(III) oxide, lead(II) oxide, Cuprous mercury iodide (Cu2[HgI4]), Silver mercury iodide (Ag2[HgI4]), Mercury (II) iodide, Bis(dimethylammonium) tetrachloronickelate (II) ([(CH3)2NH2]2NiCl4), Bis(diethylammonium) tetrachlorocuprate (II) ([(CH3CH2)2NH2]2CuCl4), Vanadium dioxide.

Examples of "electrochromic materials" include, without limitation, metal oxides such as tungsten oxide (WO3), as well as organic materials such as viologens. Also a variety of conducting polymers such as polypyrrole, PEDOT, and polyaniline. Also for example, Viologen which can be used in conjunction with titanium dioxide (TiO2).

As used herein, the term "light-blocking density" refers to the amount of light blocked by a composition at a determined location. A location of greater light-blocking density will allow less light to transmit through the composition than a location of lesser light-blocking density. Thought of another way, light-blocking density may be considered to be the inverse of light transmissivity. A 100% light blocking density at a location means that all of the light is prohibited from passing through the composition at that location. Conversely, a 0% light-blocking density at a location means that all of the light passes through the composition at that location. Examples of light-blocking density include, photochromic density, thermochromic density, electrochromic density, color density, and tint density.

As used herein, the term "photochromic density" refers to a specific type of light-blocking density when the light-blocking composition is a photochromic composition and in an activated state. Similarly, "thermochromic density" refers to a specific type of light-blocking density when the light-blocking composition is a thermochromic composition and in an activated state. Similarly, "electrochromic density" refers to a specific type of light-blocking density when the light-blocking composition is an electrochromic composition and in an activated state. Similarly, "color density" refers to a specific type of light-blocking density when the light-blocking composition is a static color composition or a color-changing compositions.

As used herein, the term "light-blocking density gradient vector" denotes the path (which may be referred to as a gradient line in certain industries) and the direction of change in light-absorbing density for a light-blocking density gradient. In the FIGS., the direction of the arrow of a light-blocking density gradient vector indicates the direction of increase in light-blocking density. Importantly, unlike traditional force vectors, the length of the light-blocking density gradient vector is not representative of the magnitude of the light-blocking density gradient (or the magnitude of change in light-blocking density) but rather simply extends from a gradient starting point to a gradient ending point of that particular light-blocking density gradient. Examples of light-blocking density gradient vectors that may be used in this disclosure include "photochromic density gradient vectors" when referring to photochromic density gradients, "thermochromic density gradient vectors" when referring to thermochromic density gradients, "electrochromic density gradient vectors" when referring to electrochromic density gradients, and "color density gradient vectors" when referring to color density gradients As used herein, the term "linear gradient" refers to a density gradient that extends along a linear density gradient vector. Conversely, as used herein, the term non-linear gradient" refers to a density gradient that extends along a non-linear density gradient vector.

As used herein, the term "gradient front" refers to a line that is transverse to a gradient vector and along which the light-blocking density is constant. As one progresses along a gradient vector, the gradient front generally maintains its shape while changing its light-blocking density magnitude in accordance with a light-blocking density gradient profile.

As used herein, when a vector is said to be "coincident" with an axis, it is meant that that vector overlies and extends along the axis without any limitation in direction of the vector. Thus, the vector may extend along the axis and point in a first direction or extend along the axis and point in a second direction opposite the first direction.

As used herein, when a first vector is said to be "coincident" with a second vector, the first vector overlies the second vector and points in the same direction of the second vector, ignoring slight differences in angle that are less 5 degrees and shifts that are less than 1 mm. The first and second vectors, however, are not necessarily the same length.

As used herein, the "average rate of change" of a light-blocking density gradient is determined by dividing the % change in light-blocking density, measured from the gradient starting point to the gradient end point, divided by the length of the light-blocking density gradient.

As used herein, when it is said that a light-absorbing density gradient profile "corresponds" to an optical power gradient profile it is meant that the profiles: (1) follow the same type of function, e.g., they are both linear, they are both parabolic, they are both hyperbolic, they are both stepped, etc.; (2) have the same shape as one another; and/or (3) have the same number of inflection points.

As used herein, when it is said that a composition, layer, sublayer, and/or coating is printed on the optical substrate (or on another composition, layer, sublayer, and/or coating), this is meant to include situations where the composition, layer, sublayer, and/or coating is printed directly onto the optical substrate (or on the another composition, layer, sublayer, and/or coating) and situations where one or more intervening compositions, layers, sublayers, and/or coatings may exist.

As used herein, when it is said that a third photochromic density gradient transitions from a first average photochromic density toward a second average photochromic density, it does not necessarily mean that the starting value of the third photochromic density gradient is equal to the first average photochromic density. Rather, the starting value of the third photochromic density gradient may be: (1) equal to the first average photochromic density, in instances where the first photochromic density is constant/uniform; or (2) a value between the first average photochromic density and the second average photochromic density. Moreover, it does not necessarily mean that the ending value of the third photochromic density gradient is equal to the second average photochromic density. Rather, the ending value of the third photochromic density gradient may be: (1) equal to the second average photochromic density, in instances where the second photochromic density is constant/uniform; or (2) a value between the second average photochromic density and the first average photochromic density.

As used herein, when it is said that a third optical power gradient transitions from a first average optical power toward a second average optical power, it does not necessarily mean that the starting value of the third optical power gradient is equal to the first average optical power. Rather, the starting value of the third optical power gradient may be: (1) equal to the first average optical power, in instances where the first optical power is constant/uniform; or (2) a value between the first average optical power and the second average optical power. Moreover, it does not necessarily mean that the ending value of the third optical power gradient is equal to the second average optical power. Rather, the ending value of the third optical power gradient may be: (1) equal to the second average optical power, in instances where the second optical power is constant/uniform; or (2) a value between the second average optical power and the first average optical power.

Referring now to FIG. 1, an optical article 10 is shown that has been manufactured in accordance to an embodiment of the present invention. The optical article 10 generally comprises an optical substrate 11 to which a photochromic composition 12 has been applied in a photochromic density gradient 13. The optical substrate 11 is sufficiently light transmissive so that a person can view objects and/or environments through the substrate 11. The substrate 11 may be clear transparent, transparent with an impregnated pigment, colorant or tint, or translucent. In the exemplified embodiment, the substrate is an ophthalmic lens. The exact shape and nature of the optical substrate 11 will be determined by the end use for which the optical article 10 is to be put. Additionally, while the invention will be exemplified and described herein in terms of a photochromic composition being applied to the optical substrate 11, it is to be understood that any light-blocking composition can be used in place thereof while still following the principles of the invention described therein.

Figure 2:
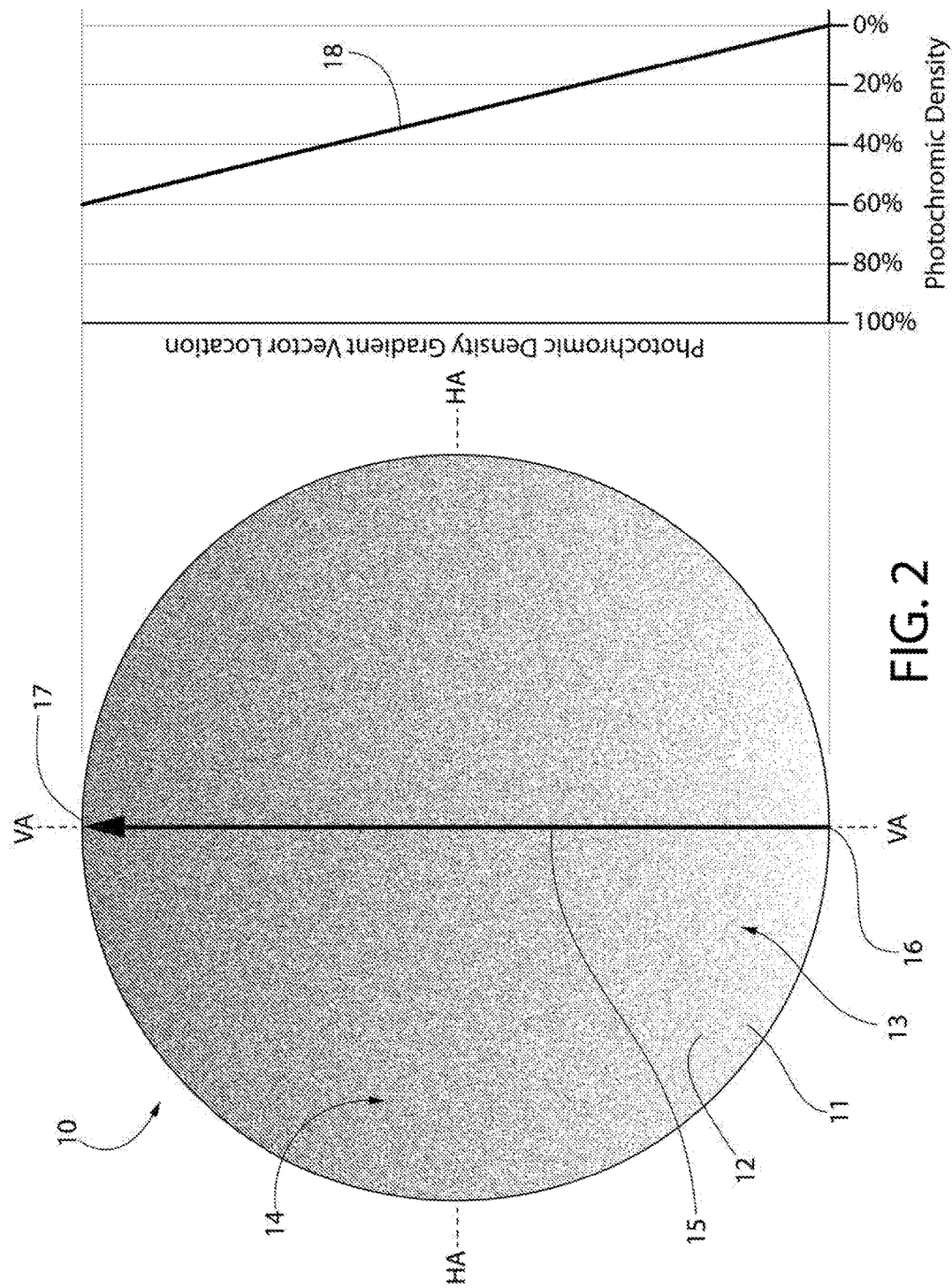
FIG. 2 is a schematic representation of the optical article of FIG. 1, wherein the light-blocking composition density gradient is illustrated with stippling rather than lines of differing line weight.

The photochromic density gradient 13 of the photochromic composition 12 is schematically represented in FIG. 1 by equally spaced lines of different line weight, wherein an increase in line weight represents an increase in photochromic density. It should be noted that the use of equally spaced lines of different line weight to represent the photochromic density gradient 13 is just one option that has been selected for ease of illustration to facilitate the reader's understanding of the invention disclosed herein (and to allow proper reproduction of the figures in the various patent offices). Alternative ways of schematically representing gradients include the use of stippling, which is also used in the present disclosure. For example, the identical optical article 10 of FIG. 1 is also shown in FIG. 2 with the exception that stippling has been used to illustrate the gradient 13 rather than equally spaced lines of different line weight. Similarly, an increase in stippling density represents an increase in photochromic density. Throughout this disclosure, gradient concepts will be illustrated with line weight or stippling based on what is most-effective for discussion purposes.

In one embodiment, the photochromic density gradient 13 of the optical article 10 is achieved by printing the photochromic composition 12 onto a front surface 14 of the optical substrate 11. The front surface 14 may be a contoured surface (convex or concave). In one embodiment of printing on such a contoured surface, the printing is achieved by using a non-contact printing process. One suitable non-contact printing process is an inkjet drop-on-demand printing process, which may be thermal printing or piezoelectric printing. In order to achieve photochromic density gradients (discussed in greater detail below), the inkjet drop-on-demand printing process may be performed with a variable drop size printing process utilizing one or more greyscale printheads. In an embodiment the printer includes 3 print heads, for static color compositions, e.g. Red, Green and Blue. In an embodiment the printer includes 4 print heads, for static color compositions, e.g. Black, Red, Green and Blue. In an embodiment the printer includes 7 print heads, for static color compositions.

As shown in FIG. 1, photochromic density gradient 13 extends along a photochromic density gradient vector 15 from a gradient starting point 16 to a gradient ending point 17. The photochromic density gradient vector 15 is linear and thus, the photochromic density gradient 13 is a linear density gradient. The photochromic density gradient vector 15 is co-extensive with a vertical axis of the optical substrate. The photochromic density gradient 13 has a photochromic density gradient profile 18 which is illustrated in the graph on the right-side of FIG. 1. The Y-axis of the graph is location along the photochromic density gradient vector 15 while the X-axis is the photochromic density of the photochromic density gradient vector 15 in terms of percentage. As can be seen, the photochromic density gradient profile 18 is a linear function along the entirety of the photochromic density gradient vector 15. The photochromic density gradient 13 has a minimum photochromic density of 0% at the gradient starting point 16 and a maximum photochromic density of 60% at the gradient ending point 17. The photochromic density gradient profile 18 is measured along the photochromic density gradient vector 15.

Finally, the photochromic density gradient 13 has a linear gradient front. The linear gradient front of the photochromic density gradient 13 is substantially parallel to the horizontal axis HA of the optical substrate 11. The horizontal lines (of increasing line weight) in FIG. 1 represent the linear gradient front of the photochromic density gradient 13 moving along the photochromic density gradient vector 15 as each horizontal line represents a constant photochromic density along its length. A gradient front, typically extends across the entirety of the optical substrate 101 (if being applied to the entire optical substrate) or across an entire light-blocking region of the optical substrate 101 when the pattern is divided into a plurality of light-blocking regions (as will be discussed below).

Figure 3:
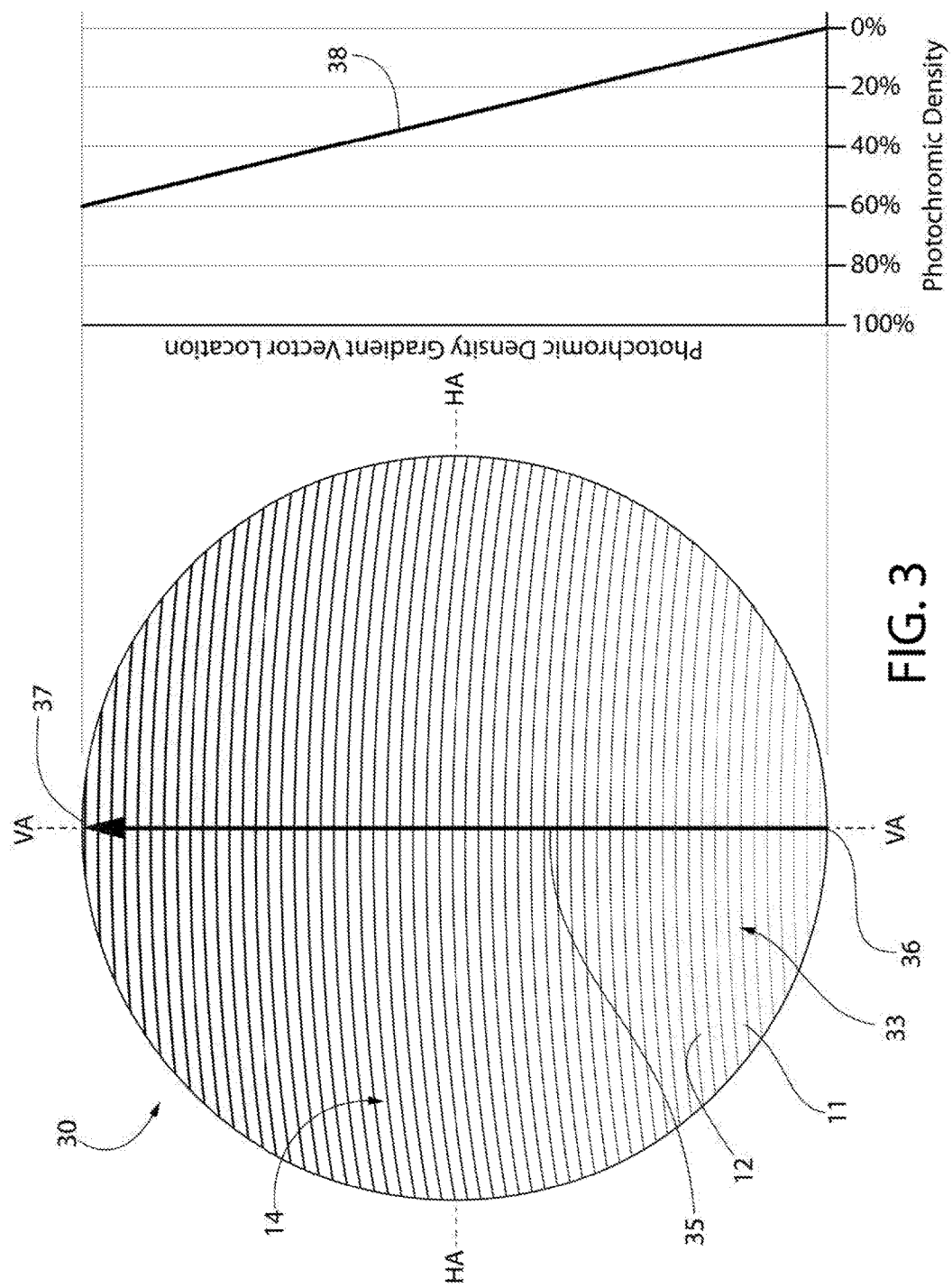
FIG. 3 is a schematic representation of an optical article according to an embodiment of the present invention, wherein a light-blocking composition has been applied in a light-blocking composition density gradient that extends along a linear light-blocking composition density gradient vector and has a non-linear gradient front and a linear light-blocking composition density gradient profile.

Referring now to FIG. 3, an optical article 30 is illustrated according to the present invention. The optical article 30 is identical to the optical article 10 (in structure and formation process) with the exception that the photochromic composition 12 is applied in a density gradient 33 that differs from the density gradient 13. Thus, discussion will be limited to those aspect of the photochromic density gradient 33 that differ from the photochromic density gradient 13.

The photochromic density gradient 33 extends along a photochromic density gradient vector 35 from a gradient starting point 36 to a gradient ending point 37. The photochromic density gradient vector 35 is linear and thus, the photochromic density gradient 33 is a linear density gradient. The photochromic density gradient 33 has a photochromic density gradient profile 38 which is illustrated in the graph on the right-side of FIG. 3. As can be seen, the photochromic density gradient profile 38 is a linear function along the entirety of the photochromic density gradient vector 35. The photochromic density gradient 33 has a minimum photochromic density of 0% at the gradient starting point 36 and a maximum photochromic density of 40% at the gradient ending point 37. The photochromic density gradient profile 38 is measured along the photochromic density gradient vector 35. As will be noted, the photochromic density gradient 13 has a greater average rate of change than the photochromic density gradient 33 as the change in photochromic density is 60% over the diameter of the optical article 11, as opposed to a 40% change in photochromic density over the same diameter of the optical substrate 11.

Finally, the photochromic density gradient 33 has a non-linear gradient front. As exemplified, the gradient front of the photochromic density gradient 33 is curved, and more specifically arched. The curved lines (of increasing line weight) in FIG. 3 represent the curved gradient front of the photochromic density gradient 33 moving along the photochromic density gradient vector 35, wherein each curved line represents a constant photochromic density along its length.

Figure 4:
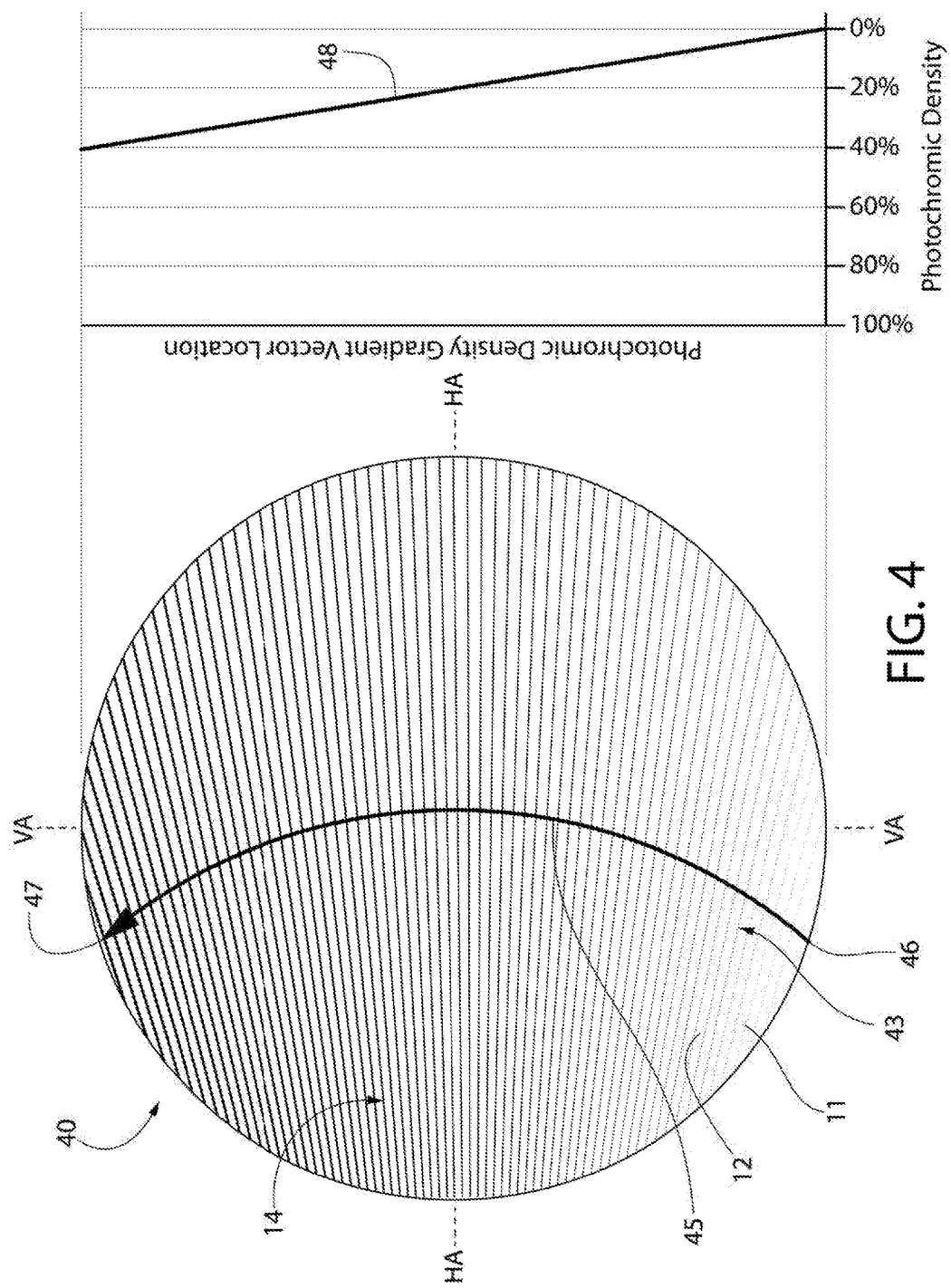
FIG. 4 is a schematic representation of an optical article according to an embodiment of the present invention, wherein a light-blocking composition has been applied in a light-blocking composition density gradient that extends along a non-linear light-blocking composition density gradient vector and has a linear gradient front and a linear light-blocking composition density gradient profile.

Referring now to FIG. 4, an optical article 40 is illustrated according to the present invention. The optical article 40 is identical to the optical article 10 (in structure and formation process) with the exception that the photochromic composition 12 is applied in a density gradient 43 that differs from the density gradient 13. Thus, discussion will be limited to those aspect of the photochromic density gradient 43 that differ from the photochromic density gradient 13.

The photochromic density gradient 43 extends along a photochromic density gradient vector 45 from a gradient starting point 46 to a gradient ending point 47. The photochromic density gradient vector 45 is non-linear and thus, the photochromic density gradient 43 is considered to be non-linear density gradient. Specifically, the photochromic density gradient vector 45 is curved.

The photochromic density gradient 43 has a linear gradient front. The linear gradient front of the photochromic density gradient 43 is inclined relative to the horizontal axis HA of the optical substrate 11. The lines (of increasing line weight) of the photochromic density gradient 43 represent the linear gradient front of the photochromic density gradient 43 moving along the photochromic density gradient vector 45 as each line represents a constant photochromic density along its length.

The photochromic density gradient 43 has a photochromic density gradient profile 48 which is illustrated in the graph on the right-side of FIG. 4. As can be seen, the photochromic density gradient profile 48 is a linear function along the entirety of the photochromic density gradient vector 45. The photochromic density gradient 43 has a minimum photochromic density of 0% at the gradient starting point 46 and a maximum photochromic density of 40% at the gradient ending point 37. The photochromic density gradient profile 48 is measured along the photochromic density gradient vector 45.

Figure 5:
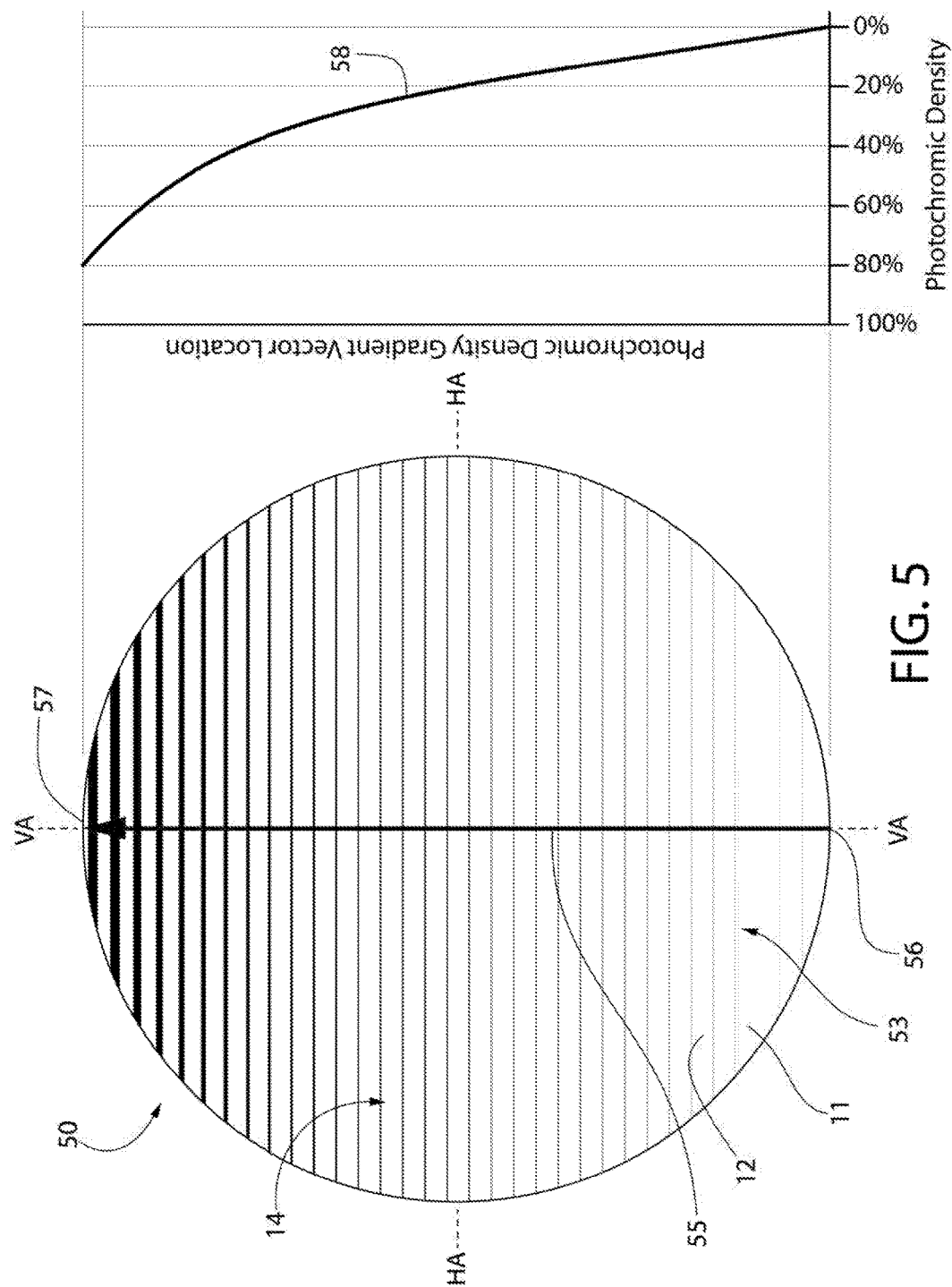
FIG. 5 is a schematic representation of an optical article according to an embodiment of the present invention, wherein a light-blocking composition has been applied in a light-blocking composition density gradient that extends along a linear light-blocking composition density gradient vector and has a linear gradient front and a non-linear light-blocking composition density gradient profile.

Referring now to FIG. 5, an optical article 50 is illustrated according to the present invention. The optical article 50 is identical to the optical article 10 (in structure and formation process) with the exception that the photochromic composition 12 is applied in a gradient 53 that differs from the gradient 13. Thus, discussion will be limited to those aspect of the gradient 53 that differ from the gradient 13.

The gradient 53 extends along a photochromic density gradient vector 55 from a gradient starting point 56 to a gradient ending point 57. The photochromic density gradient vector 55 is linear and thus, the photochromic density gradient 53 is a linear density gradient. The photochromic density gradient 53 has a photochromic density gradient profile 58 which is illustrated in the graph on the right-side of FIG. 3. As can be seen, the photochromic density gradient profile 58 is a non-linear function along the entirety of the photochromic density gradient vector 55. Specifically, the photochromic density gradient profile 58 resembles a portion of a parabolic curve. The photochromic density gradient 53 has a linear gradient front, similar to that as discussed above for optical article 10.

Figure 6:
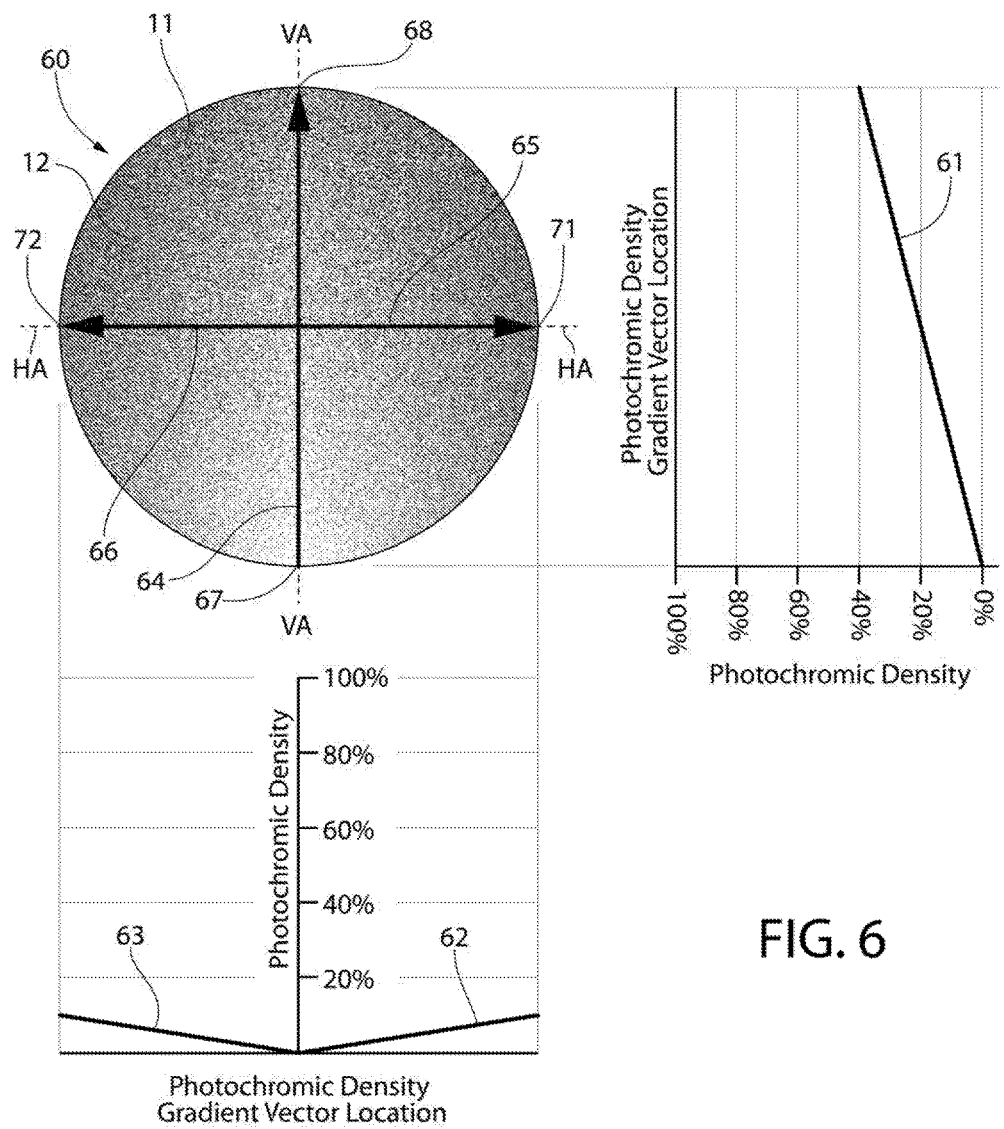
FIG. 6 is a schematic representation of an optical article according to an embodiment of the present invention, wherein a light-blocking composition has been applied in multi-gradient pattern having a primary light-blocking composition density gradient and two secondary light-blocking composition density gradients that overlay the primary light-blocking composition density gradient.

Referring now to FIG. 6 an optical article 60 is illustrated according to the present invention. The optical article 60 is identical to the optical article 10 (in structure and formation process) with the exception that the photochromic composition 12 is applied in a gradient pattern 63 that comprises a plurality of gradients. Thus, discussion will be limited to those aspect of the gradient pattern 63 that differ from the gradient 13.

The gradient pattern 63 comprises a primary photochromic density gradient and two secondary photochromic density gradients that overlay the primary photochromic density gradient. The primary photochromic density gradient extends along a primary photochromic density gradient vector 64 from a gradient starting point 67 to a gradient ending point 68. The primary photochromic density gradient vector 64 is coincident with the vertical axis VA of the optical substrate 11.

The primary photochromic density gradient is a linear gradient having a linear gradient front. The primary density gradient has a photochromic density gradient profile 61 which is illustrated in the graph on the right-side of FIG. 6. As can be seen, the primary density gradient has a photochromic density gradient profile 61 that is a linear function along the entirety of the primary photochromic density gradient vector 64. The primary photochromic density gradient has a minimum photochromic density of 0% at the gradient starting point 67 and a maximum photochromic density of 40% at the gradient ending point 68. The primary photochromic density gradient has an average rate of change of 40%/D, wherein D is the diameter of the optical substrate 11.

The first secondary photochromic density gradient extends along a photochromic density gradient vector 65, while the second secondary photochromic density gradient extends along a photochromic density gradient vector 66. Each of the first and second secondary photochromic density gradient vectors 65, 66 is coincident with the horizontal axis HA of the optical substrate 11 (which is perpendicular to the vertical axis VA) but extend in opposite directions. The first secondary photochromic density gradient vector 65 extends from the vertical axis VA (which acts as its gradient starting point) to a gradient end point 71 in a first direction. The second secondary photochromic density gradient vector 66 extends from the vertical axis VA (which acts as its gradient starting point) to a gradient end point 72 in a second direction that is opposite the first direction. In other embodiments, the first and second secondary photochromic density gradient vectors 65, 66 may not extend perpendicular from the photochromic density gradient vector 65 but may merely be nonparallel.

Each of the first and second secondary photochromic density gradient vectors 65, 66 is a linear gradient having a linear gradient front. The first secondary photochromic density gradient vector 65 has a photochromic density gradient profile 62 which is illustrated in the graph on the bottom of FIG. 6. The second secondary photochromic density gradient vector 66 has a photochromic density gradient profile 63 which is illustrated in the graph on the bottom of FIG. 6. As can be seen, the photochromic density gradient profiles 62, 63 of the first and second secondary photochromic density gradient vectors 65, 66 are mirror images of one another about the Y-axis due to their extension in opposite directions. Each of the first and second secondary photochromic density gradients have a minimum photochromic density of 0% at the vertical axis VA and a maximum photochromic density of 10% at the respective gradient end point 71, 71. Each of the first and second secondary photochromic density gradients has an average rate of change of 10%/0.5D (i.e., 20%/D), wherein D is the diameter of the optical substrate 11.

The photochromic density of each of the first and second secondary photochromic density gradients increase with distance from the vertical axis VA for their entire length. In another embodiment, the photochromic density of each of the first and second secondary photochromic density gradients increases with distance from the vertical axis VA a first portion of their length and will then remain constant for a second portion of their length.

Thus, in the exemplified embodiment, both of the secondary photochromic density gradients have an average rate of change that is less than the average rate of change of the primary photochromic density gradient. As such, the secondary photochromic density gradients may be considered "soft gradients" as compared to the primary photochromic density gradient.

Figure 7:
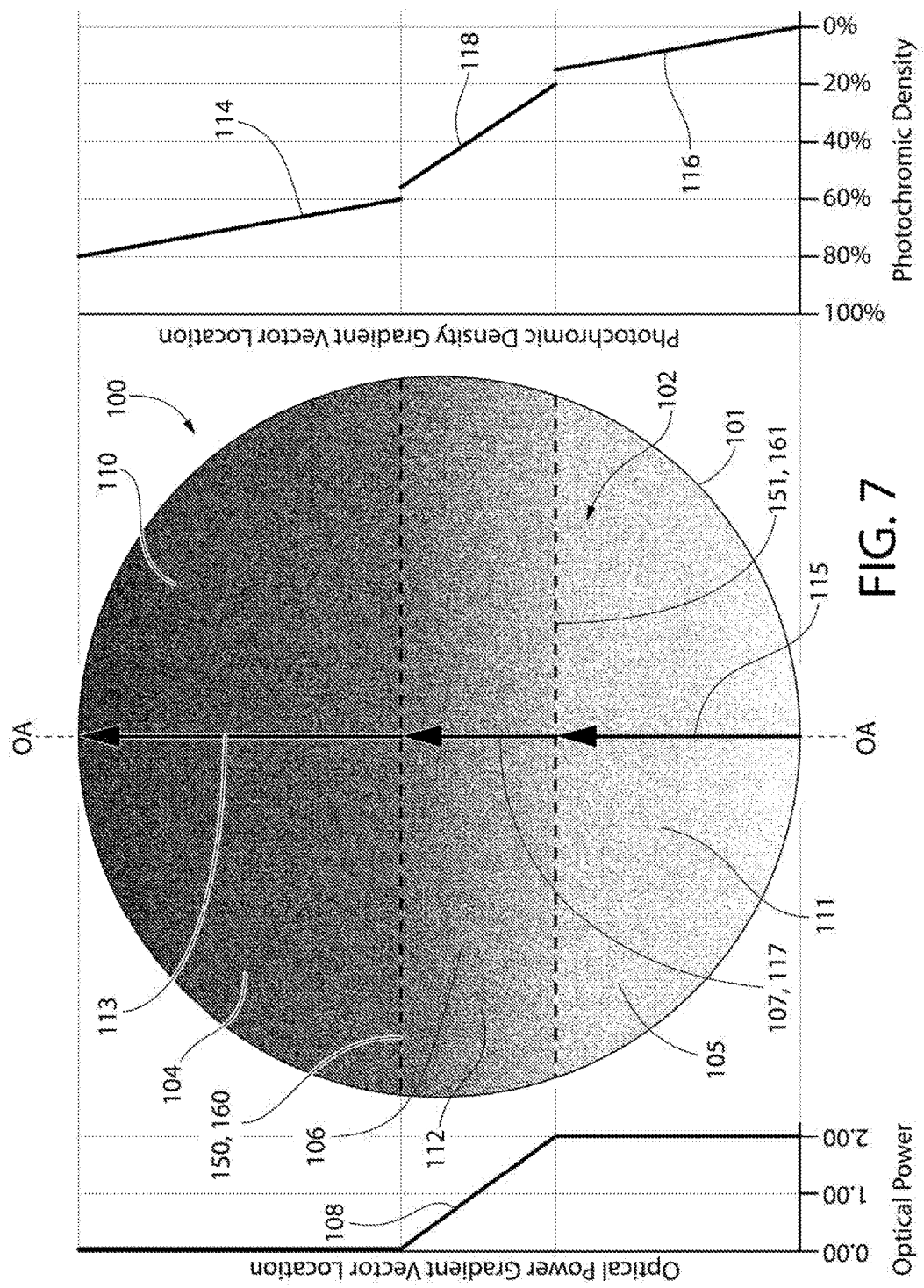
FIG. 7 is a schematic representation of an ophthalmic lens, in the form of a tri-focal lens, wherein a light-blocking composition has been applied in a pattern that is based on the optical power characteristics of the optical substrate according to an embodiment of the present invention.

Referring now to FIG. 7, an optical article 100, in the form of a corrective tri-focal lens is illustrated according to an embodiment of the present invention. The optical article 100 comprises an optical substrate 101 upon which a photochromic composition 102 has been applied in a multi-gradient pattern that is based on the different optical regions 104, 105, 106 of the optical substrate 101. More specifically, the optical substrate 101 comprises a first optical region 104, a second optical region 105, and a third optical region 106 located between the first and second optical regions 104, 105.

A first boundary/interface 150 exists between the first optical zone 104 and the third optical zone 106. Similarly, a second boundary/interface 151 exists between the second optical zone 105 and the third optical zone 106.

In the exemplified embodiment, the first optical region 104 is a distance viewing region located in an upper portion of the optical substrate for a user to look therethrough when viewing objects at a far distance. The second optical region 105 is a near viewing region located in a lower portion of the optical substrate 101 for the user to look therethrough when viewing objects that are in close proximity. The third optical region 106 is a transition viewing region (or an intermediate viewing region) that assists the user in transitioning between the near and distance viewing regions and/or viewing objects located at intermediate distances.

The optical substrate 101 further comprises an optical axis OA extending from a top edge of the optical substrate 101 to a bottom edge of the optical substrate 101. The optical axis OA extends through each of the first, second and third optical regions 104-106. The optical axis OA, as used herein, refers to the natural path along which the eye travels during normal viewing events when transitioning between the first, second, and third optical regions 104, 105, 106 (when the user is wearing the optical article 100 in eyeglasses or the like). When the optical article 100 is an ophthalmic lens, the fitting point, near reference point, and distance reference point are located along the optical axis OA in some embodiments. In the exemplified optical article 100, the optical axis OA is coincident with the vertical VA. In other embodiments, the optical axis OA is inclined relative to the vertical VA.

The optical substrate 101 is a vision correcting ophthalmic lens and, thus, has been configured so that each of the first, second, and third optical regions 104-16 provide the necessary vision correcting properties for the intended user, such as providing added optical power (which sometimes referred to as add power). As can be seen in the optical power graph on the left side of FIG. 7, the first optical region 104 has a first average optical power. The second optical region 105 has a second average optical power. The second average optical power is different than the first average optical power. In the exemplified embodiment, the second average optical power is greater than the first optical power. However, in another embodiment, the second average optical power is less than the first optical power (discussed below for the embodiment of FIG. 10). Whether the second average optical power is greater or less than the first optical power may depend on whether the user for which the optical article 100 is being created is farsighted or nearsighted.

The first optical region 104 has a substantially fixed optical power (about 0 diopters in the example) while the second optical region 105 also has a substantially fixed optical power (about 2 diopters in the example). In another embodiment, the first optical region 104 may have an optical power that changes along the optical axis OA (i.e., an optical power gradient). Similarly, the second optical region 105 may also have an optical power that changes along the optical axis OA. The direction of any such change in optical power within each of the first and second optical zones will be determined by the vision-correcting needs of the user.

The third optical region 106 has an optical power gradient that transitions from the first average optical power to the second average optical power. The optical power gradient of the third optical region 106 extends along an optical power gradient vector 107. The optical power gradient vector 107 is coincident with the optical axis OA. As can be seen in the optical power graph on the left side of FIG. 7, the optical power gradient of the third optical region 106 has an optical power gradient profile 108 (taken along the optical power gradient vector 107). The optical power gradient profile 108, in the exemplified embodiment, is linear. In another embodiment, the optical power gradient profile 108 may take on other shapes, such as curved, hyperbolic, parabolic, linear, stepped, and combinations thereof.

As mentioned above, in certain embodiments the first and second optical zones, 104, 105 have a varying optical power and, thus comprise first and second optical power gradients respectively. In one such embodiment, the third optical power gradient of the third optical zone 106 will have an average rate of change that is greater than the average rate of change of the first optical power gradient. In another such embodiment, the third optical power gradient of the third optical zone 106 will have an average rate of change that is greater than the average rate of change of the second optical power gradient. In a further such embodiment, the third optical power gradient of the third optical zone 106 will have an average rate of change that is greater than both the average rate of change of the second optical power gradient and the average rate of change of the first optical power gradient.

The photochromic composition 12 is applied to the front surface of optical substrate 101 in the form of a photochromic layer. The photochromic composition 12 is applied in a multi-gradient pattern. FIG. 7 shows the multi-gradient pattern as it appears when exposed to actinic energy. The multigradient pattern comprises: (1) a first light-blocking zone 110 that is formed over the first optical region 104 and that has a first average photochromic density; (2) a second light-blocking zone 111 formed over the second optical region 105 and that has a second average photochromic density; and (3) a third light-blocking zone 112 formed over the third optical region 106 and that has a third photochromic density gradient.

A first boundary/interface 160 exists between the first light-blocking zone 110 and the third light-blocking zone 112. A second boundary/interface 161 exists between the second light-blocking zone 111 and the third light-blocking zone 112. In the exemplified embodiment of the optical article 100, the first boundary 160 between the first light-blocking zone 110 and the third light-blocking zone 112 is coincident with the first boundary 150 between the first and third optical regions 104, 106 along its entire length. Similarly, the second boundary 161 between the second light-blocking zone 111 and the third light-blocking zone 112 is coincident with the second boundary 151 between the second and third optical regions 105, 106 along its entire length.

Figure 8:
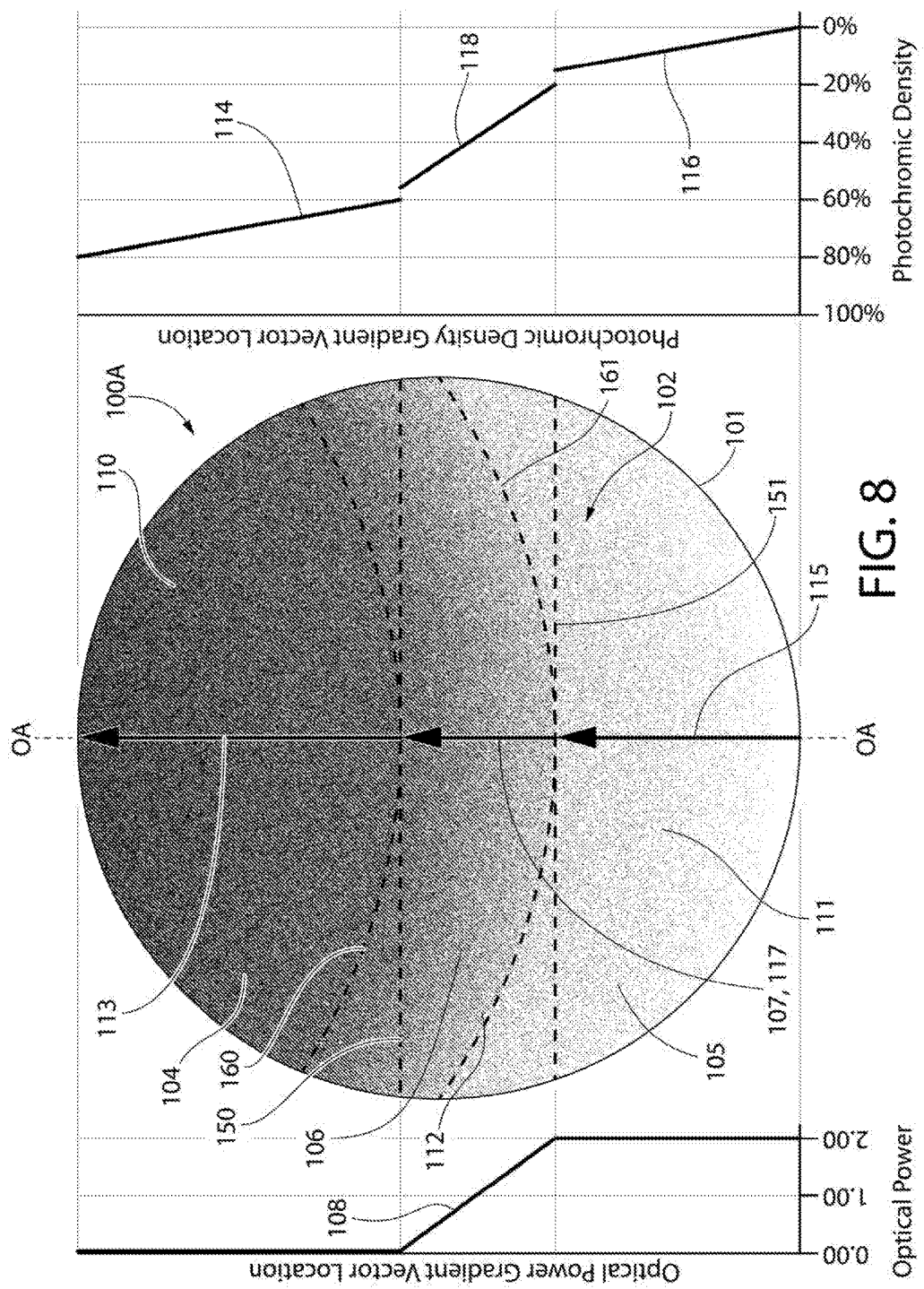
FIG. 8 is a schematic representation of an ophthalmic lens, in the form of a tri-focal lens, wherein a light-blocking composition has been applied in a pattern that is based on the optical power characteristics of the optical substrate according to a second embodiment of the present invention.
Figure 9:
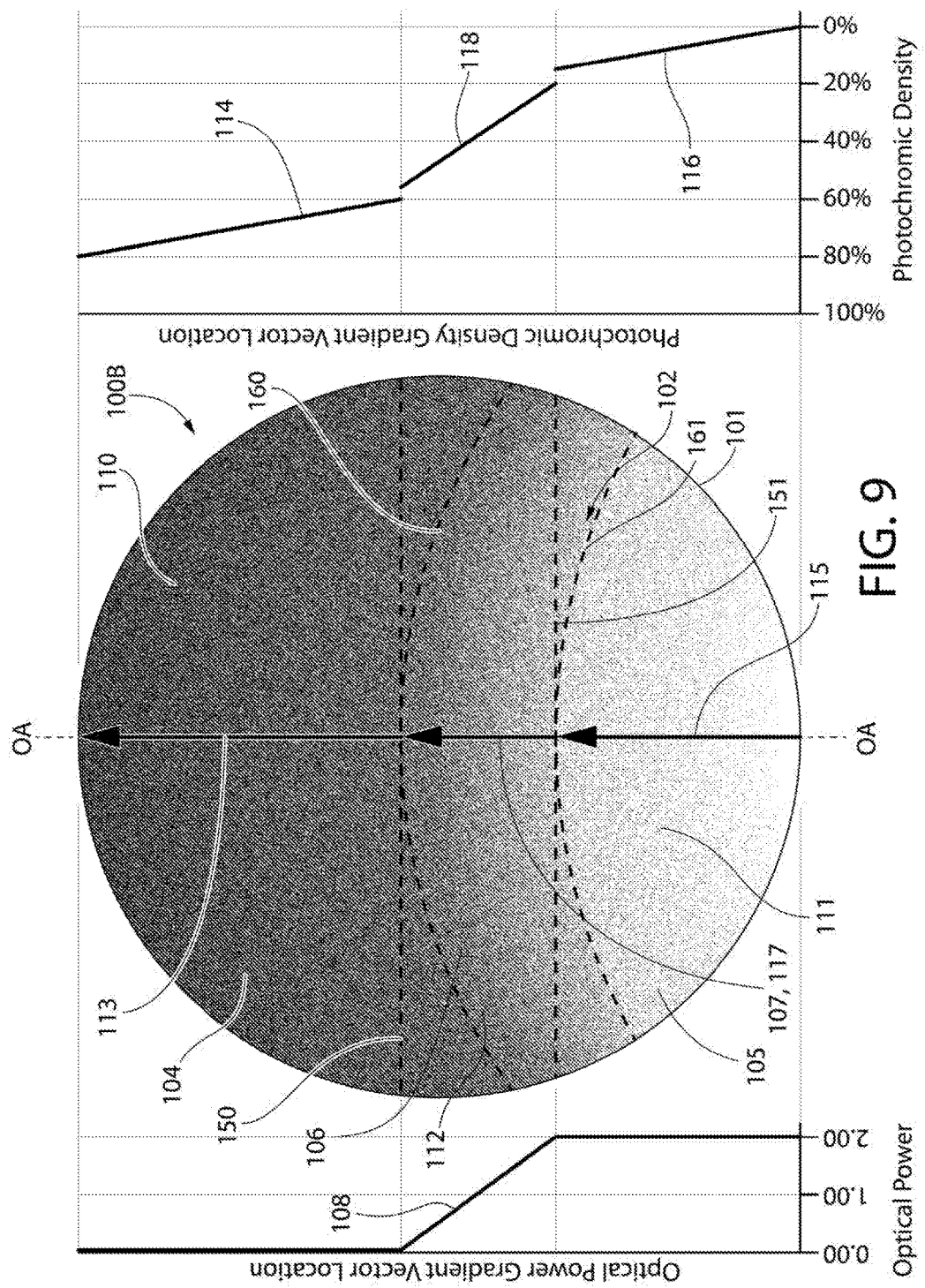
FIG. 9 is a schematic representation of an ophthalmic lens, in the form of a tri-focal lens, wherein a light-blocking composition has been applied in a pattern that is based on the optical power characteristics of the optical substrate according to a third embodiment of the present invention.

In other embodiments, the boundaries 160, 161 between the light-blocking zones 110-112 may not be coincident with the boundaries 150, 151 between the optical regions 104-106 along their entire length. In one such embodiment, the boundaries 160, 161 between the light-blocking zones 110-112 are coincident with the boundaries 150, 151 between the optical regions 104-106 along only a portion of their length. In one specific example, the boundaries 160, 161 between the light-blocking zones 110-112 are coincident with the boundaries 150, 151 at least along the optical axis OA. In another specific example, the boundaries 160, 161 between the light-blocking zones 110-112 are coincident with the boundaries 150, 151 only along the optical axis OA. Examples of such alternative embodiments are shown in FIGS. 8 and 9, wherein the same reference numbers are used as in FIG. 7 to identify like elements. As can be seen in FIGS. 8 and 9, the only difference between the optical articles 100A, 100B (as compared to the optical article 100 of FIG. 7), is that boundaries/interfaces 160, 161 between the light-blocking zones 110-112 are curved (rather than linear) and are only coincident with the boundaries 150, 151 between the optical regions 104-106 at points along the optical axis OA.

As can be seen from the graph on the right side of FIG. 7, the second average photochromic density of the second light-blocking zone 111 is less than the first average photochromic density of the first light-blocking zone 110. Moreover, the third photochromic density gradient of the third light-blocking zone 112 transitions from the first average photochromic density toward the second average photochromic density moving from the first optical region 104 toward the second optical region 105.

The photochromic composition 12 is applied in the first light-blocking zone 104 so as to have a first photochromic density gradient. In another embodiment, the photochromic composition 12 is applied in the first light-blocking zone 104 so as to have a uniform (i.e., constant) photochromic density along the optical axis OA for the length of the first light-blocking zone 104. The first photochromic density gradient fills the first light-absorbing zone 110 and extends along a first photochromic density gradient vector 113. In the exemplified embodiment, first photochromic density gradient has a linear gradient front and is a linear gradient (due to the linearity of the first photochromic density gradient vector 113). In another embodiment, the first photochromic density gradient has a non-linear gradient front (such as curved) and is a linear gradient. The first photochromic density gradient vector 113 is coincident with the optical axis OA.

The first photochromic density gradient has a first photochromic density gradient profile 114 which is illustrated in the upper portion of the graph on the right-side of FIG. 7. As can be seen, the first photochromic density gradient profile 114 is a linear function along the entirety of the first photochromic density gradient vector 113. The first photochromic density gradient has a first photochromic density range that, in the exemplified embodiment, extends from a minimum photochromic density of 60% to a maximum photochromic density of 80%. The first average photochromic density of the first light-blocking zone 110 is 70% in this example. The first photochromic density gradient profile 114 is measured along the first photochromic density gradient vector 113.

The photochromic composition 12 is applied in the second light-blocking zone 105 so as to have a second photochromic density gradient. In another embodiment, the photochromic composition 12 is applied in the second light-blocking zone 105 so as to have a uniform (i.e., constant) photochromic density along the optical axis OA for the length of the second light-blocking zone 105. The second photochromic density gradient fills the second light-absorbing zone 111 and extends along a second photochromic density gradient vector 115. In the exemplified embodiment, the second photochromic density gradient has a linear gradient front and is a linear gradient (due to the linearity of the first photochromic density gradient vector 113). In another embodiment, the second photochromic density gradient has a non-linear gradient front (such as curved) and is a linear gradient. The second photochromic density gradient vector 115 is coincident with the optical axis OA.

The second photochromic density gradient has a second photochromic density gradient profile 116 which is illustrated in the lower portion of the graph on the right-side of FIG. 7. As can be seen, the second photochromic density gradient profile 116 is a linear function along the entirety of the second photochromic density gradient vector 115. The second photochromic density gradient has a second photochromic density range that, in the exemplified embodiment, extends from a minimum photochromic density of 0% to a maximum photochromic density of 15%. The second average photochromic density of the second light-blocking zone 111 is 7.5% in this example. The second photochromic density gradient profile 116 is measured along the second photochromic density gradient vector 115.

The photochromic composition 12 is applied in the third light-blocking zone 106 so as to have a third photochromic density gradient. The third photochromic density gradient transitions from the first average photochromic density toward the second average photochromic density. Moving from the first optical region 104 toward the second optical region 105, the transition of the third photochromic density gradient is a decrease. Conversely, moving from the second optical region 105 toward the first optical region 104, the transition of the third photochromic density gradient is an increase.

The third photochromic density gradient fills the third light-absorbing zone 112 and extends along a third photochromic density gradient vector 117. The third photochromic density gradient vector 117 is coincident with the optical axis OA. The third photochromic density gradient vector 117 is also coincident with the optical power gradient vector 107 of the third optical zone 106.

In the exemplified embodiment, the third photochromic density gradient has a linear gradient front and is a linear gradient (due to the linearity of the third photochromic density gradient vector 117). In another embodiment, the third photochromic density gradient has a non-linear gradient front (such as curved) and is a linear gradient. The third photochromic density gradient has a third photochromic density gradient profile 118 which is illustrated in the middle portion of the graph on the right-side of FIG. 7. The third photochromic density gradient profile 118 is a linear function along the entirety of the third photochromic density gradient vector 117.

The third photochromic density gradient profile 118 corresponds to the optical power gradient profile 118. In one alternative embodiment, the first optical zone 104 has a nonuniform first optical power and, thus has a first optical power gradient. In such an embodiment, the first photochromic density gradient profile 114 corresponds to a first optical power gradient profile of the first optical power gradient. In addition to, or instead of in such an embodiment, the second optical zone 105 has a nonuniform second optical power and, thus has a second optical power gradient. In such an embodiment, the second photochromic density gradient profile 116 corresponds to a second optical power gradient profile of the second optical power gradient.

The third photochromic density gradient has a third photochromic density range that, in the exemplified embodiment, extends from a minimum photochromic density of 20% to a maximum photochromic density of 55%. The third average photochromic density of the third light-blocking zone is 37.5% in this example.

In one embodiment, the third photochromic density gradient has an average rate of change that is greater than the average rate of change of the second photochromic density gradient. In another embodiment, the third photochromic density gradient has an average rate of change that is greater than the average rate of change of the first photochromic density gradient. In a further embodiment, the third photochromic density gradient has an average rate of change that is greater than both the average rate of change of the second photochromic density gradient and the average rate of change of the first photochromic density gradient.

While each of the first, second, and third light-absorbing zones 110-112 of the optical article 100 comprises a single photochromic density gradient (i.e., only a primary photochromic density gradient), the photochromic composition can be applied so that one or more of the light-absorbing zones 110-112 include one or more secondary photochromic density gradients overlying the primary photochromic density gradient, such as discussed above for the optical article 60 of FIG. 6.

Figure 10:
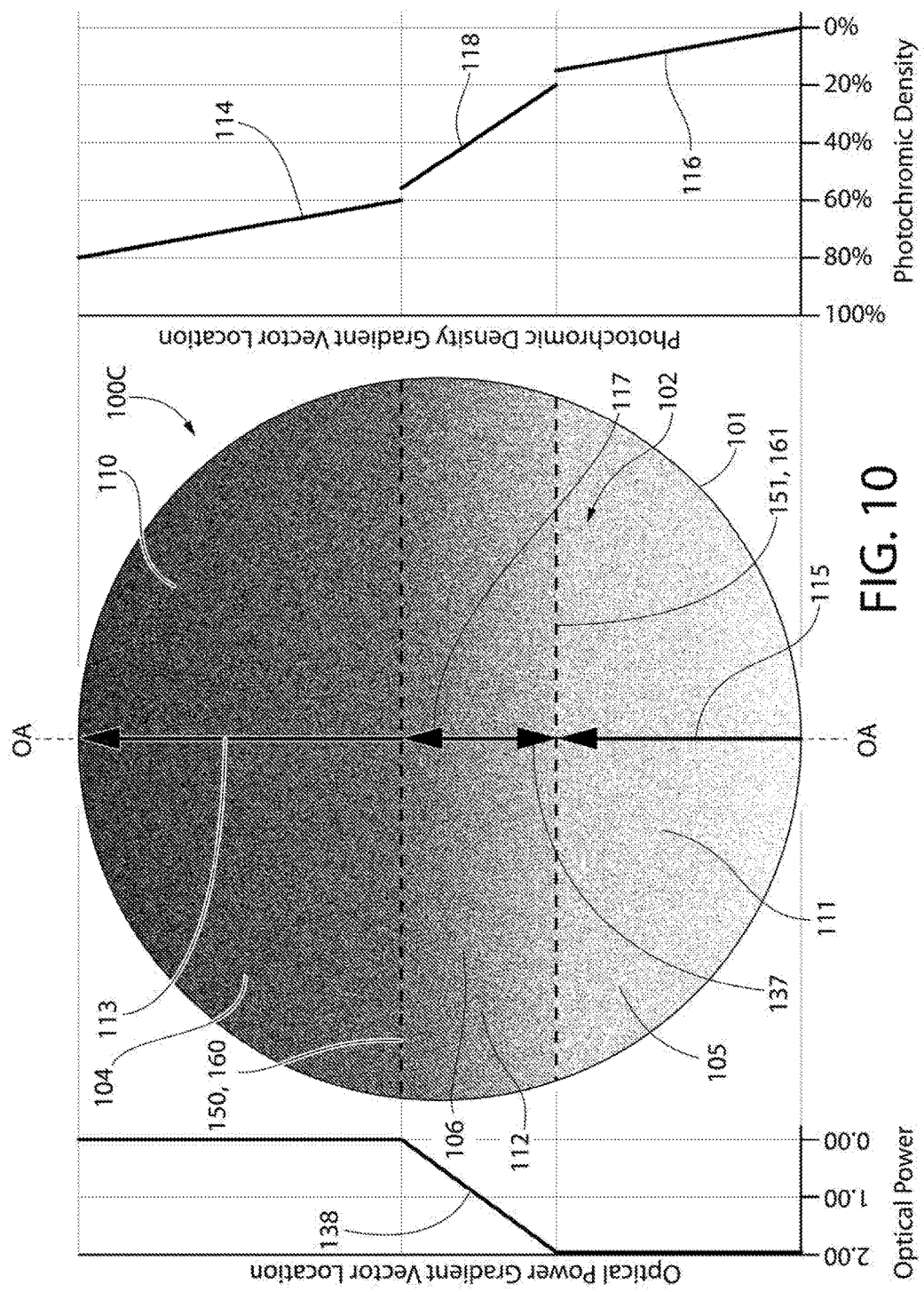
FIG. 10 is a schematic representation of an ophthalmic lens, in the form of a tri-focal lens, wherein a light-blocking composition has been applied in a pattern that is based on the optical power characteristics of the optical substrate according to a fourth embodiment of the present invention.

Referring now to FIG. 10, an optical article 100C is shown that is identical to the optical article 100 of FIG. 7, with the exception that the second average optical power of the second optical region 105 is less than the first optical power of the first optical region 104. Because the optical article 100C is identical to the optical article 100 in all regards other than its optical power configuration, the same reference numbers are used in FIG. 10 as in FIG. 7 to identify like elements. As can be seen from the optical power graph on the left side of FIG. 10, the second average optical power of the second optical zone 105 is greater than the first optical power of the first optical zone 104. As such, the optical power gradient of the third optical region 106 decreases moving from the second optical region 105 to the first optical region 104. As such, the optical power gradient vector 137 along which the optical power gradient of the third optical region 106 extends along the optical axis OA in an opposite direction of that of the third photochromic density gradient vector 117. Nonetheless, the optical power gradient of the third optical region has an optical power gradient profile 138 that corresponds to the photochromic density gradient profile 118. All other discussion set forth above with respect to the optical article 100 is applicable to the optical article 100C.

Figure 10A:
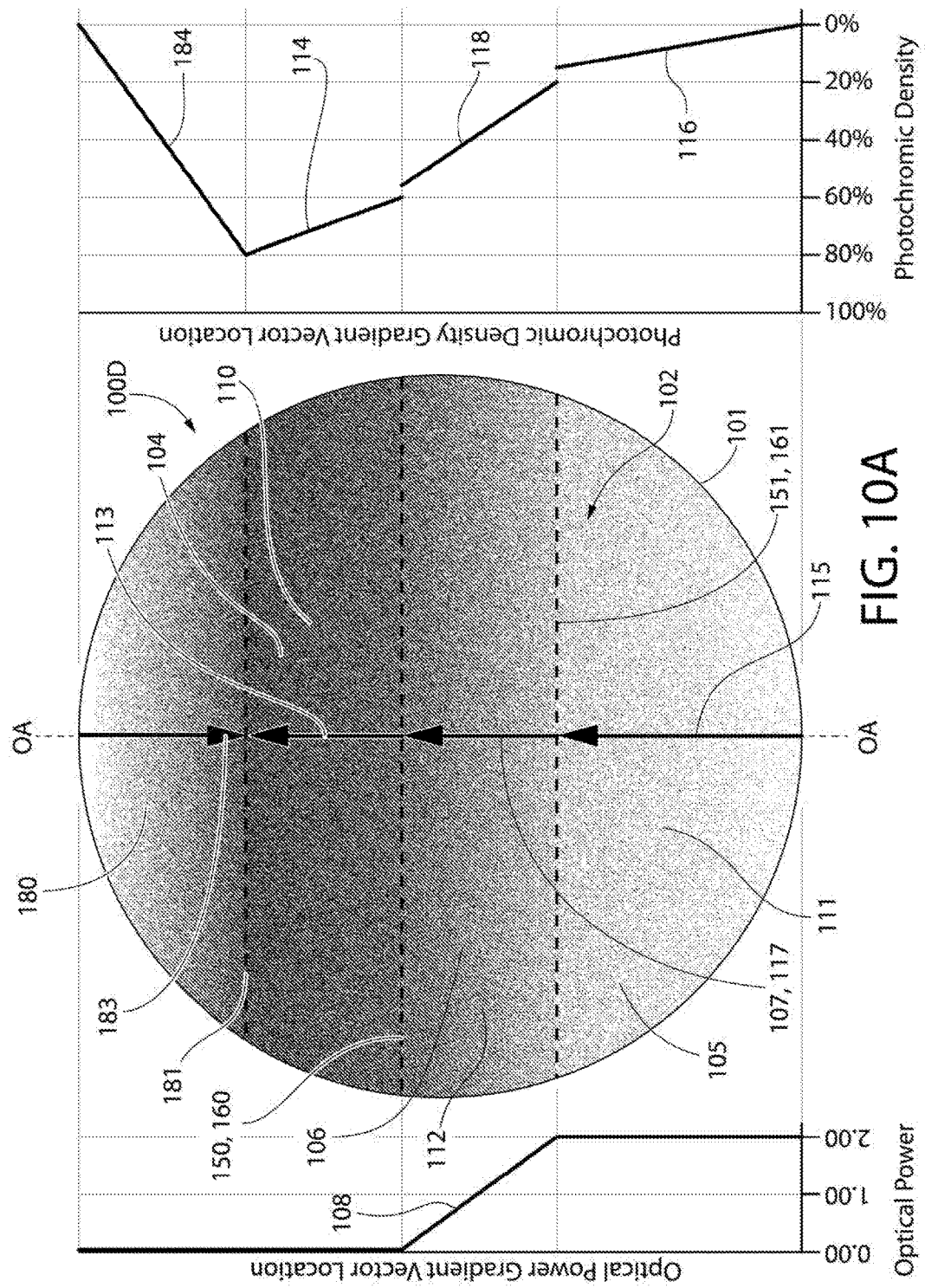
FIG. 10A is a schematic representation of an ophthalmic lens, in the form of a tri-focal lens, wherein a light-blocking composition has been applied in a pattern that is based on the optical power characteristics of the optical substrate according to a fifth embodiment of the present invention.

Referring now to FIG. 10A, an optical article 100D is shown that is identical to the optical article 100 of FIG. 7, with the exception that the photochromic material 102 has been applied so that the pattern comprises a fourth light-blocking region 180 that overlies a top portion of the first optical region 104. Because the optical article 100D is identical to the optical article 100 in all regards other than discussed below, the same reference numbers are used in FIG. 10 as in FIG. 7 to identify like elements. All other discussion set forth above with respect to the optical article 100 is applicable to the optical article 100D.

In the optical article 100D, both the first light-blocking region 110 and the fourth light-blocking region 180 overlie the first optical region 104. The first light-blocking region 110 and the fourth light-blocking region 180 are separated from one another by boundary 181. The photochromic material 102 of the first light-blocking region 180 has a photochromic density gradient that extends along a photochromic density gradient vector 183 and has a photochromic density gradient profile 184. As can be seen from the photochromic density graph on the right side of FIG. 10A, the photochromic density gradient of the fourth light-blocking region 180 decreases moving toward the top edge of the optical substrate 101. Thus, the photochromic density gradient vector 183 has an opposite direction of increase than each of the other photochromic density gradient vectors 115, 117, 113.

Additionally, the fourth light-blocking region 180 has an average photochromic density that is less than the average photochromic density of the first light-blocking region 110. By making the fourth light-blocking region 180 a region of lesser photochromic density, it provided an area at the top of the optical article 100D (in addition to the bottom) that allows the user to see through, while being subjected to a lesser degree by the color/tint/shade effect of the photochromic composition 102.

Figure 10B:
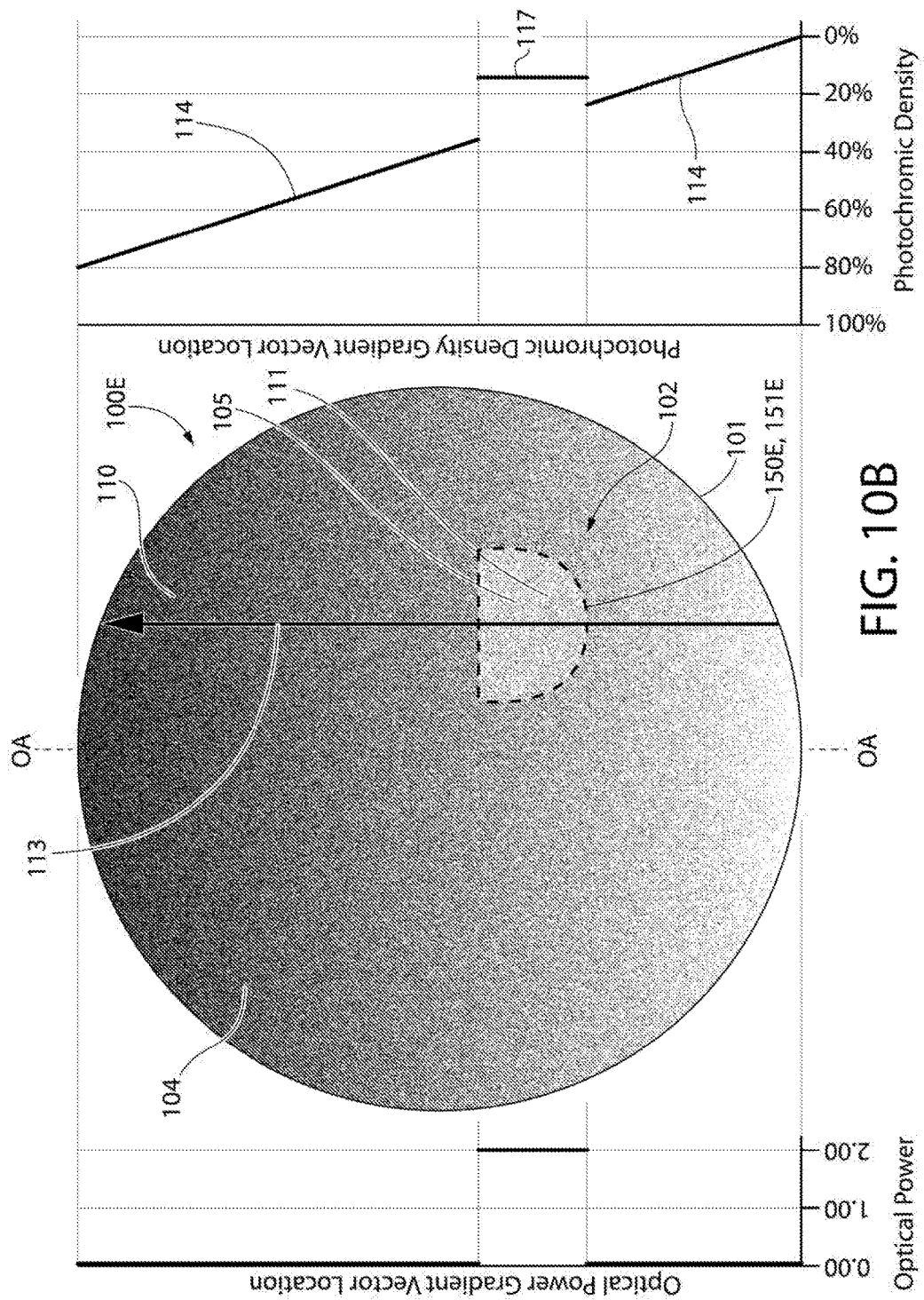
FIG. 10B is a schematic representation of an ophthalmic lens, in the form of a bi-focal lens, wherein a light-blocking composition has been applied in a pattern that is based on the optical power characteristics of the optical substrate according to a sixth embodiment of the present invention.

Referring now to FIG. 10B, an optical article 100E is shown that is identical to the optical article 100 of FIG. 7, with the exception that the optical substrate is a button-type bi-focal ophthalmic lens, and the photochromic material 102 has been applied to correspond with the revised position and location of the optical regions 104, 105. Because the optical article 100E is identical to the optical article 100 in all regards other than discussed below, the same reference numbers are used in FIG. 10 as in FIG. 7 to identify like elements. All other discussion set forth above with respect to the optical article 100 is applicable to the optical article 100E.

The optical substrate article 100E still comprises the first optical region 104 and the second optical region 105. However, the second optical region 105 is completely surrounded by the first optical region 104 on all sides. In one embodiment, the optical substrate 101 comprises a first component in which a second component (sometime referred to as a "button" in the art) is inserted. The second component forms the second optical region 105 while the first component forms the first optical region 104. In certain such embodiments, the interface between the first and second components is not completely smooth, such that a small lip/ridge exists. As a result, a spin coating method of applying the photochromic composition 102 is not possible.

In such a situation, the photochromic composition 102 is printed onto the optical substrate 101 as discussed below.

The photochromic composition 102 is printed onto the optical substrate 101 so that the first light-blocking region 110 is formed over the first optical region 104 and the second light-blocking region 111 is formed over the second optical region 105. A closed-geometry interface 150E is formed between the first and second light-blocking regions 110,111 and overlies the close-geometry interface 151E formed between the first and second components that form the first and second optical regions 104, 105 respectively. In an embodiment the closed-geometry interface 150E and the close-geometry interface 151E are substantially the same size and shape. In an embodiment they are not competently aligned on one or more of the sides, aspects and/or features. In an embodiment the miss alignment magnitude being less than 0.5, 1.0, 2.0, 3.0 mm.

The characteristics of the photochromic density gradients of the first and second optical regions 104, 105 can be garnered from the photochromic density graph on the right side of FIG. 10B while the optical power characteristics can be garnered form the optical power graph on the right side of FIG. 10B.

Figure 11:
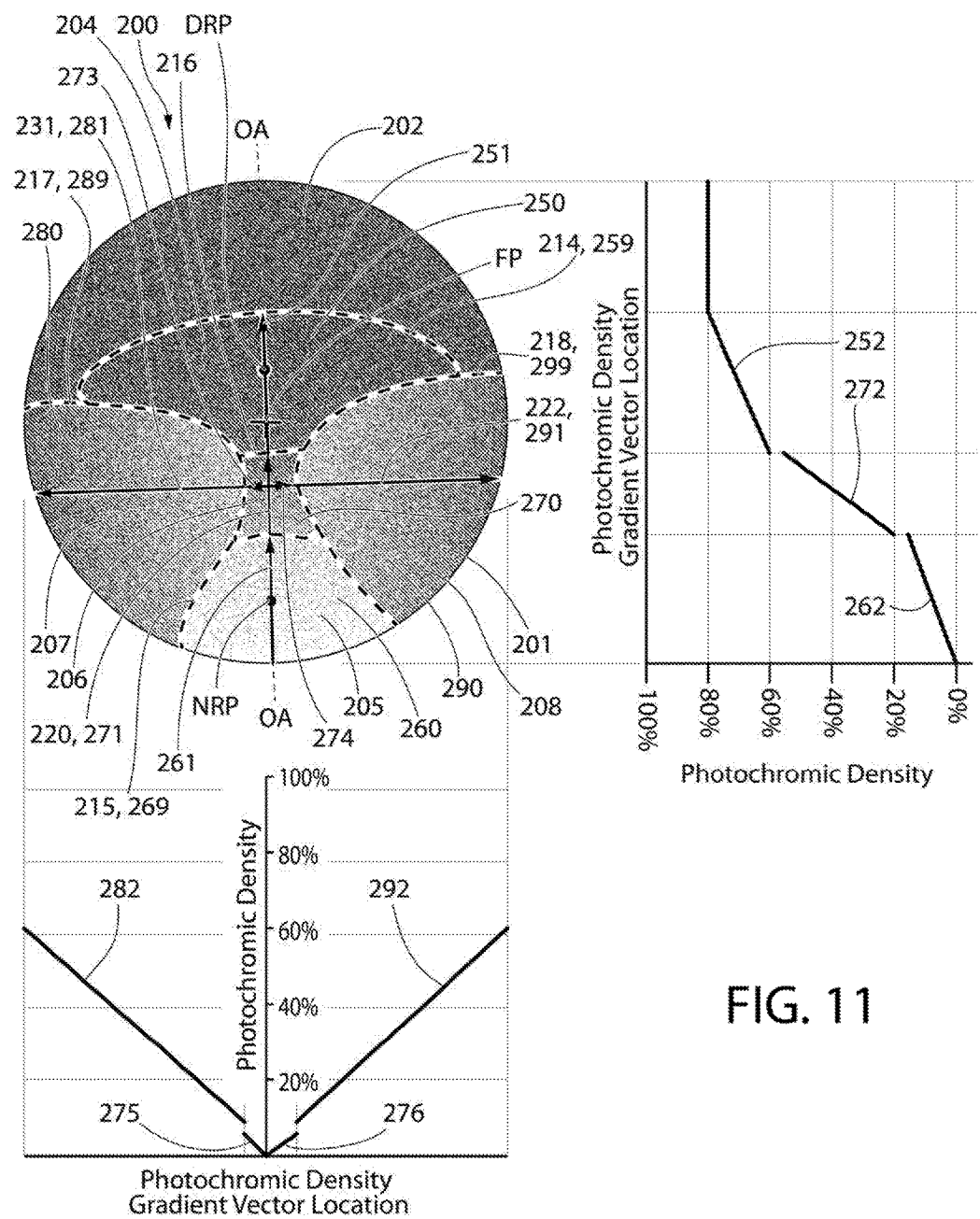
FIG. 11 is a schematic representation of an ophthalmic lens, in the form of a progressive lens, wherein a light-blocking composition has been applied in a pattern that is based on the optical power characteristics of the optical substrate according to an embodiment of the present invention.

Referring now to FIG. 11, an optical article 200, in the form of a vision-correcting progressive lens, is illustrated according to an embodiment of the present invention. The optical article 200 comprises an optical substrate 201 upon which a photochromic composition 202 has been applied in a multi-gradient pattern that is based on the different optical regions 204-208 of the optical substrate 201. More specifically, the optical substrate 201 comprises a first optical region 204, a second optical region 205, a third optical region 206 located between the first and second optical regions 204, 205, a fourth optical region 207 located on one side of the second and third optical regions 205, 206, and a fifth optical region 208 located on an opposite side of the second and third optical regions 205, 206.

The first optical zone 204 is defined by a first boundary 214. The second optical zone 205 is defined by a second boundary 215. The third optical zone 206 is defined by a third boundary 216. The fourth optical zone 207 is defined by a fourth boundary 217. The fifth optical zone 208 is defined by a fifth boundary 218. The boundaries 214-218 overlap (i.e., are coincident) for portions of their length, thereby defining interfaces between adjacent ones of the optical zones 204-208. It should be noted that while the first optical region 204 is shown as not extending to the top edge of the optical substrate 201, in another embodiment the first optical zone 204 can extend to the top edge of the optical substrate 201 so that the entirety of the optical substrate 201 is occupied by the optical zones 204-208.

The first optical region 204 is a distance viewing region located in an upper portion of the optical substrate for a user to look therethrough when viewing objects at a far distance. The second optical region 205 is a near viewing region located in a lower portion of the optical substrate 201 for the user to look therethrough when viewing objects that are in close proximity. The third optical region 206 is a transition viewing region (or an intermediate viewing region) that assists the user in transitioning between the near and distance viewing regions and/or viewing objects located at intermediate distances. The third optical region 206 is a progressive corridor extending between the near and distance viewing regions, and is located between the fourth and fifth optical regions 207, 208. As discussed in greater detail below, fourth and fifth optical regions 207, 208 are, respectively, first and second peripheral blending regions.

The optical substrate 201 further comprises an optical axis OA extending from a top edge of the optical substrate 201 to a bottom edge of the optical substrate 201. The optical axis OA extends through each of the first, second and third optical regions 204-206. The optical axis OA, as used herein, refers to the natural path along which the eye travels during normal viewing events when transitioning between the first, second, and third optical regions 204-206 (when the user is wearing the optical article 200 in eyeglasses or the like). A fitting point FP of the optical substrate 201 is located along the optical axis OA. The optical axis OA is slightly inclined relative to the vertical VA of the optical substrate 201.

The optical substrate 201 is a vision correcting progressive ophthalmic lens and, thus, has been configured so that each of the first, second, and third optical regions 204-206 provide the necessary vision correcting properties for the intended user, such as providing added optical power (which sometimes referred to as add power). The first optical region 204 has a first average optical power. The second optical region 205 has a second average optical power. The second average optical power is different than the first average optical power. In one embodiment, the second average optical power is greater than the first optical power. In another embodiment, the second average optical power is less than the first optical power. Whether the second average optical power is greater or less than the first optical power will depend on whether the user for which the optical article 200 is being created is farsighted or nearsighted. The third optical region 206 has a primary third optical power gradient that transitions from the first average optical power to the second average optical power. The primary third optical power gradient of the third optical region 206 extends along a primary third optical power gradient vector 220. The primary third optical power gradient vector 220 is coincident with the optical axis OA.

While an optical power graph is not illustrated on FIG. 11, the optical substrate 201 has an optical power configuration along the optical axis OA through the first, second, and third zones 204-206 that is identical to that which is shown in the optical power graph on the left side of FIG. 7 (and the alternatives discussed in relation thereto). In this embodiment, the first average optical power of the first optical zone 204 is greater than the second average optical power of the second optical zone 205 and, thus, the optical power gradient of the third optical region 206 increases moving from the second optical region 204 to the first optical region 204. The optical power gradient of the third optical region 206 has an optical power gradient profile 108 (see FIG. 7) (taken along the optical power gradient vector 220). The optical power gradient profile 108 of the optical power gradient of the third optical region 206, in this embodiment, is linear. In other embodiment, the optical power gradient profile 108 may take on other shapes, such as curved, hyperbolic, parabolic, linear, stepped, and combinations thereof. In a non-illustrated embodiment, the optical substrate 201 has an optical power configuration along the optical axis OA through the first, second, and third zones 204-206 that is identical to that which is shown in the optical power graph on the left side of FIG. 10.

The first and second optical zones, 204, 205 may have varying optical power and, thus comprise first and second optical power gradients respectively. In one such embodiment, the third optical power gradient of the third optical zone 206 will have an average rate of change that is greater than the average rate of change of the first optical power gradient. In another such embodiment, the third optical power gradient of the third optical zone 206 will have an average rate of change that is greater than the average rate of change of the second optical power gradient. In a further such embodiment, the third optical power gradient of the third optical zone 206 will have an average rate of change that is greater than both the average rate of change of the second optical power gradient and the average rate of change of the first optical power gradient.

The first optical region 204 (which is the distance viewing region) comprises a distance reference point DRP and the second optical region 205 (which is the near viewing region) comprises a near reference point NRP. The distance reference point DRP, the near reference point NRP, and the fitting point FP are located along (and thus intersected by) the optical axis OA. The third optical region 206 ends at or below the distance reference point DRP and at or above the near reference point NRP along the optical axis OA. As exemplified, the third optical region 206 ends at a position below the distance reference point DRP and at a position above the near reference point NRP along the optical axis OA.

While the optical power of the optical substrate 201 varies along the optical axis OA as discussed above, the optical substrate 101 has a substantially zero cylinder power along the optical axis OA. In the fourth and fifth optical regions 207, 208 (which are the blending regions), there is a substantial change in cylinder power across each of these regions (generally moving away from the optical axis OA). Specifically, the fourth optical region 207 comprises a first cylinder power gradient extending along a first cylinder power vector 232 and the fifth optical region 208 has a second cylinder power gradient extending along a second cylinder power vector 222. In one embodiment, the cylinder power of each of the first and second cylinder power gradients increases with distance from the optical axis OA for at least a portion of their length.

The photochromic composition 202 is applied to the front surface of optical substrate 201 in the form of a photochromic layer. The photochromic composition 202 is applied in a multi-gradient pattern. FIG. 11 shows this multi-gradient pattern as it appears when exposed to actinic energy. The multigradient pattern comprises: (1) a first light-blocking zone 250 that is formed over the first optical region 204 and that has a first average photochromic density; (2) a second light-blocking zone 260 formed over the second optical region 205 and that has a second average photochromic density; (3) a third light-blocking zone 270 formed over the third optical region 206 and that has a third photochromic density gradient; (4) a fourth light-blocking zone 280 formed over the fourth optical region 207; and (5) a fifth light-blocking zone 290 formed over the fifth optical region 208.

As can be seen from the graph on the right side of FIG. 11, the second average photochromic density of the second light-blocking zone 260 is less than the first average photochromic density of the first light-blocking zone 250. Moreover, the third photochromic density gradient of the third light-blocking zone 270 transitions from the first average photochromic density toward the second average photochromic density moving from the first optical region 250 toward the second optical region 260.

The photochromic composition 202 is applied in the first light-blocking zone 250 so as to have a first photochromic density gradient. In another embodiment, the photochromic composition 202 is applied in the first light-blocking zone 250 so as to have a uniform (i.e., constant) photochromic density along the optical axis OA for the length of the first light-blocking zone 250. The first photochromic density gradient fills the first light-absorbing zone 204 and extends along a first photochromic density gradient vector 251. In the exemplified embodiment, first photochromic density gradient has a linear gradient front and is a linear gradient (due to the linearity of the first photochromic density gradient vector 251). In another embodiment, the first photochromic density gradient has a non-linear gradient front (such as curved) and is a linear gradient. The first photochromic density gradient vector 251 is coincident with the optical axis OA.

The first photochromic density gradient has a first photochromic density gradient profile 252 which is illustrated in the upper middle portion of the graph on the right-side of FIG. 11. As can be seen, the first photochromic density gradient profile 252 is a linear function along the entirety of the first photochromic density gradient vector 250. The first photochromic density gradient has a first photochromic density range that, in the exemplified embodiment, extends from a minimum photochromic density of 60% to a maximum photochromic density of 80%. The first average photochromic density of the first light-blocking zone 250 is 70% in this example. The first photochromic density gradient profile 252 is measured along the first photochromic density gradient vector 251.

The photochromic composition 202 is applied in the second light-blocking zone 260 so as to have a second photochromic density gradient. In another embodiment, the photochromic composition 202 is applied in the second light-blocking zone 260 so as to have a uniform (i.e., constant) photochromic density along the optical axis OA for the length of the second light-blocking zone 260. The second photochromic density gradient fills the second light-absorbing zone 260 and extends along a second photochromic density gradient vector 261. In the exemplified embodiment, the second photochromic density gradient has a linear gradient front and is a linear gradient (due to the linearity of the first photochromic density gradient vector 261). In another embodiment, the second photochromic density gradient has a non-linear gradient front (such as curved) and is a linear gradient. The second photochromic density gradient vector 261 is coincident with the optical axis OA.

The second photochromic density gradient has a second photochromic density gradient profile 262 which is illustrated in the lower portion of the graph on the right-side of FIG. 11. As can be seen, the second photochromic density gradient profile 262 is a linear function along the entirety of the second photochromic density gradient vector 261. The second photochromic density gradient has a second photochromic density range that, in the exemplified embodiment, extends from a minimum photochromic density of 0% to a maximum photochromic density of 15%. The second average photochromic density of the second light-blocking zone 111 is 7.5% in this example. The second photochromic density gradient profile 262 is measured along the second photochromic density gradient vector 261.

The photochromic composition 202 is applied in the third light-blocking zone 270 in a pattern so as to have a primary third photochromic density gradient and first and second secondary third photochromic density gradients that overlie the primary third photochromic density gradient. The primary third photochromic density gradient transitions from the first average photochromic density toward the second average photochromic density. Moving from the first optical region 260 toward the second optical region 250, the transition of the primary third photochromic density gradient is a decrease. Conversely, moving from the second optical region 260 toward the first optical region 250, the transition of the primary third photochromic density gradient is an increase.

The primary third photochromic density gradient fills the third light-absorbing zone 270 and extends along a primary third photochromic density gradient vector 271. The primary third photochromic density gradient vector 271 is coincident with the optical axis OA. The primary third photochromic density gradient vector 271 is also coincident with the optical power gradient vector 220 of the third optical zone 206. Along the optical axis OA, the third light-blocking zone ends at or below the distance reference point DRP and at or above the near reference point NRP. In the illustrated embodiment, along the optical axis OA, the third light-blocking zone ends below the distance reference point DRP and above the near reference point NRP In the exemplified embodiment, the primary third photochromic density gradient has a linear gradient front and is a linear gradient (due to the linearity of the primary third photochromic density gradient vector 271). In another embodiment, the primary third photochromic density gradient has a non-linear gradient front (such as curved) and is a linear gradient. The primary third photochromic density gradient has a primary third photochromic density gradient profile 272 which is illustrated in the lower middle portion of the graph on the right-side of FIG. 11. The primary third photochromic density gradient profile 272 is a linear function along the entirety of the primary third photochromic density gradient vector 271.

The primary third photochromic density gradient profile 272 corresponds to the optical power gradient profile of the third optical zone 206. In one alternative embodiment, the first optical zone 204 has a nonuniform first optical power and, thus has a first optical power gradient. In such an embodiment, the first photochromic density gradient profile 252 corresponds to a first optical power gradient profile of the first optical power gradient. In addition to, or instead of in such an embodiment, the second optical zone 205 has a nonuniform second optical power and, thus has a second optical power gradient. In such an embodiment, the second photochromic density gradient profile 262 corresponds to a second optical power gradient profile of the second optical power gradient.

The primary third photochromic density gradient has a primary third photochromic density range that, in the exemplified embodiment, extends from a minimum photochromic density of 20% to a maximum photochromic density of 55%. The primary third average photochromic density of the third light-blocking zone is 37.5% in this example.

The first photochromic density gradient of the first optical zone 204 has a first photochromic density range (which is 20% in the example, namely 60%-80%). The second average photochromic density of the second optical zone 205 has a second photochromic density range (which is 15% in the example, namely 0%-15%). The primary third photochromic density gradient of the third optical zone 206 has a third photochromic density range (which is 35% in the example, namely 20%-55%). The primary third photochromic density range is greater than the first photochromic density range. The primary third photochromic density range is greater than the second photochromic density range.

The primary third photochromic density gradient has an average rate of change that is greater than the average rate of change of the second photochromic density gradient. In another embodiment, the primary third photochromic density gradient has an average rate of change that is greater than the average rate of change of the first photochromic density gradient. In a further embodiment, the primary third photochromic density gradient has an average rate of change that is greater than both the average rate of change of the second photochromic density gradient and the average rate of change of the first photochromic density gradient.

In addition to the primary third photochromic density gradient, the photochromic composition 202 is applied so that the third light-blocking zone 206 comprises two secondary photochromic density gradients that overlay the primary photochromic density gradient. Specifically, a first secondary third photochromic density gradient is formed that extends along a first secondary third photochromic density gradient vector 273, while the second secondary third photochromic density gradient extends along a second secondary third photochromic density gradient vector 274.

Each of the first and second secondary third photochromic density gradient vectors 273, 274 extend outward and away from the optical axis OA. In the illustrated embodiment, each of the first and second secondary third photochromic density gradient vectors 273, 274 extend substantially perpendicular to the optical axis OA. In other embodiments, each of the first and second secondary third photochromic density gradient vectors 273, 274 extend from the optical axis OA in an inclined manner.

Each of the first and second secondary third photochromic density gradient vectors 273, 274 is a linear gradient having a linear gradient front. The first secondary third photochromic density gradient has a first secondary third photochromic density gradient profile 275, as shown in the graph at the bottom of FIG. 11. The second secondary third photochromic density gradient has a second secondary third photochromic density gradient profile 276, as shown in the graph at the bottom of FIG. 11. The photochromic density of each of the first and second secondary third photochromic density gradients increase with distance from the optical axis OA for their entire length. In another embodiment, the photochromic density of each of the first and second secondary third photochromic density gradients increases with distance from the optical axis OA a first portion of their length and will then remain constant for a second portion of their length.

Each of the first and second secondary third photochromic density gradient is a "soft gradient" as compared to the primary third photochromic density gradient. In other words, each of the first and second secondary third photochromic density gradients has an average rate of change that is less than the average rate of change of the primary third photochromic density gradient.

As mentioned above, the photochromic composition 202 is applied to the optical substrate 201 so that a fourth light-blocking zone 280 is formed over the fourth optical region 207 and a fifth light-blocking zone 290 is formed over the fifth optical region 208. The photochromic composition 202 of the fourth light-blocking zone 280 comprises a fourth photochromic density gradient that extends along a fourth photochromic density gradient vector 281. The fourth photochromic density gradient vector 281 is coincident with the first cylinder power vector 221. The fourth photochromic density gradient has a fourth photochromic density gradient profile 282, as shown in the graph at the bottom of FIG. 11. As can be seen, the photochromic density of the fourth photochromic density gradient increases with distance from the optical axis OA.

The photochromic composition 202 of the fifth light-blocking zone 290 comprises a fifth photochromic density gradient that extends along a fifth photochromic density gradient vector 291. The fifth photochromic density gradient vector 291 is coincident with the second cylinder power vector 222. The fifth photochromic density gradient has a fifth photochromic density gradient profile 292, as shown in the graph at the bottom of FIG. 11. As can be seen, the photochromic density of the fifth photochromic density gradient increases with distance from the optical axis OA.

While each of the first, second, fourth, and fifth light-absorbing zones of the optical article 200 comprises a single photochromic density gradient (i.e., only a primary photochromic density gradient), the photochromic composition can be applied so that one or more of the first, second, fourth, and fifth light-absorbing zones include one or more secondary photochromic density gradients overlying the primary photochromic density gradient.

Figure 12A:
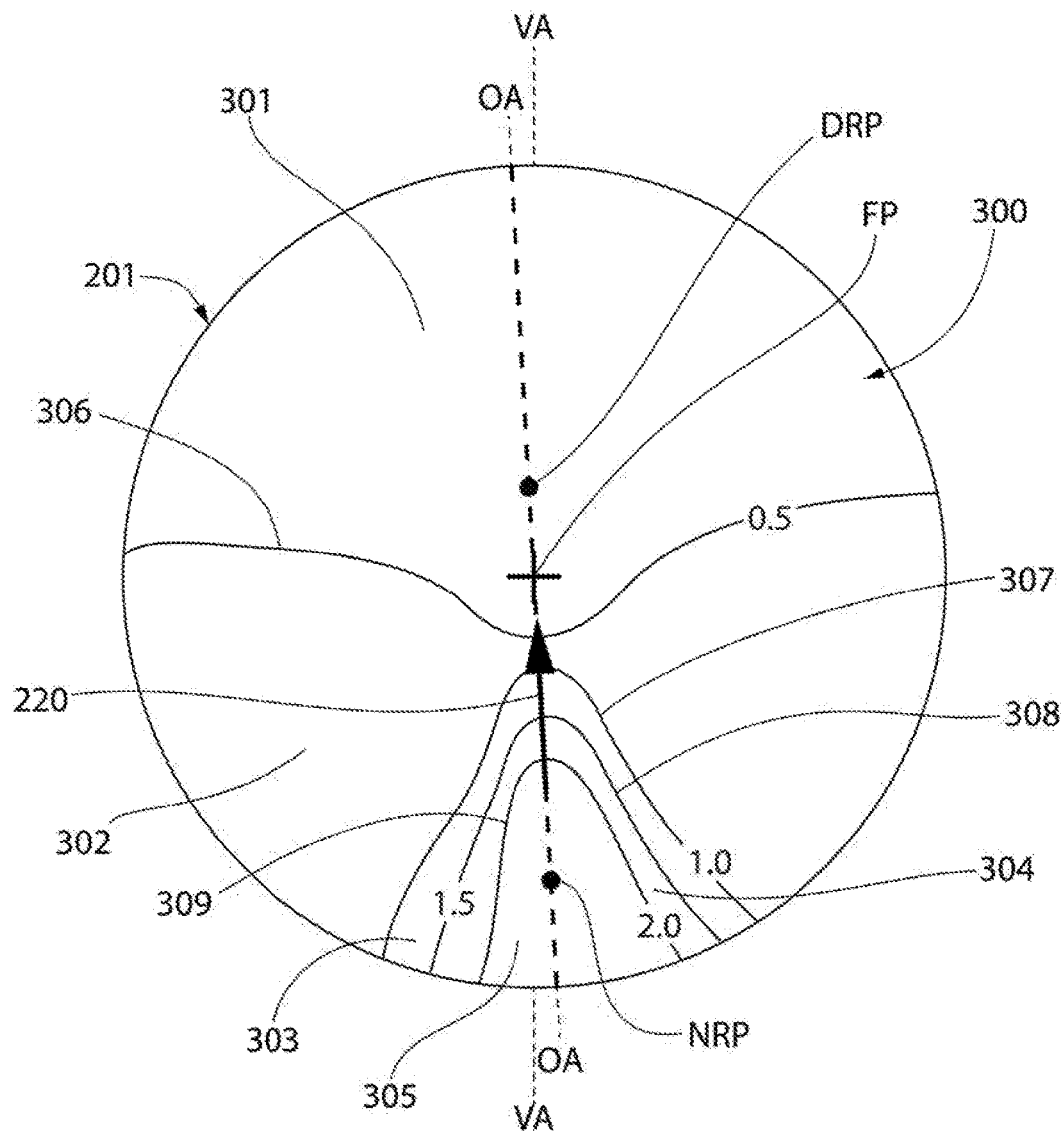
FIG. 12A is an optical power map of a vision-correcting optical substrate upon which the pattern in which a photochromic composition will be applied thereto is based, in accordance with an embodiment of the present invention.
Figure 12B:
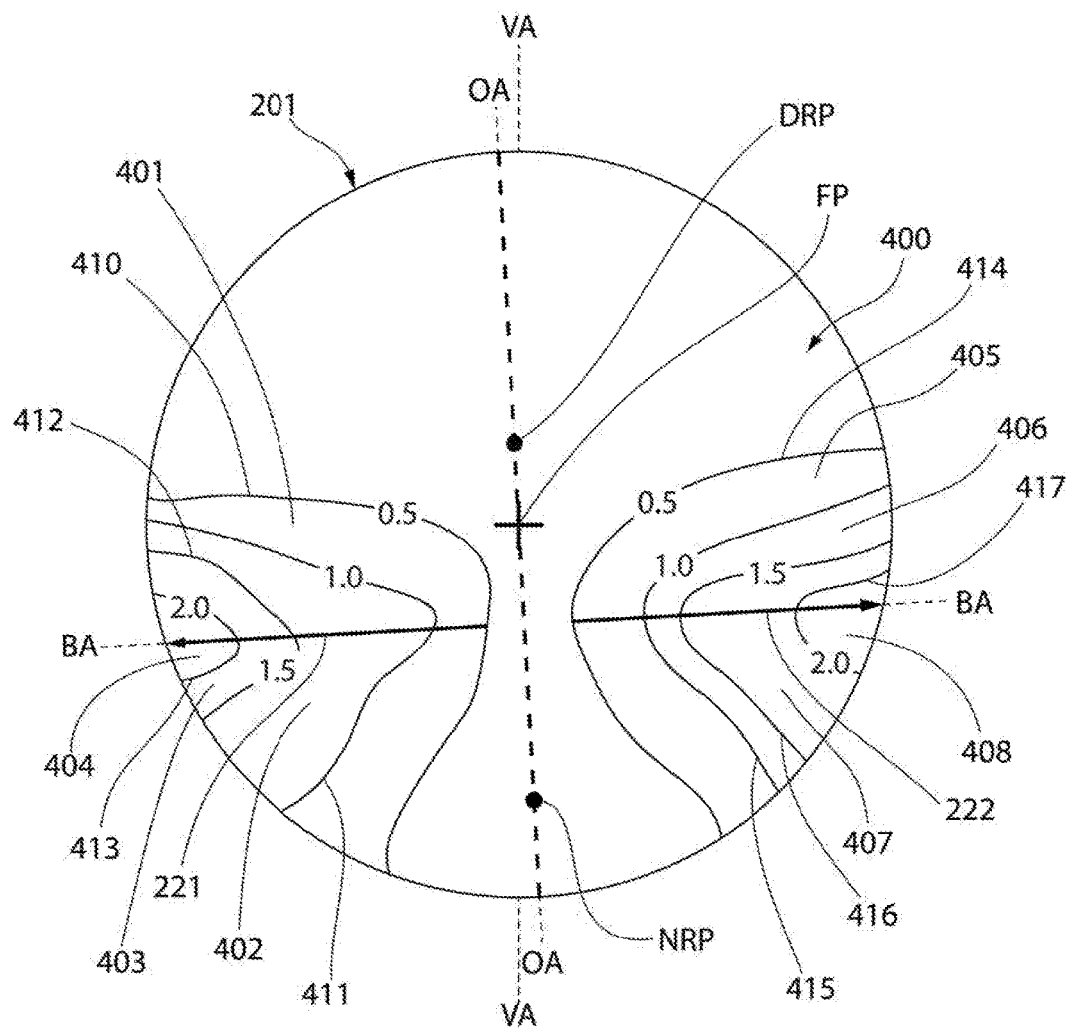
FIG. 12B is a cylinder power map of a vision-correcting optical substrate upon which the pattern in which a photochromic composition will be applied thereto is based, in accordance with an embodiment of the present invention.
Figure 12C:
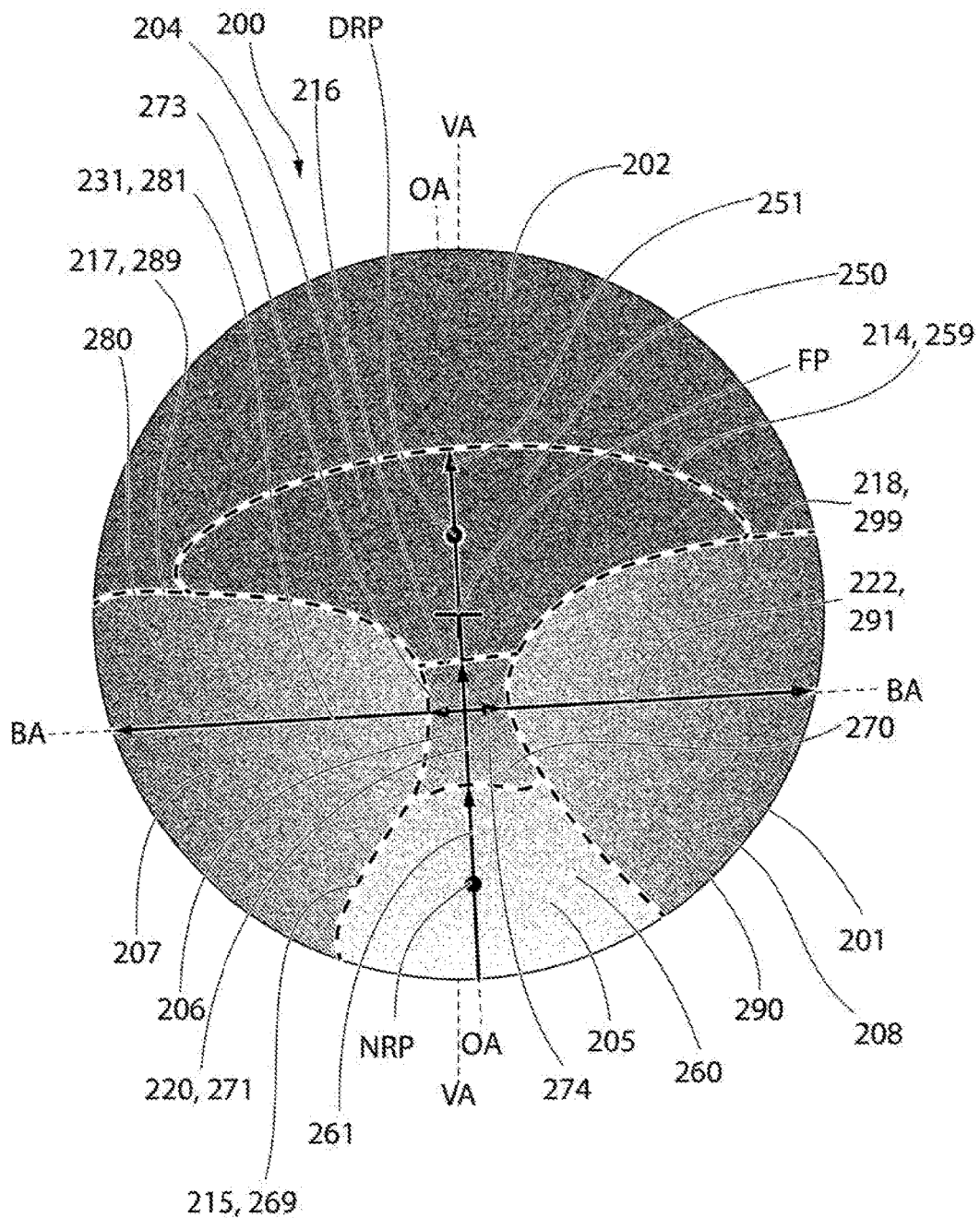
FIG. 12C is a schematic representation of the ophthalmic lens of FIG. 11, which has been formed using the optical power map of FIG. 12A and the cylinder power map of FIG. 12B, in accordance with an embodiment of the present invention.

Referring now to FIGS. 12A-C concurrently, a method according to the present invention by which the pattern in which a photochromic composition is determined and applied to an optical substrate to form an optical article will be described. As mentioned above, for each of optical articles 100, 100A-C, and 200, the photochromic composition is applied in a pattern that is based on the optical regions of the optical substrate (which are in turn dictated by the optical power characteristics needed to correct vision). The pattern in which photochromic composition is to be applied can be based on an optical power map and/or a cylinder power map of the optical substrate that is to be used to form the optical article (which is vision correcting ophthalmic lens). The optical power map of the optical substrate is dictated by the necessary vision correction data, as is determined by a healthcare professional, such as an optometrist or an ophthalmologist. Typical vision correction data that dictates the optical power map of a corrective ophthalmic lens includes spherical correction, amount of cylinder, axis, prism, base, pupillary distance, and back vertex distance. The formation of optical article 200 (of FIG. 11) based on its power map and cylinder map will be used as an example.

Referring solely now to FIG. 12A, based on the vision correction data received, the optical substrate 201 is formed so that it has the desired optical power properties, which can be represented by an optical power map 300. The optical substrate 201 may be formed by appropriately grinding one or more optical curves into a rear surface of a lens blank based on the vision correction data of the eyeglass prescription. Additionally, based on the vision correction data, reference points, such as the fitting point FP, near reference point NRP, distance reference point DRP, and the optical axis OA are also known and can be shown on the optical power map 300.

The optical power map 300 comprises a plurality of optical power zones 301-305. Each optical power zone 301-305 represents a region of the optical substrate 201 having a specific optical power (add or minus). These optical power values are shown along the boundaries 306-309 of the optical power zones 301-305. As a result of the location and shape of the optical power zones 301-305, the optical power gradient 220 is formed, which extends along (and defines) the progressive corridor.

Referring solely now to FIG. 12B, during the formation of the progressive optical substrate 201, unwanted cylinder power tends to exist in the peripheral regions of the optical substrate 201 (outside of the progressive corridor and main near and distance viewing regions, which are essentially free of unwanted cylinder power). The unwanted cylinder power is the result of creating the optical power gradient 220 in the progressive corridor. This unwanted cylinder power can cause unwanted image distortion (such as swim). Thus, the optical substrate 201 has a cylinder map 400. The cylinder map 400 comprises a plurality of cylinder power zones 401-408. Each cylinder power zone 401-408 represents a region of the optical substrate 201 having a specific cylinder power (or range of cylinder power). The boundaries 410-417 of the cylinder power zones 401-408 represent contours that join points of equal cylinder power magnitude, similar to the contours that join points of equal elevation in a topographic map. The zones 401-408 are typically sloped accordingly and form a continuous slope.

The cylinder power zones 401-404 can be considered a first group of cylinder power zones that forms the first blending region of the optical substrate 201 while the cylinder power zones 405-408 can be considered as a second group of cylinder power zones that forms the second blending region of the optical substrate 201. Of the first group of cylinder power zones 401-404, the cylinder power zone 404 has the maximum cylinder power. Similarly, of the second group of cylinder power zones 405-408, the cylinder power zone 408 has the maximum cylinder power. A blending axis BA extends between these maximum cylinder power zones 404, 408 (at or about their centers). The first group of cylinder power zones 401-404 collectively define a first cylinder power gradient that extends along the first cylinder power vector 221. The second group of cylinder power zones 405-408 collectively define a second cylinder power gradient that extends along the first cylinder power vector 222. Each of the first and second cylinder power vectors 221, 222 are coincident with the blending axis BA, but extend in opposite directions away from the optical axis OA. Each of the first and second cylinder power gradients have a cylinder power that increases with distance from the optical axis OA. In certain embodiments, each of the first and second cylinder power gradients have a cylinder power that increases with distance from the optical axis OA for a portion of its length and then decreases with distance from the optical axis OA for a different portion of its length along the blending axis BA.

Referring again to FIGS. 12A-C concurrently, once the optical substrate 201 is provided/formed (having the power map 300 and the cylinder map 400), the photochromic composition 202 is applied to the optical substrate 201 in a pattern that is based at least on the optical power map 300, as described in greater detail below. In the exemplified embodiment, the photochromic composition 202 is applied to the optical substrate 201 in a pattern that is based on both the optical power map 300 and the cylinder power map 400.

The photochromic composition 202 is applied to the optical substrate 201 in the pattern so that, upon exposure to an actinic energy, the plurality of light-blocking zones 250, 260, 270, 280, 290 are formed having photochromic density characteristics that are based on the plurality of optical power zones 301-305 of the optical power map 300 and the plurality of cylinder power zones 401-408 of the cylinder power map 400.

As can be seen by comparing (and overlaying) the power map 300 of FIG. 12A, the cylinder map 400 of FIG. 12 B, and the finished optical article 200 of FIG. 12C (which has the pattern of photochromic composition 202 applied thereto), it can be seen that boundaries 259, 269, 279, 289 and 299 of the plurality of light-blocking zones 250, 260, 270, 280, 290 are based on: (1) the location, shape, position and/or optical power characteristics of the optical power zones 301-305 (and their boundaries 306-309); and (2) the location, shape, position and/or cylinder power characteristics of the cylinder power zones 401-408 (and their boundaries 410-417).

It can be seen through comparison of FIGS. 12A and 12C that the photochromic composition 202 is applied to the optical substrate 201 so that the first light-blocking zone 250 only overlays the optical power zone 301. As can be seen, a lower-left portion of the boundary 259 of the first light-blocking zone 250 is delimited by the boundary 306 between the optical power zones 301, 302 and a lower-right portion of the boundary 259 of the first light-blocking zone 250 is also delimited by the boundary 306. The lower-left portion of the boundary 259 of the first light-blocking zone 250 is coincident with a left portion of the boundary 306 while the lower-right portion of the boundary 259 of the first light-blocking zone 250 is coincident with a right portion of the boundary 306. As can also be seen through comparison of FIGS. 12B and 12C, the lower-left portion of the boundary 259 of the first light-blocking zone 250 is also coincident with an upper portion of the boundary 410 of the cylinder power zone 401 while the lower-right portion of the boundary 259 of the first light-blocking zone 250 is coincident with an upper portion of the boundary 414 of the cylinder power zone 405.

Referring back to a comparison between FIGS. 12A and 12C, the photochromic composition 202 is applied to the optical substrate 201 so that a majority of the second light-blocking zone 260 overlays the optical power zone 305. As can be seen, both a left peripheral portion and a right peripheral portion of the boundary 269 of the second light-blocking zone 260 is delimited by the boundary 307 between the optical power zones 302, 303. The left peripheral portion of the boundary 269 of the first light-blocking zone 260 is coincident with a left peripheral portion of the boundary 307 while the right peripheral portion of the boundary 269 of the second light-blocking zone 260 is coincident with a right peripheral portion of the boundary 307. As can also be seen through comparison of FIGS. 12B and 12C, the left peripheral portion of the boundary 269 of the second light-blocking zone 260 is also coincident with a lower-right peripheral portion of the boundary 410 of the cylinder power zone 401 while the right peripheral portion of the boundary 269 of the second light-blocking zone 260 is coincident with a lower-left peripheral portion of the boundary 414 of the cylinder power zone 405.

Referring back to a comparison between FIGS. 12A and 12C, the photochromic composition 202 is applied to the optical substrate 201 so that the third light-blocking zone 270 (which may be considered a transition light-blocking zone) traverses a portion of each of the optical power zones 301-305 and has a left peripheral portion of its boundary 279 delimited by the boundary 410 of the cylinder power zone 401 and a right peripheral portion of its boundary 279 delimited by the boundary 414 of the cylinder power zone 405. As can also be seen through comparison of FIGS. 12B and 12C, the left peripheral portion of the boundary 279 of the third light-blocking zone 270 is coincident with a middle-right peripheral portion of the boundary 410 of the cylinder power zone 401 while the right peripheral portion of the boundary 279 of the third light-blocking zone 279 is coincident with a middle-left peripheral portion of the boundary 414 of the cylinder power zone 405.

Because the optical power changes across the optical power zones 301-305 along the optical axis OA, the primary third optical power gradient exists that extends along the primary third optical power gradient vector 220. The third light-blocking zone 270 is formed so as to have the primary third photochromic density gradient that extends along the primary third photochromic density gradient vector 271, which is coincident with the primary third optical power gradient vector 220 and, thus, traverses the plurality of the optical power zones 301-305

Referring to a comparison between FIGS. 12B and 12C, the photochromic composition 202 is applied to the optical substrate 201 to form: (1) a fourth light blocking zone 280 (which may be considered a first blending light-blocking zone) over the cylinder power zones 401-404; and (2) a fifth light blocking zone 290 (which may be considered a second blending light-blocking zone) over the cylinder power zones 405-408. The boundary 289 of the fourth light-blocking zone 280 is coincident with the boundary 410 of the cylinder power zone 401 along almost the entirety of its length. Because the cylinder power zone 401 is the outermost cylinder power zone of the first group of cylinder power zones 401-404, the boundary 410 may also be considered the outer boundary of a first cylinder blending region. The boundary 299 of the fifth light-blocking zone 290 is coincident with the boundary 414 of the cylinder power zone 405 along almost the entirety of its length. Because the cylinder power zone 405 is the outermost cylinder power zone of the second group of cylinder power zones 405-408, the boundary 414 may also be considered the outer boundary of a second cylinder blending region.

The fourth light-blocking zone 280 is formed so as to have a photochromic density gradient that extends along the fourth photochromic density gradient vector 281 that is coincident with the fourth cylinder power gradient vector 221 and, thus, traverses the first group of the cylinder power zones 401-404. The fifth light-blocking zone 290 is formed so as to have a photochromic density gradient that extends along the fifth photochromic density gradient vector 291 that is coincident with the fifth cylinder power gradient vector 223 and, thus, traverses the second group of the cylinder power zones 405-408.

While the example of FIGS. 12A-12C is directed to a multi-focus progressive lens. In other embodiments, the optical substrate may be other multi-focus lenses, such as a tri-focal lens or a bi-focal lens. In such embodiments, the optical substrate will have its own unique optical power map and cylinder power map to which the pattern in which the photochromic compositions is applied will be based.

Referring now to FIG. 13, an eyeglass prescription 500 according to an embodiment of the present invention is disclosed. As discussed above, a light-absorbing composition (such as a photochromic composition) can be applied to an optical substrate in a pattern that is based on the optical power properties and/or the cylinder power properties of the optical substrate. In one embodiment, this pattern may be dictated by data that is included as part of an eyeglass prescription. The eyeglass prescription may be issued by a healthcare professional, such as an optometrist or ophthalmologist. The eyeglass prescription 500 may be in the form of a printed document or an electronic file.

In the exemplified embodiment, the eyeglass prescription 500 includes both vision-correction data 510 and light-blocking data 520. In other embodiments, the eyeglass prescription 500 may not have vision-correction data 510 (which may be issued in a separate prescription) but will comprise the light-blocking data 520. In such an embodiment, despite the prescription 500 not containing vision-correction data 510, the light-blocking data 520 (and, thus the pattern in which the light-blocking composition is applied to the lens blank) may still be based on the optical power and/or cylinder power properties of the lens to be created from the lens blank (which in turn are based vision-correction data). The light-blocking data 520 may be generated by a healthcare professional or an end-user in certain embodiments.

The vision-correction data 510 includes all of the information needed to make a pair of eyeglasses. Typical vision correction data 510 may include spherical correction, amount of cylinder, axis, prism, base, pupillary distance, and, in some cases, back vertex distance, corridor length. The vision correction data 510 may also include the user/patient's name, age, and a healthcare professional's signature. The vision-correction data 510 is based on the healthcare professional's assessment of the end-user's vision impairment and how to correct the same. While the vision-correction data 510 is provided in the form of a data table, in other embodiments the may be provided in the form of an optical power map.

The vision correction data 510, once received by the laboratory, is used to select the proper lens blank and to grind the one or more optical curves into the lens blank that are necessary to correct the end user's vision. The properties and placement of the optical curves in the lens blank is based on the vision correction data 510. As a result of the optical curves being formed in the lens blank, the lens blank will have a plurality of optical regions having different optical powers and/or different cylinder powers.

A light-blocking composition is then applied to a front surface of the lens blank based on the light-blocking data 520 of the eyeglass prescription 500. In one embodiment, the light-blocking data 520 (and, thus the pattern in which the light-blocking composition is applied to the lens blank) is based on the healthcare professional's assessment of the end-user/patient's visual sensitivity to light. Alternatively, or in addition thereto, the light-blocking data 520 (and, thus the pattern in which the light-blocking composition is applied to the lens blank) is based on vision-correction data. Thought of another way, the light-blocking data 520 (and, thus the pattern in which the light-blocking composition is applied to the lens blank) is based on the properties of the optical regions, such as the optical power characteristics, the cylinder power characteristics, the boundaries, and combinations thereof.

In one embodiment, the light-blocking data 520 can be provided as a table setting forth information needed to generate the desired pattern in which the light-absorbing compositions is to be applied on the lens blank, and to apply the same. In the exemplified embodiment, the light-blocking data 520 includes information necessary to apply the light-absorbing composition to specific optical regions of the lens blank with prescribed light-absorbing characteristics, such as light-absorbing density, gradient, and profile. In order to achieve this, the light-blocking data 520 is given in reference to a reference point of the lens blank, which in the exemplified is the fitting point FP. In other embodiments, the reference point of the lens blank can be the near reference point, the distance reference point, the optical axis, the center point of the lens blank, the vertical axis, the horizontal axis, the datum line, and combinations thereof.

The light-blocking data 520 includes primary light-blocking data, in the form of a primary light-blocking data table, which provides the data required to create the primary light-blocking density gradients for the intended pattern of the light-blocking composition. In this embodiment, this is accomplished by dividing the surface of the lens blank to which the photochromic composition is to applied into a plurality of horizontal zones (which are bands that extend horizontally across the entirety of the lens blank). In the exemplified embodiment, the primary light-blocking data has the lens blank divided into three horizontal zones 1-3, which respectively correspond to the distance viewing region, the intermediate viewing region, and the near viewing region (similar to that discussed above for FIG. 7).

The vertical position of the upper and lower boundary of each of the horizontal zones 1-3, relative to the fitting point, is set forth in the primary light-blocking data table in the second column of the table. As can be seen, the horizontal zone 1 has an upper boundary located 20 mm above the fitting point and a lower boundary located 3 mm below the fitting point. The horizontal zone 2 has an upper boundary located 3 mm below the fitting point and a lower boundary located 15 mm below the fitting point. The horizontal zone 3 has an upper boundary located 15 mm below the fitting point and a lower boundary located 25 mm below the fitting point. In this embodiment, the upper and lower boundaries of the horizontal zones 1-3 are linear horizontal lines that extend perpendicular to the vertical axis of the lens blank. In other embodiments, however, the upper and lower boundaries of the horizontal zones 1-3 may be curved (such as is shown in FIGS. 8-9). In such an embodiment, the primary light-blocking data table would indicate the shape of the boundaries, such as by including a column with radius (or radii) of curvature. When the boundaries are curved and/or otherwise non-linear, the vertical distance of the boundaries from the fitting point would be given at a known location, such as along the optical axis or the vertical axis.

The primary light-blocking data table also provides, in column 3, the light-blocking density value at each of the upper and lower boundaries of all of the horizontal zones 1-3. For example, along the upper boundary of the horizontal zone 1, the light-absorbing composition has a light-absorbing density of 80%. Along the lower boundary of the horizontal zone 1, the light-absorbing composition has a light-absorbing density of 60%. Along the upper boundary of the horizontal zone 2, the light-absorbing composition has a light-absorbing density of 55%. Along the lower boundary of the horizontal zone 2, the light-absorbing composition, has a light-absorbing density of 20%. Along the upper boundary of the horizontal zone 3, the light-absorbing composition has a light-absorbing density of 10%. Along the lower boundary of the horizontal zone 3, the light-absorbing composition, has a light-absorbing density of 0%.

The primary light-blocking data table also provides, in column 4, the function type of the light-blocking density gradient profile of the light-blocking density gradient of each of the horizontal zones 1-3. For example, for the horizontal zone 1, the light-blocking composition is applied so as to have a primary light-blocking density gradient that has a linear light-blocking density gradient profile (extending from a 60-80% light-blocking density). For the horizontal zone 2, the light-blocking composition is applied so as to have a primary light-blocking density gradient that has a linear light-blocking density gradient profile (extending from a 20-5% light-blocking density). For the horizontal zone 3, the light-blocking composition is applied so as to have a primary light-blocking density gradient that has a linear light-blocking density gradient profile (extending from a 0-15% light-blocking density). In embodiments where the function type of the light-blocking density gradient profile is non-linear, an algorithm and/or equation can be provided. The data/values provided in the primary light-blocking data table may be considered primary light-blocking density mapping data.

The light-blocking data 520 also includes secondary light-blocking data, in the form of a secondary light-blocking data table, which provides the data required to create the secondary light-blocking density gradients for the intended pattern of the light-blocking composition. In this embodiment, this is accomplished by dividing the surface of the lens blank to which the photochromic composition is to be applied into a plurality of vertical zones (which are bands that extend vertically across the entirety of the lens blank). In the exemplified embodiment, the secondary light-blocking data has the lens blank divided into four vertical zones 1-4.

The vertical position of the nasal (inner) and temporal (outer) boundary of each of the vertical zones 1-4, relative to the fitting point, is set forth in the secondary light-blocking data table in the second column. As can be seen, the vertical zone 1 has a nasal boundary located 25 mm inward (toward the nasal) of the fitting point and a temporal boundary located 10 mm inward of the fitting point. The vertical zone 2 has a nasal boundary located 10 mm inward of the fitting point and a temporal boundary located at the fitting point. The vertical zone 3 has a nasal boundary at the fitting point and a temporal boundary located 10 mm outward (toward the temple) of the fitting point. The vertical zone 4 has a nasal boundary 10 mm outward of the fitting point and a temporal boundary located 25 mm outward of the fitting point. In this embodiment, the nasal and temporal boundaries of the vertical zones 1-4 are linear vertical lines that extend parallel to the vertical axis of the lens blank. In other embodiments, however, the upper and lower boundaries of the vertical zones 1-4 may be curved. In such an embodiment, the secondary light-blocking data table would indicate the shape of the boundaries, such as by including a column with radius (or radii) of curvature or an equation or function that the boundary follows. When the boundaries are curved and/or otherwise non-linear, the horizontal distance of the boundaries from the fitting point would be given at a known location, such as along the horizontal axis (or blending axis if one exists).

The secondary light-blocking data table also provides, in column 3, the light-blocking density value at each of the nasal and temporal boundaries of all of the vertical zones 1-3. For example, along the nasal boundary of the vertical zone 1, the light-absorbing composition has a light-absorbing density of 10%. Along the temporal boundary of the vertical zone 1, the light-absorbing composition has a light-absorbing density of 5%. Along the nasal boundary of the vertical zone 2, the light-absorbing composition has a light-absorbing density of 5%. Along the temporal boundary of the vertical zone 2, the light-absorbing composition has a light-absorbing density of 0%. Along the nasal boundary of the vertical zone 3, the light-absorbing composition has a light-absorbing density of 0%. Along the temporal boundary of the vertical zone 4, the light-absorbing composition has a light-absorbing density of 5%. Along the nasal boundary of the vertical zone 4, the light-absorbing composition has a light-absorbing density of 5%. Along the temporal boundary of the vertical zone 4, the light-absorbing composition has a light-absorbing density of 15%.

The primary light-blocking data table also provides, in column 4, the function type of the light-blocking density gradient profile of the light-blocking density gradient of each of the vertical zones 1-4. For example, for the vertical zone 1, the light-blocking composition is applied so as to have a secondary light-blocking density gradient that has a linear light-blocking density gradient profile (extending from a 5-10% light-blocking density). For the vertical zone 2, the light-blocking composition is applied so as to have a secondary light-blocking density gradient that has a linear light-blocking density gradient profile (extending from a 0-5% light-blocking density). For the vertical zone 3, the light-blocking composition is applied so as to have a secondary light-blocking density gradient that has a linear light-blocking density gradient profile (extending from a 0-5% light-blocking density). For the vertical zone 4, the light-blocking composition is applied so as to have a secondary light-blocking density gradient that has a linear light-blocking density gradient profile (extending from a 5-15% light-blocking density). In embodiments where the function type of the secondary light-blocking density gradient profiles is non-linear, an algorithm and/or equation can be provided. The data/values provided in the secondary light-blocking data table may be considered secondary light-blocking density mapping data.

Figure 14:
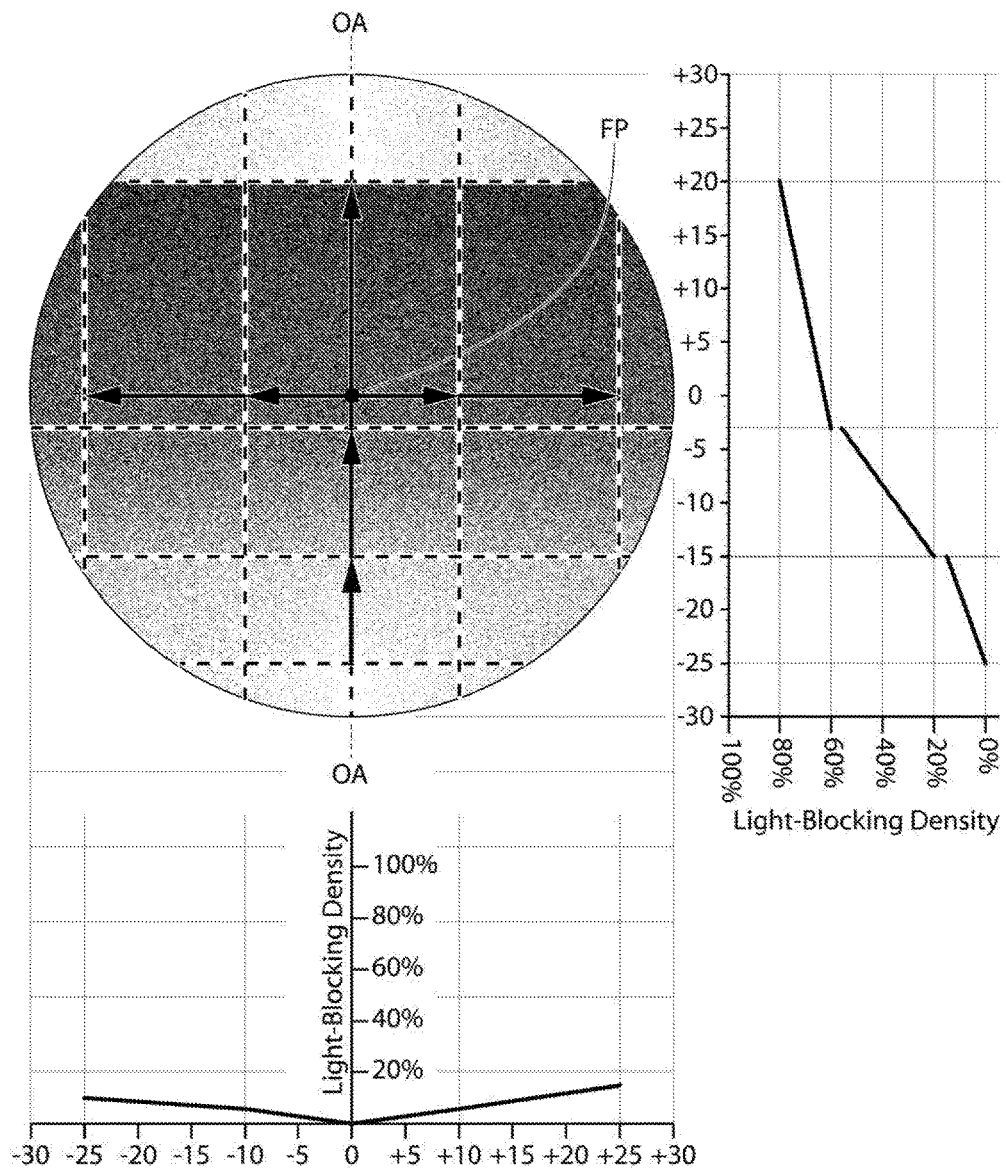
FIG. 14 is a schematic representation of an optical article made according to the eyeglass prescription of FIG. 13.

Referring now to FIG. 14, an optical article 550 is shown that has been created in accordance with the eyeglass prescription 500, including both the vision-correction data 510 and the light-blocking data 520. The lens blank has been modified (such as by grinding) to have the necessary optical power properties that form the vision-correcting regions, such as the distance viewing region, the intermediate viewing region, and the near viewing region. The light-blocking composition has been applied to the lens blank in accordance with the light-blocking data 520 of the eyeglass prescription 500. As can be seen, each of the upper and lower boundaries of the horizontal zones-13 and the nasal and temporal boundaries of the vertical zones 1-4 are shown as dotted lines. The light-blocking compositions is applied to the horizontal zones 1-3 and the vertical zones 1-4 in accordance with the primary and secondary light-blocking data tables respectively, as evidenced by the light-blocking density graphs of FIG. 15.

While the prescription 500 is written in terms of a general light-blocking composition, in one embodiment, the light-blocking composition is a color-changing composition. In an embodiment, the light-blocking composition is a photochromic composition. In another embodiment, the light-blocking composition is a thermochromic composition. In a further embodiment, the light-blocking composition is an electrochromic composition. In yet another embodiment, the light-blocking composition is a static color composition. In an embodiment, the light-blocking composition is a tint composition. In another embodiment, the light-blocking composition is a pigment composition.

Furthermore, while the prescription 500 is exemplified as being for a tri-focal ophthalmic lens, in other embodiments, the prescription 500 can be modified to direct the creation of any lens, including bi-focal lenses and progressive lenses, including without limitation any of the optical articles discussed above in relation to FIGS. 7-12C. In certain other embodiments, the prescription 500 may be for non-vision correcting lenses and, thus, may only include light-blocking data 520. In such instances, such light blocking data may be based on the user's sensitivity to light or a user's desired pattern for the light-blocking composition.

Figure 15:
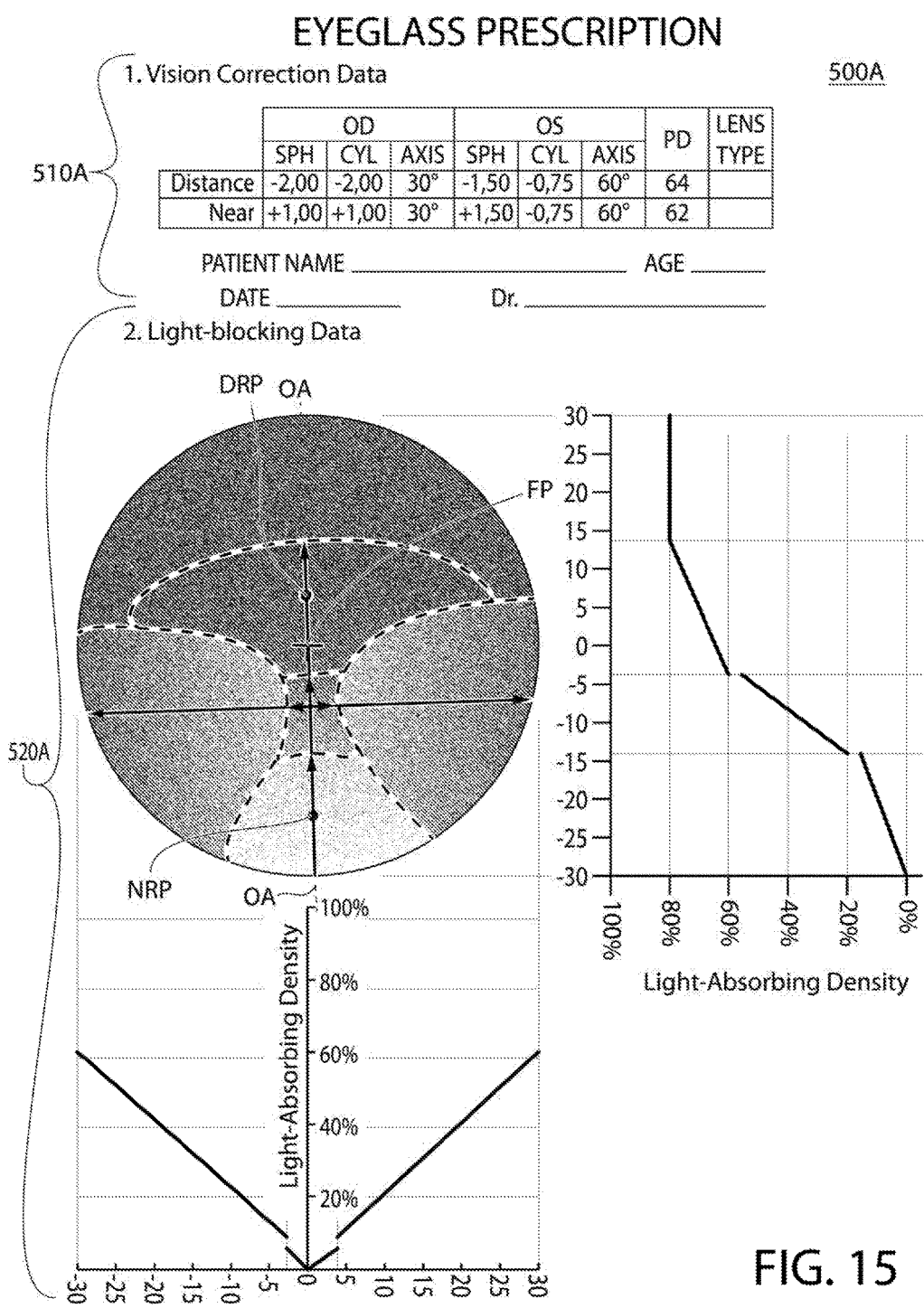
FIG. 15 is an eyeglass prescription that includes both vision-correction data and light-blocking data according to another embodiment of the present invention.

Referring now to FIG. 15, a second embodiment of an eyeglass prescription 500A is exemplified according to the present invention. The eyeglass prescription 500A is identical to the eyeglass prescription 500 with the exception that the light blocking data 520A is in the form of a pictorial representation and density graphs of the desired pattern in which the light-absorbing composition is to be applied rather than as data tables. In order to avoid duplication, only those aspects of the eyeglass prescription 500A that differ from the eyeglass prescription 500 will be described below with the understanding that the remainder of the discussion relating to the eyeglass prescription 500 (and its alternate embodiments) is applicable to the eyeglass prescription 500A. The eyeglass prescription 500A is for the creation of the optical article 200 discussed above in relation to FIGS. 11-12C.

As can be seen, the light-blocking data includes a pictorial representation of the lens blank with the light-blocking composition applied thereto in the desired pattern. The location of the light-blocking zones and the patterns in which the light-absorbing composition is applied within those zones can be garnered by the pictorial representation and the light-absorbing density graphs. As can be seen, the x and y position coordinates are centered on the fitting point FP, which acts as the 0,0 point. The position coordinate axes of the light-absorbing density graphs allow the person filling the prescription 500A to locate and define all of the necessary reference points that may be dictated and/or influenced by the vision-correction data 510A, such as the distance reference point DRP, the near reference point NRP, optical axis OA, and light-blocking zone boundaries (numbered ad discussed in relation to FIGS. 11 and 12C). The inclusion of the light-absorbing density gradient vectors (numbered and discussed in relation to FIGS. 11 and 12C), along with their light-absorbing density values and function type, in the light-absorbing density graphs allows the person filling the prescription 500A to create the desired pattern of the light-absorbing composition. The pictorial representation and the light-absorbing density graphs may be considered light-blocking density mapping data (both primary and secondary).

Alternative embodiments of light-blocking data that can be used in the prescriptions 500, 500A include a mathematical equation defining values over a line, or over an area, wherein the values define the light-absorbing density. Alternatively, a graphical description that defines the light-absorbing density values over a line, or over an area, may be used. In one such embodiment, the graphical description is chosen from a selection of pre-prepared graphical descriptions.

In certain embodiments of the prescription, the light-blocking data may be provided as a graph and map alongside a power map and graph (and/or a cylinder power graph or map). An example of this is shown in FIG. 16 as the light-blocking data 520C.

Irrespective of the format in which the vision-correcting data or the light-absorbing data is relayed, once the prescription is received by the optical laboratory, the lenses for the eyeglasses are made according to the prescription. Once the prescription is received by the optical laboratory, a lens blank is selected. Different lens blanks may have different curvature. Thus, in certain embodiments, the selection of the proper lens blank will be based on the vision correction data 510. Additionally, or alternatively, the selection of the proper lens blank may be based on the size and shape of the final lens that is to be formed.

Once the proper lens blank is selected, the lens blank will be modified so that it has the desired optical properties, such as having different optical regions having different optical power characteristics and/or different cylinder power characteristics. This may be accomplished by grinding one or more optical curves into a rear surface of a lens blank. The properties and placement of the optical curves ground into the lens blank may be based on the vision correction data.

Once the lens blank has the desired optical properties, the lens blank is aligned in the inkjet prior to printing. In some cases, as in progressive lens, there are reference points or markings on the lens that can be used for alignment. In other cases, such as with cylinder lens that are not progressive, there are no visible or invisible alignment marks on the lens blank. In order to align the lens blank prior to printing, they are inspected with a lensmeter or lensometer. The lensmeter or lensometer identify the cylinder axis and/or the fitting point and define the relevant optical axis and/or the printing direction.

Once properly aligned, the light-blocking composition is applied to the lens blank in accordance with the light-blocking data. In one embodiment, a light-blocking map is created based on the light-blocking data. The light-blocking map is a layout of the pattern in which the photochromic composition is to be applied to the lens blank, including the boundaries of the light-blocking zones, the shape of the light-blocking zones, the location of the light-blocking zones, and the light-absorbing density characteristics of the photochromic composition within the light-blocking zones. The light-blocking map may be generated manually or by a computer device that can process the light-blocking data, which may be provided in an electronic format.

Once the light-blocking map is generated, the light-blocking composition is applied to the front surface of the lens blank in accordance with the light blocking map. The lens blank may contain one or more additional coatings that are applied prior to and/or after the light-blocking composition. In one embodiment, the light-blocking composition is printed onto the front surface of the lens blank in accordance with the light blocking map. The printing process may be a non-contact printing process. One suitable non-contact printing process is an inkjet drop-on-demand printing process. In order to achieve light-absorbing density gradients required by the light-blocking data, the inkjet drop-on-demand printing process may be performed with a variable drop size printing process utilizing one or more greyscale printheads. Preferably, the light-blocking composition is printed to the front surface of the lens blank in a single pass. Additional details of the printing process will be discussed in greater detail below.

In some cases, the alignment in the inkjet printer is done with software. That is, the lens blank does not need to be physically rotated, but the desired pattern in which the light-absorbing compositions is to be applied on the lens blank, is rotated by the printer controller, such the optical path of the pattern is aligned with the optical path of the lens, as it is positioned in the inkjet printer.

As mentioned above, the pattern in which the light-blocking composition is to be applied to the lens blank in accordance with the light-blocking data is based on the optical properties of the lens blank. The light-blocking composition is printed onto the lens blank so that a plurality of light-blocking zones having different light-blocking density characteristics are overlaid on the plurality of optical regions formed into the lens blank, wherein the plurality of optical regions have different optical power characteristics and/or different cylinder power characteristics. In one embodiment of the aforementioned process, the optical article 200 of FIGS. 11 and 12C is formed. In other embodiments of the aforementioned process, any of the optical articles of FIGS. 7-10 are formed.

Referring now to FIGS. 17A-20B, a method of forming a light-blocking lens in accordance with an embodiment of the present invention is disclosed. The method of forming the light-blocking lens can be used in conjunction with the prescriptions 500, 500A (and corresponding method) discussed above. The method of forming the light-blocking lens will be described below in relation to the formation of a light blocking lens that includes the optical zones 204-208 and the pattern in which the photochromic composition 202 is applied to the optical substrate 201 for the optical article 200 of FIGS. 11 and 12C. In order to avoid redundancy, only certain details of the optical zones 204-208 and the pattern of the photochromic composition will be discussed below with the understanding that the additional details relating to the same can be garnered from FIGS. 11-12C and the corresponding discussion.

Figure 17A:
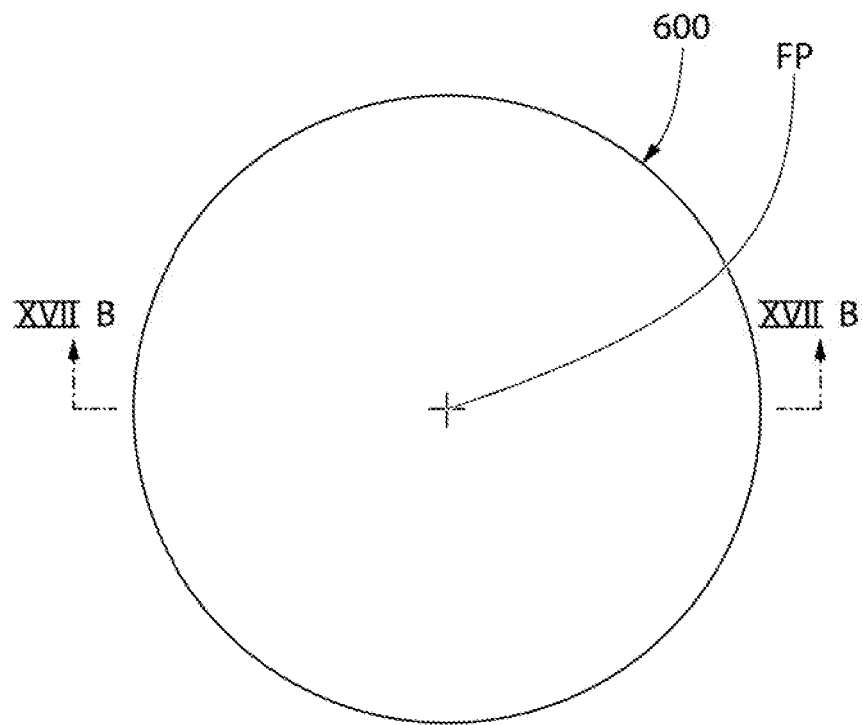
FIG. 17A is a front view of a lens blank.
Figure 17B:
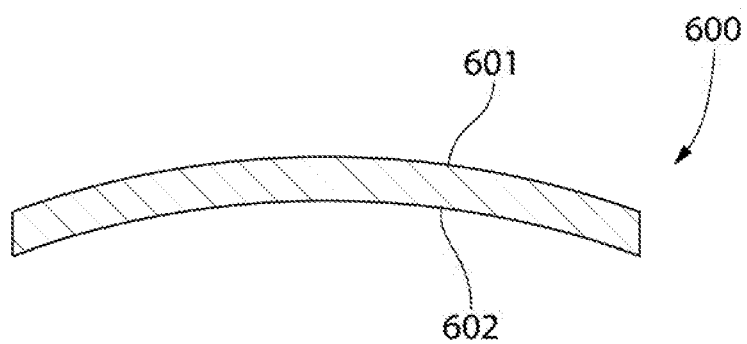
FIG. 17B is a cross-sectional view of the lens blank of FIG. 17A taken along view XVIIB.

Referring first to FIGS. 17A-B concurrently, a lens blank 600 is selected. Different lens blanks may have different curvatures. Thus, in certain embodiments, the selection of the proper lens blank will be based on the optical properties that are to be formed into the lens and/or the size and shape of the light-blocking lens that is to be formed. When the light-blocking lens is based on receiving a prescription (as discussed above), the lens blank 600 may be selected based on the eyeglass prescription as the vision-correcting data of the eyeglass prescription will dictate the optical properties that are to be formed into the lens.

The lens blank 600 may be formed of organic materials, inorganic materials, or combinations thereof (for example, composite materials). Specific, non-limiting examples of organic materials that may be used to form the lens blank 600 disclosed herein include polymeric materials, for example, homopolymers and copolymers, prepared from the monomers and mixtures of monomers. For example, such polymeric materials can be thermoplastic or thermoset polymeric materials, can be transparent or optically clear, and can have any refractive index required. Non-limiting examples of such disclosed monomers and polymers include: polyol(allyl carbonate)monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth) acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bismethacrylate monomers; urethane acrylate monomers; poly (ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates, and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products. Non-limiting examples of inorganic materials suitable for use in forming the lens blank 600 include glasses, minerals, ceramics, and metals. For example, the optical element can comprise glass.

The lens blank 600 has a convex front surface 601 and a convex rear surface 602. Once the proper lens blank 600 is selected, one or more optical curves will be ground into the rear surface 602 of the lens blank 600 based on the desired optical properties (i.e., vision-correcting properties) to be achieved. The location of the one or more optical curves is based on a reference and/or orientation indicia, such as the fitting point FP, a fitting cross, or a center point of the lens blank 600.

Figure 18A:
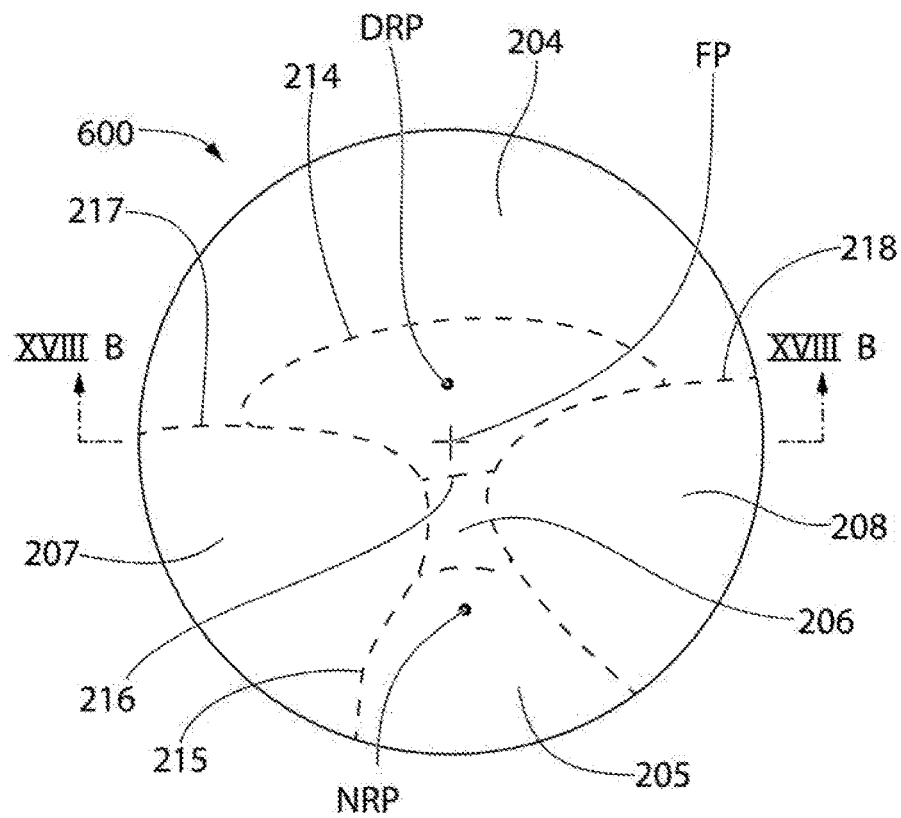
FIG. 18A is a front view of a lens blank in which one or more optical curves have been formed into the rear surface of the lens blank.
Figure 18B:
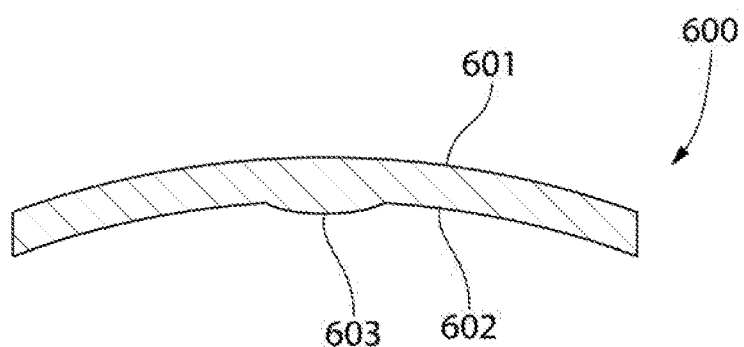
FIG. 18B is a cross-sectional view of the lens blank of FIG. 18A taken along view XVIIIB.

Referring now to FIGS. 18A-B concurrently, the lens blank 600 is illustrated wherein the one or more optical curves 603 have been formed into the rear surface 602. The location, size, and shape of the one or more optical curves 603 (along with the length of a progressive corridor and cylinder power locations in progressive lens embodiments) define the optical regions 204-208 (and their boundaries 214-218). These optical regions 204-208 include a distance viewing region 204, an intermediate viewing region 206, a near viewing region 205, and first and second blending regions 207-208. The optical power characteristics and the cylinder power characteristics of the optical regions 204-208 are as discussed above in relation to FIGS. 11-12C.

Figure 19A:
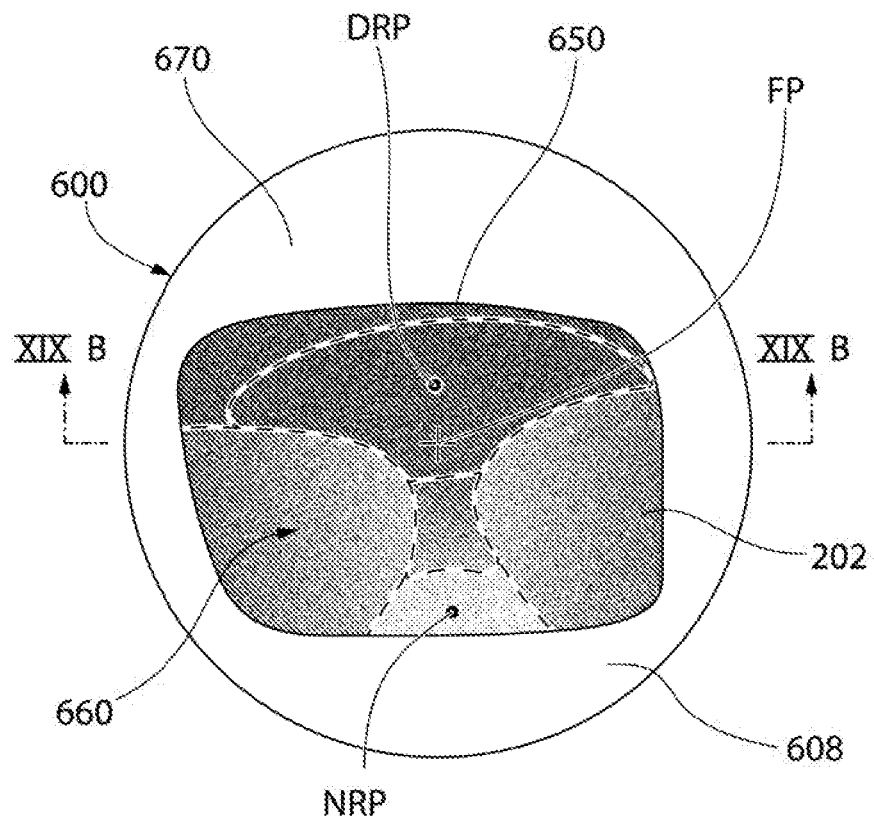
FIG. 19A is a front view of the lens blank of FIG. 18A with a photochromic composition printed on the front surface in a final lens zone, according to an embodiment of the present invention.
Figure 19B:
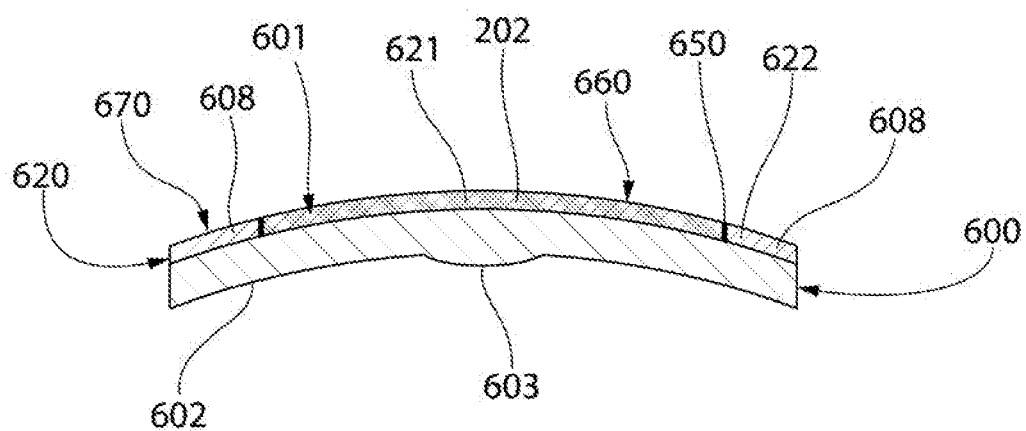
FIG. 19B is a cross-sectional view of the lens blank of FIG. 19B taken along view XIXB.

Referring now to FIGS. 19A-B, once the one or more optical curves 603 have been formed into the rear surface 602 of the lens blank, a coating 620 is printed onto the entirety of the front surface 601 of the lens blank 600. The coating 620 is printed to cover both a final lens zone 660 and a material removal zone 670.

The coating 620 comprises a light-blocking material (and thus can be considered a light-blocking composition 202) only in the final lens zone 660. The coating 620 is free of the light-blocking material in the material removal zone 670 (and thus can be considered a clear composition 608). In one specific embodiment, the portion 621 of the coating 620 in the final lens zone 660 comprises a light-blocking material and a clear base coat material (which acts as a carrier for the light blocking material) while, in the portion 622 of the coating 620 in the material removal zone 670 comprises only the clear base coat material. Despite having a difference compositional make-up in the final lens zone 660 and the material removal zone 670, the coating 620 has a substantially constant thickness across the entirety of the lens blank 600.

Examples of suitable clear base coat material includes CrystalChrome™ from SDC Technologies and Foto Klear™ from Exxene Corporation. In an embodiment, a base coat with photochromic properties is obtained by dissolving a photochromic material, such as the photochromic materials described above, and dissolving it in 10 to 90% by weight solvent, such as aromatics, alcohols, ketones, aldehydes, alphatics, chlorinated solvents, ethers, esters and the like.

In the exemplified embodiment, the light-blocking composition 202 is printed onto the front surface 601 in the final lens zone 650 while the entirety of the material removal zone 660 of the lens blank is free of a light-blocking composition 202. In other embodiments, the light-blocking composition 202 is printed in the final lens zone 650 and also printed on a small portion of the material removal zone 660. In one such an embodiment, at least a majority of the material removal zone 670 is free of the light-blocking composition 202 (or any light-blocking composition). In another such embodiment, substantially all (at least 95%) of the material removal zone 670 is free of the light-blocking composition 202 (or any light-blocking composition).

The final lens zone 660 is defined by a perimeter 650 that is sized and shaped to match a lens opening of the eyeglass frame into which the light-blocking lens 675 is to be fitted. The eyeglass frame is previous selected by the end user and, thus, the size and shape of the lens opening of the eyeglass frame is predetermined and known. By printing the light-blocking composition 202 only in the final lens zone 660, waste of the light-blocking composition 202 is minimized and/or eliminated. As disused in greater detail below, the material removal zone 670 is edged away and discarded. Thus, any light-blocking composition 202 in the material removal zone 670 is ultimately wasted.

The pattern in which the light-blocking composition 202 is printed within the final lens zone 660 is based on the optical zones 204-208 and their optical power properties and cylinder power properties. For additional details on the pattern in which the light-blocking composition 202 is printed within the final lens zone 660 and its relation to the optical zones 204-208, reference is made to the discussion above for FIGS. 11-12C.

In one embodiment, the coating 620 (including the light-blocking composition 202 and the clear composition) is printed on the lens blank in a single printing pass. The printing may be a non-contact printing process. One suitable non-contact printing process is an inkjet drop-on-demand printing process. In order to achieve light-absorbing density gradients within the final lens zone 660, the inkjet drop-on-demand printing process may be performed with a variable drop size printing process utilizing one or more greyscale printheads.

The printer used to print the coating may be coupled to a computer device connected to a display. In one such arrangement, a virtual final lens zone will be generated on the computer device that corresponds to the final lens zone 650 of the lens blank 606. The computer device will also generate a light-blocking map (which is the pattern in which the light-blocking composition 202 is to be applied) based on the optical properties of the optical zones 204-208, which may have been dictated by a prescription as discussed above. The light-blocking map is then associated with the virtual final lens zone on the computer device. The light-blocking composition 202 is then printed on the front surface 601 of the lens blank 600 in accordance with the virtual final lens zone and the associated light-blocking map. In generating the light-blocking map and the virtual final lens zone, the computer device may rely on a reference point, such as the fitting point and/or other orientation indicators.

Figure 20A:
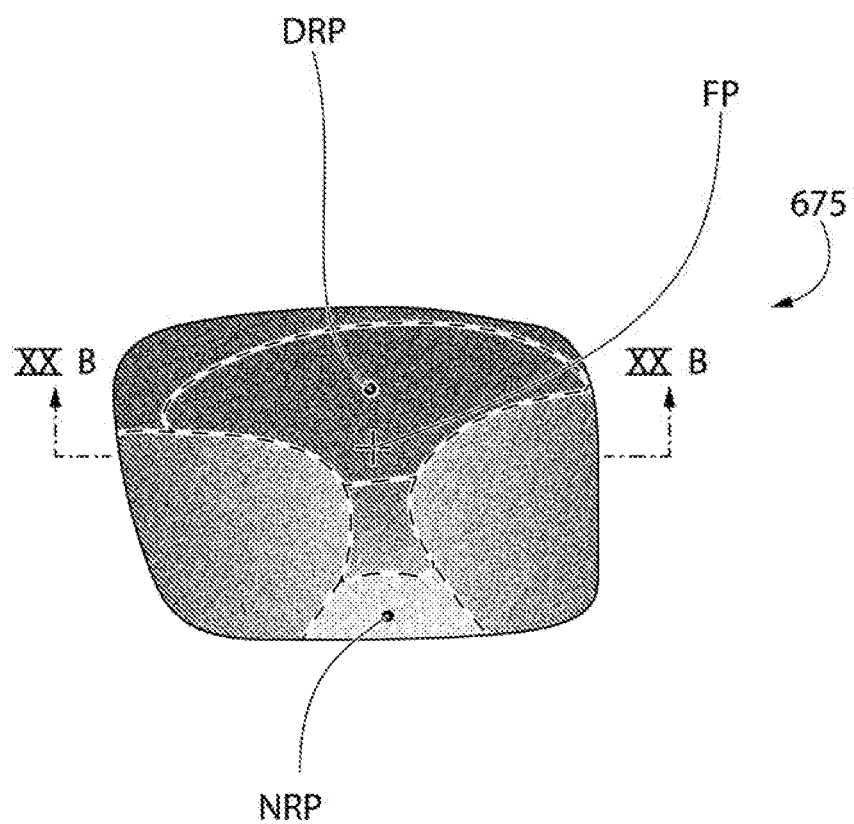
FIG. 20A is a front view of a light-blocking lens formed by edging the lens blank of FIG. 19A about the perimeter of the final lens zone, according to an embodiment of the present invention.
Figure 20B:
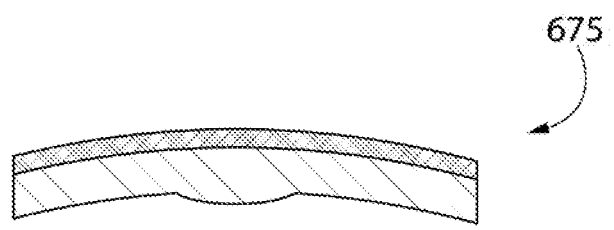
FIG. 20B is a cross-sectional view of the light-blocking lens of FIG. 18B taken along view XXB.
Figure 35:
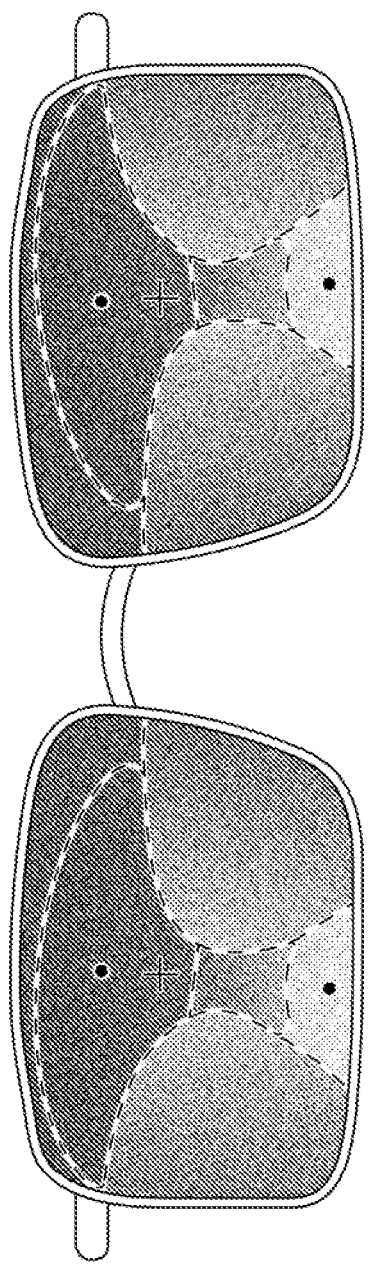
FIG. 35 is a pair of eyeglasses that includes the light-blocking lens of FIG. 20A according to an embodiment of the present invention.

Referring now to FIGS. 20A-B concurrently, once the coating 620 is printed onto the substrate as discussed above, the lens blank is edge about the perimeter 650 of the final lens zone 660, thereby removing the material removal zone 670. As a result, the light-blocking lens 675 is formed that is sized and shaped to match the lens opening of the frame of the selected eyeglasses (see FIG. 35). As shown in FIG. 35, the light-blocking lens 675 is positioned within the eyeglass frame so that the near viewing region is below the distance viewing region. Thought of another way, for each frame opening, the near viewing region of each of the light-blocking lenses 675 is adjacent a bottom of it respective the eye rim.

Figure 21:
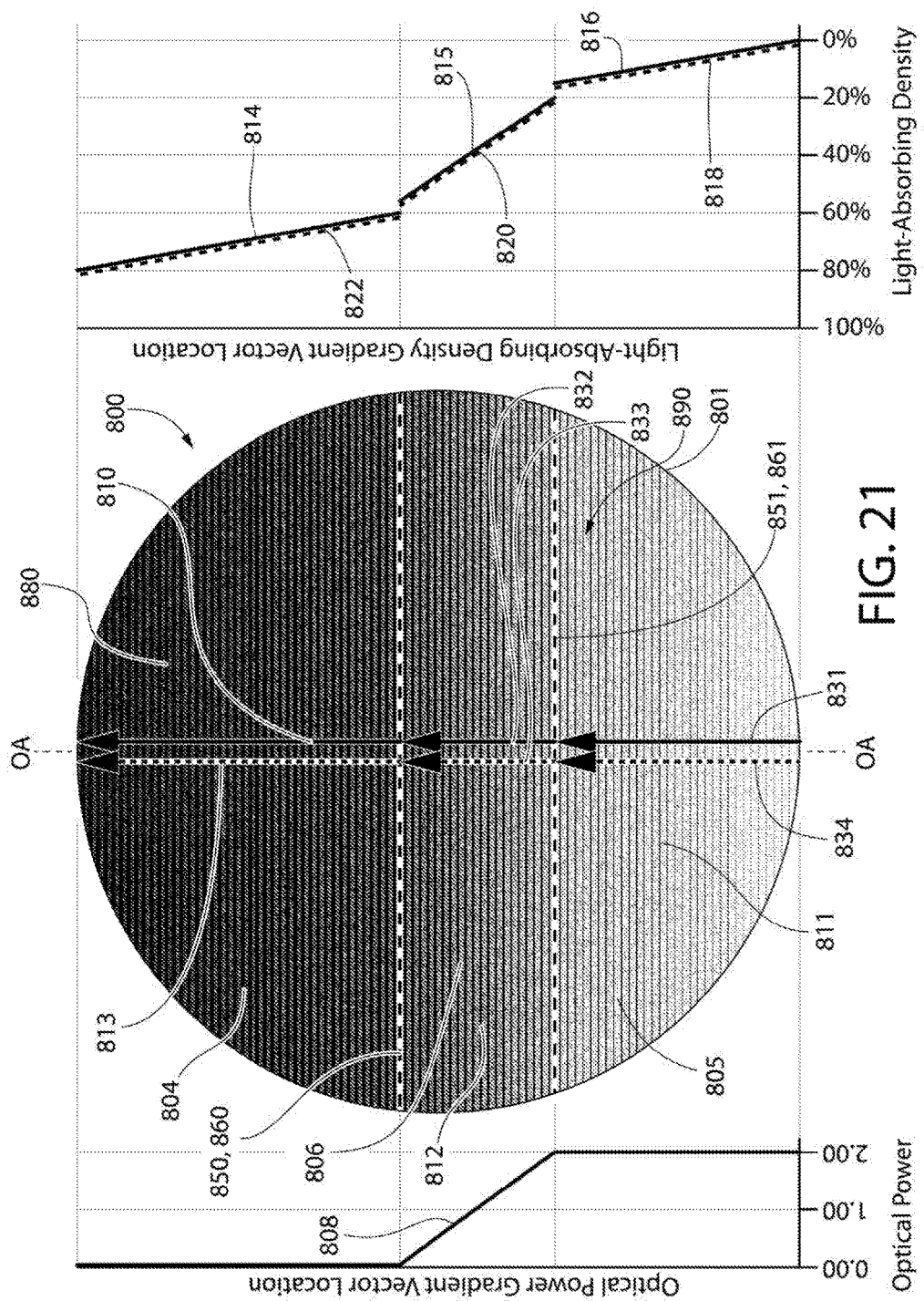
FIG. 21 is a schematic representation of an ophthalmic lens, in the form of a tri-focal lens, having a light-blocking layer comprising first and second light-blocking compositions that are activated by different types of activation energy that have been applied in a pattern that is based on the optical power characteristics of the optical substrate according to an embodiment of the present invention.
Figure 23:
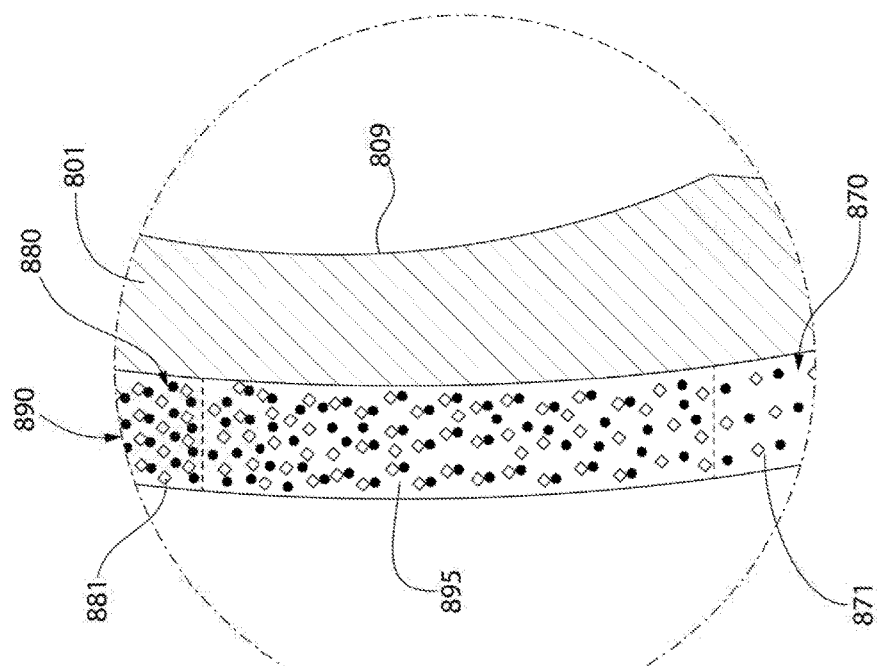
FIG. 23 is a close-up of area XXIII of FIG. 22.
Figure 22:
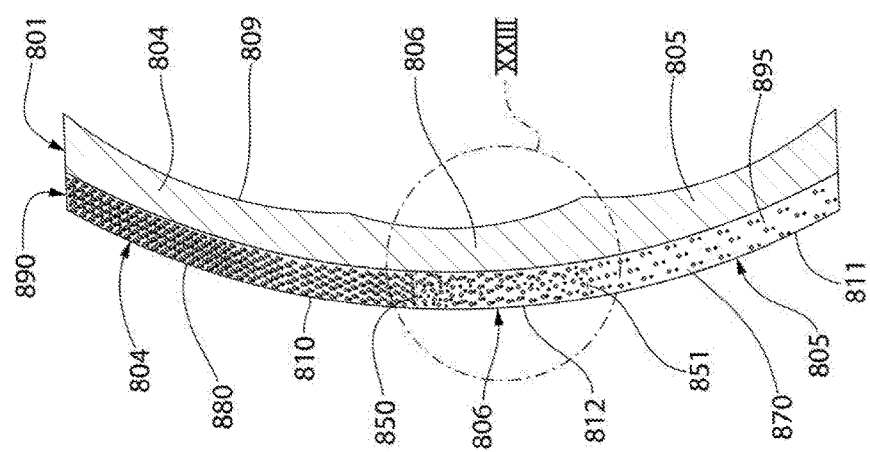
FIG. 22 is a cross-sectional schematic according to one embodiment of the ophthalmic lens of FIG. 21 wherein the light-blocking layer is formed as a singular monolithic layer.

Referring now to FIGS. 21-23 concurrently, an optical article 800 according to an embodiment of the present invention is illustrated. The optical article 800 is identical to the optical article 100 of FIG. 7 with the exception that a color-changing layer 890 comprising two different color-changing compositions 870, 880 are applied to the optical substrate 801 (described in greater detail below). Thus, except as set forth below, the discussion above for the optical article 100 is applicable to the optical article 800. Additionally, the optical article 800 can be formed based on a suitably modified version of the prescription (and corresponding formation method) discussed above in relation to FIGS. 13-16. Moreover, while a specific example of a pattern in which the two different color-changing compositions 870, 880 is exemplified, it is to be understood that the principles set forth below can be used to create patterns that have light-blocking zones aligned with the optical properties of the optical substrates, as discussed above in relation to FIGS. 8-12C. Finally, a light-blocking lens may be created using the method discussed above for FIGS. 17A-20B in which the coating includes the two different color-changing compositions 870, 880.

The optical article 800 is in the form of a corrective tri-focal lens. The optical article 800 comprises an optical substrate 801 upon which a color-changing layer 890 is applied. The color changing layer 890 is formed by a combination of both the first color-changing composition 870 and the second color-changing composition 880. The first color-changing composition 870 undergoes a first color change when exposed to a first type of activation energy and the second color-changing composition 880 undergoes a second color change when exposed to a second type of activation energy. The second type of activation energy is different than the first type of activation energy.

Figure 28:
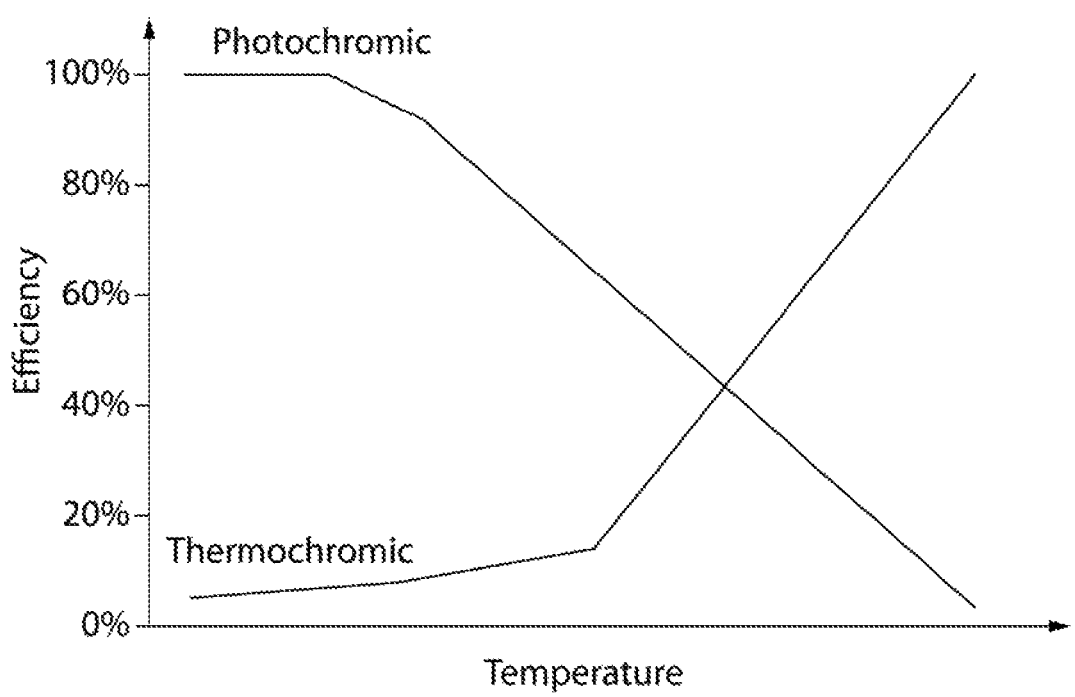
FIG. 28 is a graph of efficiency vs. temperature for a thermochromic composition and a photochromic composition.

The use of at least two color-changing compositions 870, 880 that are activated by different activation energies may be beneficial, in certain embodiments, due to the differences in effectiveness that may exist between the color-changing compositions 870, 880 in certain environmental conditions. For example, in one embodiment, the two color-changing compositions 870, 880 may be a thermochromic composition and a photochromic composition respectively. Photochromic materials are most effective in cold temperature environments and their effectiveness decreases as the environmental temperature increases. Conversely, thermochromic materials reaction to environmental temperature is the exact opposite. Thermochromic materials are least effective in cold temperature environments and their effectiveness increases as the environmental temperature increases. Referring to FIG. 28, a graph of photochromic and thermochromic material efficiency (y axis) vs. temperature (x axis) is set forth. Thus, in certain embodiments, by utilizing two different color-changing compositions 870, 880 in the optical article 800, an optical article that effectively functions the same in different temperature environments can be achieved.

The first color-changing composition 870 and the second color-changing composition 880 have been applied to the optical substrate 801 so that each has a plurality of light-blocking density gradients (when exposed to their respective type of activation energy). In the exemplified arrangement, the color density gradients of both the first and second color-changing compositions 870, 880 are based on the different optical regions 804, 805, 806 of the optical substrate 801. More specifically, the optical substrate 801 comprises a first optical region 804, a second optical region 105, and a third optical region 806 located between the first and second optical regions 804, 805.

A first boundary/interface 850 exists between the first optical zone 804 and the third optical zone 806. Similarly, a second boundary/interface 851 exists between the second optical zone 805 and the third optical zone 806.

In the exemplified embodiment, the first optical region 804 is a distance viewing region located in an upper portion of the optical substrate for a user to look therethrough when viewing objects at a far distance. The second optical region 805 is a near viewing region located in a lower portion of the optical substrate 801 for the user to look therethrough when viewing objects that are in close proximity. The third optical region 806 is a transition viewing region (or an intermediate viewing region) that assists the user in transitioning between the near and distance viewing regions and/or viewing objects located at intermediate distances. The different optical powers between the optical regions 804-806 is dictated by one or more optical curves 809 formed on a rear surface of the optical substrate 801.

The optical substrate 801 is a vision correcting ophthalmic lens and, thus, has been configured so that each of the first, second, and third optical regions 804-806 provide the necessary vision correcting properties for the intended user, such as providing added optical power (which sometimes referred to as add power). As can be seen in the optical power graph on the left side of FIG. 21, the first optical region 804 has a first average optical power. The second optical region 805 has a second average optical power. The second average optical power is different than the first average optical power. In the exemplified embodiment, the second average optical power is greater than the first optical power. However, in another embodiment, the second average optical power is less than the first optical power. Whether the second average optical power is greater or less than the first optical power will depend on whether the user for which the optical article 800 is being created is farsighted or nearsighted.

The first optical region 804 has a substantially fixed optical power (about 0 diopters in the example) while the second optical region 805 also has a substantially fixed optical power (about 2 diopters in the example). In another embodiment, the first optical region 804 may have an optical power that changes along the optical axis OA (i.e., an optical power gradient). Similarly, the second optical region 805 may also have an optical power that changes along the optical axis OA. The direction of any such change in optical power within each of the first and second optical zones will be determined by the vision-correcting needs of the user.

The third optical region 806 has an optical power gradient that transitions from the first average optical power to the second average optical power. The optical power gradient of the third optical region 806 extends along an optical power gradient vector 807. The optical power gradient vector 807 is coincident with the optical axis OA. As can be seen in the optical power graph on the left side of FIG. 21, the optical power gradient of the third optical region 806 has an optical power gradient profile 808 (taken along the optical power gradient vector 807). The optical power gradient profile 808, in the exemplified embodiment, is linear. In another embodiment, the optical power gradient profile 108 may take on other shapes, such as curved, hyperbolic, parabolic, linear, stepped, and combinations thereof.

As mentioned above, in certain embodiments the first and second optical zones, 804, 805 have a varying optical power and, thus comprise first and second optical power gradients respectively. In one such embodiment, the third optical power gradient of the third optical zone 806 will have an average rate of change that is greater than the average rate of change of the first optical power gradient. In another such embodiment, the third optical power gradient of the third optical zone 806 will have an average rate of change that is greater than the average rate of change of the second optical power gradient. In a further such embodiment, the third optical power gradient of the third optical zone 806 will have an average rate of change that is greater than both the average rate of change of the second optical power gradient and the average rate of change of the first optical power gradient.

The first color-changing composition 870 is applied to the optical substrate 801 to cover each of the first, second, and third optical regions 804-806. Similarly, the second color-changing composition 880 is applied to the optical substrate 801 to cover each of the first, second, and third optical regions 804-806. Thus, in the exemplified embodiment, the color-changing layer 890 comprises both the first and second color-changing compositions 870, 880 in each of the portions that overly the first, second, and third optical regions 804-806. In other embodiments, the certain portions of the color-changing layer 890 may comprises only one of the first and/or second color-changing compositions 870, 880 while other portions of the color-changing layer 890 comprises both the first and second color-changing compositions 870, 880.

Thought of another way, the color-changing layer 890 comprises: (1) a first light-blocking zone 810 formed over the first optical region 804 that comprises both the first and second color-changing compositions 870, 880; (2) a second light-blocking zone 811 formed over the second optical region 805 that comprises both the first and second color-changing compositions 870, 880; and (3) a third light-blocking zone 812 formed over the third optical region 106 that comprises both the first and second color-changing compositions 870, 880. A first boundary/interface 860 exists between the first light-blocking zone 810 and the third light-blocking zone 812. A second boundary/interface 861 exists between the second light-blocking zone 811 and the third light-blocking zone 812. In the exemplified embodiment of the optical article 800, the first boundary 860 between the first light-blocking zone 810 and the third light-blocking zone 812 is coincident with the first boundary 850 between the first and third optical regions 804, 806 along its entire length. Similarly, the second boundary 861 between the second light-blocking zone 811 and the third light-blocking zone 812 is coincident with the second boundary 851 between the second and third optical regions 805, 806 along its entire length. In other embodiments, the boundaries 860, 861 are coincident with the boundaries 850, 851 along only a portion of their length, and possibly only at the optical axis OA.

The first color-changing composition 870 is applied to the optical substrate 801 so as to have a specific light-blocking density gradient (when exposed to the first type of activation energy) in each of the first, second, and third light-blocking zones 810, 812. The light-blocking density gradient of the first color-changing composition 870 in the first light-blocking zone 810 extends along a light-blocking density gradient vector 813 and has a light-blocking density gradient profile 814. The light-blocking density gradient of the first color-changing composition 870 in the second light-blocking zone 811 extends along a light-blocking density gradient vector 831 and has a light-blocking density gradient profile 816. The light-blocking density gradient of the first color-changing composition 870 in the third light-blocking zone 812 extends along a light-blocking density gradient vector 832 and has a light-blocking density gradient profile 815. The light-blocking density gradient of the second color-changing composition 880 in the first light-blocking zone 810 extends along a light-blocking density gradient vector 813 and has a light-blocking density gradient profile 822. The light-blocking density gradient of the second color-changing composition 880 in the second light-blocking zone 811 extends along a light-blocking density gradient vector 833 and has a light-blocking density gradient profile 820. The light-blocking density gradient of the second color-changing composition 880 in the third light-blocking zone 812 extends along a light-blocking density gradient vector 834 and has a light-blocking density gradient profile 818.

As can be seen from the light-absorbing density graph on the right side of FIG. 21, in each of the three light-blocking regions 810-812, the light-blocking density gradient profiles of the first and second light-blocking compositions 870, 880 are the same as one another (they are shown slightly offset form one another, rather than completely overlapping, solely for the purpose of illustration). In other embodiments, the light-blocking density gradient profiles of the first and second light-blocking compositions 870, 880 may be different from one another in one or more of the light-blocking regions 810-812 while being the same in at least one of the light-blocking regions 810-812. Finally, while light-blocking density gradient profiles of the first and second light-blocking compositions 870, 880 are the same as one another in each of the light-blocking regions 810-812, in another embodiment, the light-blocking density gradient profiles of the first and second light-blocking compositions 870, 880 may not be the same magnitude but merely gave the same direction of increase. In another embodiment, the light-blocking density gradient profiles of the first and second light-blocking compositions 870, 880 may not be the same magnitude but may have the same direction of increase. and the same profile shape and/or the same profile slope.

Referring solely now to FIGS. 22-23, it can be seen that the color-changing layer 890 is formed as a singular monolithic layer that includes both the first and second color-changing compositions 870, 880, wherein the third light-blocking zone comprises a mixture of the first and second color-changing compositions 870, 880. As illustrated, the circular dots of solid fill represent the first light-blocking material 871 of the first light-blocking composition 870. The unfilled squares represent the second light-blocking material 882 of the second light-blocking composition 880. In one embodiment, such a singular monolithic layer utilizes a common fluidic carrier 895 (such as a clear base coat) that carries the first light-blocking material 871 and the second light-blocking material 882. The combination of the fluidic carrier 895 and the first light-blocking material 871 is considered the first light-blocking composition 870 while the combination of the fluidic carrier 895 and the second light-blocking material 881 is considered the second light-blocking composition 880.

The singular monolithic layer (which is color-changing layer 890) can be formed by applying the first and second color-changing compositions 870, 880 from separate sources/reservoirs at substantially the same time so that neither of the first and second color-changing compositions 870, 880 cure/dry prior to the application of the other one of the first and second color-changing compositions 870, 880. Thus, in one such embodiment, the first and second color-changing compositions 870, 880 do not mix with one another in the third light-blocking zone 812 until they are deposited on the optical substrate 801 in fluidic form. This can be achieved by a printing process wherein a first printing nozzle (or a first array of printing nozzles or a first printhead) is fluidly coupled to a source of the first color-changing composition 870 while a separate second printing nozzle (or a separate second array of printing nozzles or a separate first printhead) is fluidly coupled to a source of the second color-changing composition 880. Additionally, in order to form the light-blocking density gradients, a third printing nozzle (or a third array of printing nozzles or a third printhead) is fluidly coupled to a source of pure fluidic carrier 895 (i.e., fluidic carrier that is free of any color-changing materials). As such, the relative volumetric amounts of pure fluidic carrier 895, first color-changing composition 870, and second color-changing composition 880 being deposited can be varied across the different positions/locations of the optical substrate 801 to achieve the desired light-blocking density gradients and area of mixtures of the first and second color-changing compositions 870, 880. Suitable printing processes that can apply the color-changing layer 890 as a singular monolithic layer include non-contact printing processes, such as inkjet drop-on-demand printing processes that utilize variable drop size printing processes performed with greyscale printheads.

In an alternative process, the pure fluidic carrier 895, first color-changing composition 870, and the second color-changing composition 880 may be mixed into their desired ratio prior to being deposited on the optical substrate 801, such as by incorporating a mixing chamber into the printhead.

As best seen in FIG., 22, the first color-changing section 210 that overlies the first optical region 804 has a first average ratio of the first color-changing material to the second color-changing material. The second color-changing section 211 that overlies the second optical region 805 has a second average ratio of the first color-changing material to the second color-changing material. The third color-changing section 212 that overlies the third optical region 806 has a third average ratio of the first color-changing material to the second color-changing material. Each of the first, second, and third average ratios are the same as one another. In another embodiment, each of the first, second, and third average ratios are the same as one another.

The color-changing layer 890 has a substantially uniform thickness across its entirety. As used herein, uniform thickness is defined as the difference between the maximum and minimum thickness measured on the lens. In an embodiment, the thickness is measured in at least two points, including approximately in the center of the lens and approximately at the edge of the lens, e.g. in a band that is 2-4 mm from the edge of the lens. In an embodiment, the thickness is measured in at least one reference points such as the far and/or near zone reference points. In an embodiment, the thickness is measured multiple times in the same area, e.g. within a circle whose diameter is less than 0.5, 1.0, 2.0, 3.0 mm, and the average of these measurements is calculated. Uniform thickness is then defined as the difference between the average thickness in the first and second areas.

As used herein substantially uniform thickness will be defined as a difference in thickness, in any of the above methods, that is less than 0.1 or 0.5 or 1 or 2 or 3 or 4 or 5 micron. And/or, "substantially uniform thickness" include variations in the magnitude of less than 2% or 4% or 6% or 8% or 10% of the average thickness.

Figure 25:
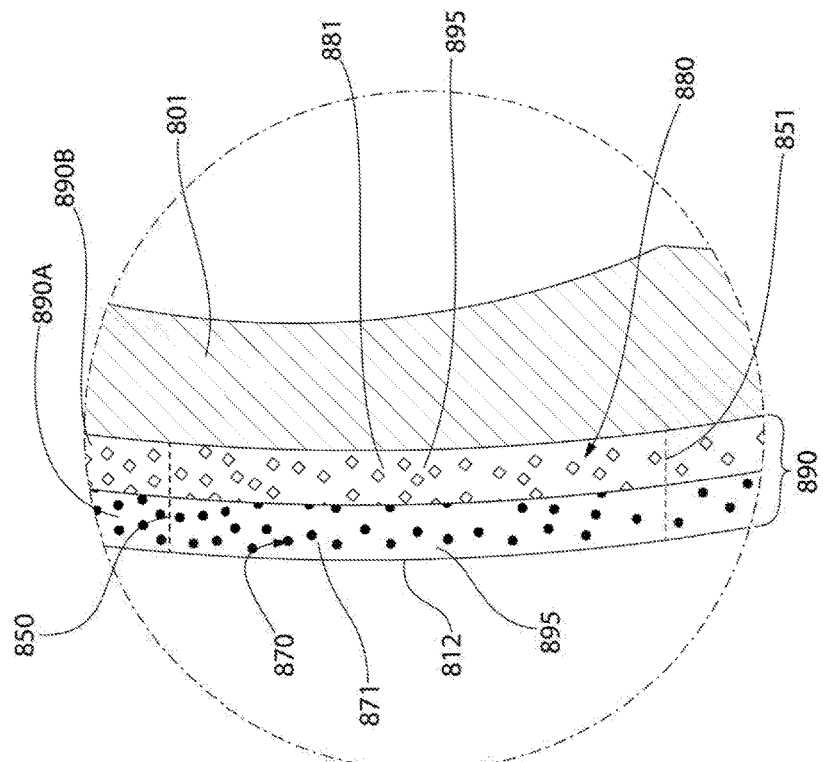
FIG. 25 is a close-up of area XXV of FIG. 24.
Figure 24:
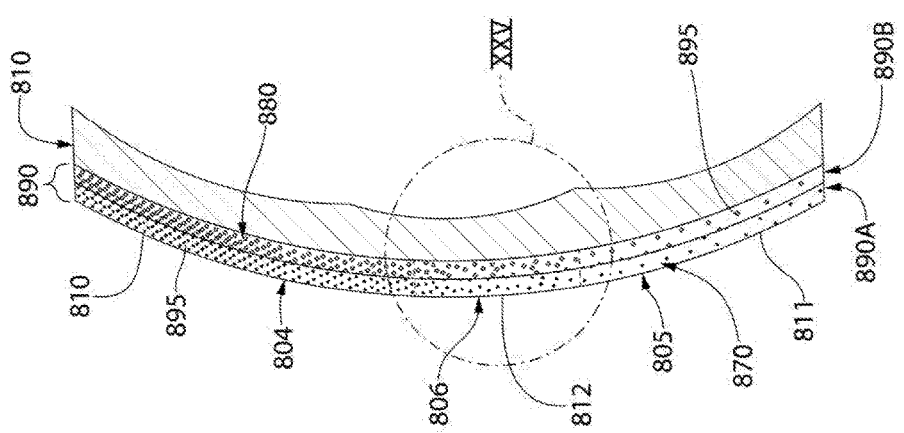
FIG. 24 is a cross-sectional schematic according to another embodiment of the ophthalmic lens of FIG. 21 wherein the light-blocking layer is formed as two distinct sublayers.

Referring now to FIGS. 21 and 24-25 concurrently, the optical article 800 will be discussed in which the color-changing layer 890 is formed as two separate sublayers 890A, 890B. All other aspects of the optical article 800 and the color-changing layer 890 are identical to that discussed above. Thus, in order to avoid redundancy only those specific differences brought about by the two separate sublayers 890A, 890B of the color-changing layer 890 will be discussed below with the understanding that all other details discussed above are applicable.

As can be seen in FIGS. 24-25, the color-changing layer 890 comprises a first sublayer 890A of the first color-changing composition 870 and a second sublayer 890B formed of the second color-changing composition 880. In the exemplified embodiment, the first and second sublayers 890A, 890B are on the same side of the optical substrate 801 and in contact with one another. In another embodiment, the first and second sublayers 890A, 890B are on opposite sides of the optical substrate 801. In anther embodiment, the first and second sublayers 890A, 890B may be on the same side of the optical substrate 801 with one or more intervening layers positions therebetween.

In applying the color-changing layer 890 of this embodiment, the first sublayer 890A of the first color-changing composition 870 is applied to the optical substrate 801, such as by a printing process. As can be seen, the first sublayer 890A does not include the second color-changing composition 880. Once applied, the first sublayer 890A is allowed to dry, such as by a curing process, such as by a pre-cure or partial curing process, for example by an exposure to an IR lamp, a UV lamp or other light source or an exposure to a thermal source. Once sufficiently dried, the second sublayer 890B is applied atop the first sublayer 890A. Because the first sublayer 890A has dried at this point, the first and second compositions 870, 880 do not mix but, rather, stay as distinct sublayers. While not illustrated, in one embodiment, the thickness of the first and second sublayers 890A, 890B may be varied, while at the same time the color-changing layer 890 maintains a constant thickness.

In another embodiment, the first sublayer 890A of the first color-changing composition 870 is applied to the optical substrate 801 and, prior to drying/curing, the second sublayer 890B is applied atop the first sublayer 890A. Despite the first sublayer 890A not be dried/cured, there is no significant mixing between the first and second compositions 870, 880.

Figure 26:
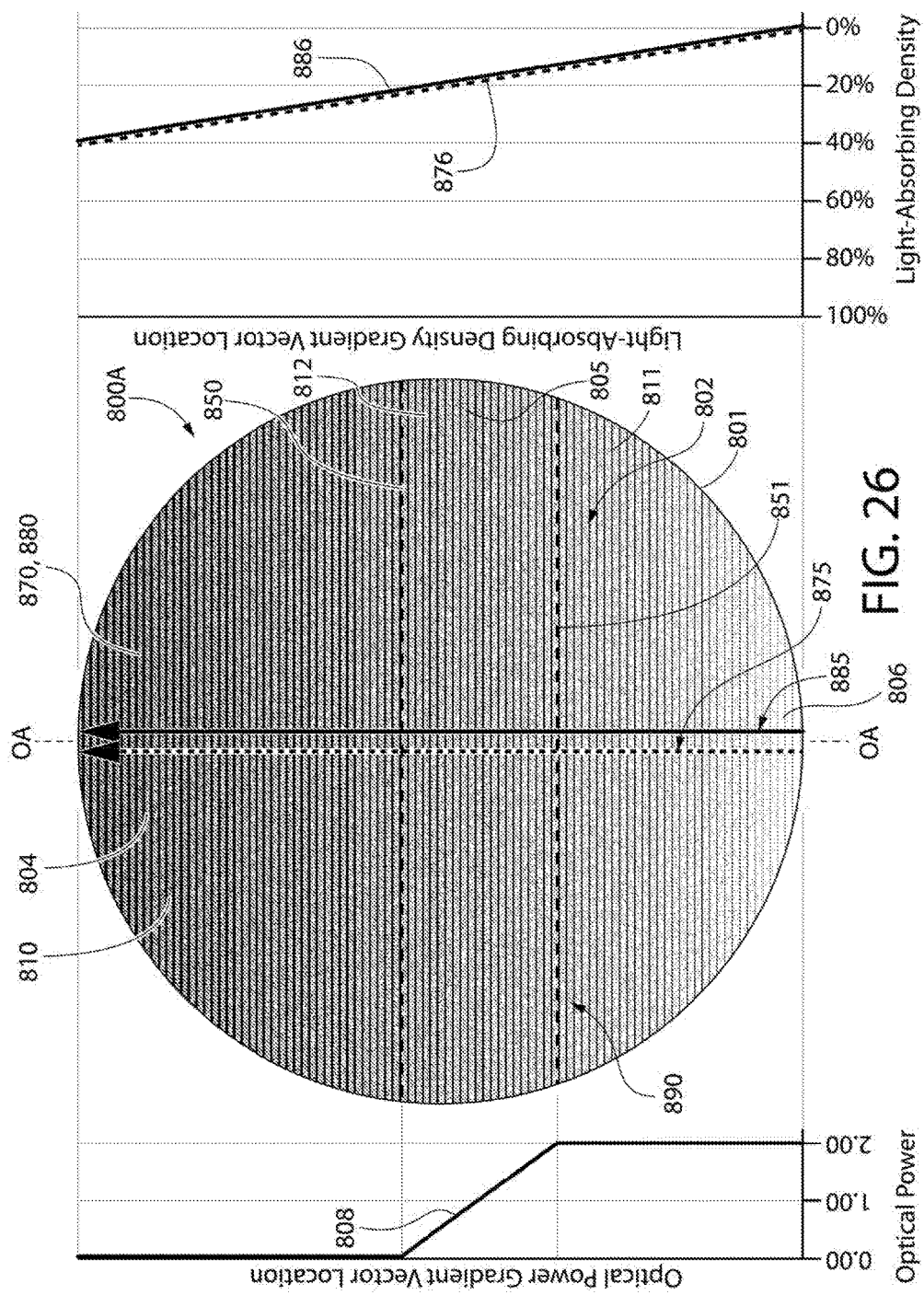
FIG. 26 is a schematic representation of an ophthalmic lens, in the form of a tri-focal lens, having a light-blocking layer comprising first and second light-blocking compositions that are activated by different types of activation energy that have been applied in an alternate pattern that is based on the optical power characteristics of the optical substrate according to an embodiment of the present invention.
Figure 27:
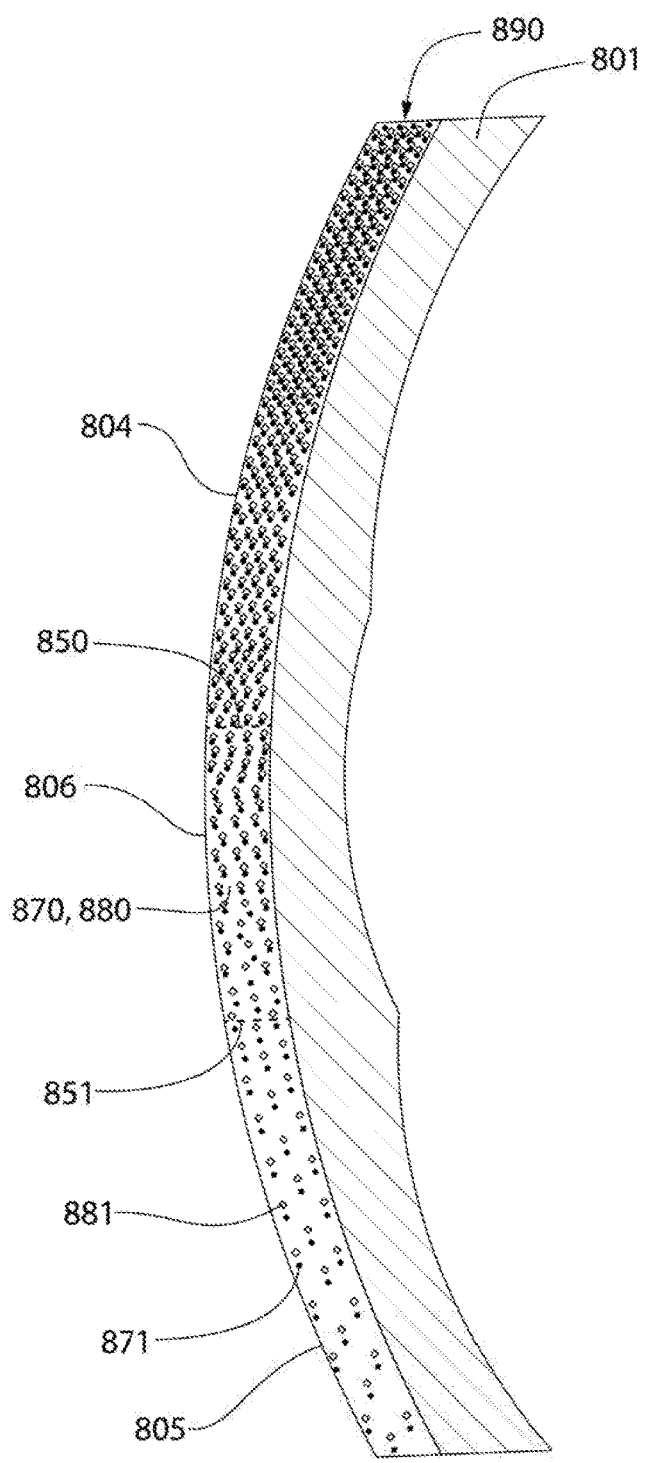
FIG. 27 is a cross-sectional schematic of the ophthalmic lens of FIG. 26 wherein the light-blocking layer is formed as a singular monolithic layer.

Referring now to FIGS. 26-27 concurrently, a further embodiment of an optical article 800A that comprises a color-changing layer 890 that comprises the first and second color-changing compositions 870, 880 is exemplified. The optical article 800A is identical to the optical article 800 of FIGS. 21-23 with the exception that the first and second color-changing compositions 870, 880 are present in the entirety of the color-changing layer 890 in a single and continuous light-blocking density gradient. Thus, in order to avoid redundancy only those specific differences relating to the color-changing layer 890 will be discussed below with the understanding that all other details discussed above are applicable.

As can be seen, each of the first and second color-changing compositions 870, 880 extend over each of the first, second, and third optical zones 204-206. The first color-changing composition 870 has a first light-absorbing gradient that extends along the first light-absorbing density gradient vector 875 and has a first light-absorbing density profile 876. The second color-changing composition 880 has a second light-absorbing gradient that extends along the second light-absorbing density gradient vector 885 and has a second light-absorbing density profile 886. As can be seen from the graph on the right of FIG. 26 and FIG. 27, the light-absorbing density increases for each of the first and second color-changing compositions 270, 280 in the same direction and over the entire diameter of the optical substrate 801.

For each of the optical articles 800 and 800A of FIGS. 21-27, non-limiting embodiments of the invention include the first color-changing composition 870 and the second color-changing composition being selected according to one of the Embodiments 1-6 identified below.

| Embodiment 1 | |
|---|---|
| First Light-Absorbing Composition | Photochromic Composition |
| Second Light-Absorbing Composition | Thermochromic Composition |

| Embodiment 2 | |
|---|---|
| First Light-Absorbing Composition | Photochromic Composition |
| Second Light-Absorbing Composition | Electrochromic Composition |

| Embodiment 3 | |
|---|---|
| First Light-Absorbing Composition | Thermochromic Composition |
| Second Light-Absorbing Composition | Photochromic Composition |

| Embodiment 4 | |
|---|---|
| First Light-Absorbing Composition | Electrochromic Composition |
| Second Light-Absorbing Composition | Photochromic Composition |

| Embodiment 5 | |
|---|---|
| First Light-Absorbing Composition | Thermochromic Composition |
| Second Light-Absorbing Composition | Electrochromic Composition |

| Embodiment 6 | |
|---|---|
| First Light-Absorbing Composition | Electrochromic Composition |
| Second Light-Absorbing Composition | Thermochromic Composition |

For each of the embodiments 1-6 identified above, for a photochromic composition the activation energy is actinic energy, for an electrochromic composition the activation energy is electrical potential, and for a thermochromic composition the activation energy is thermal energy.

Figure 29:
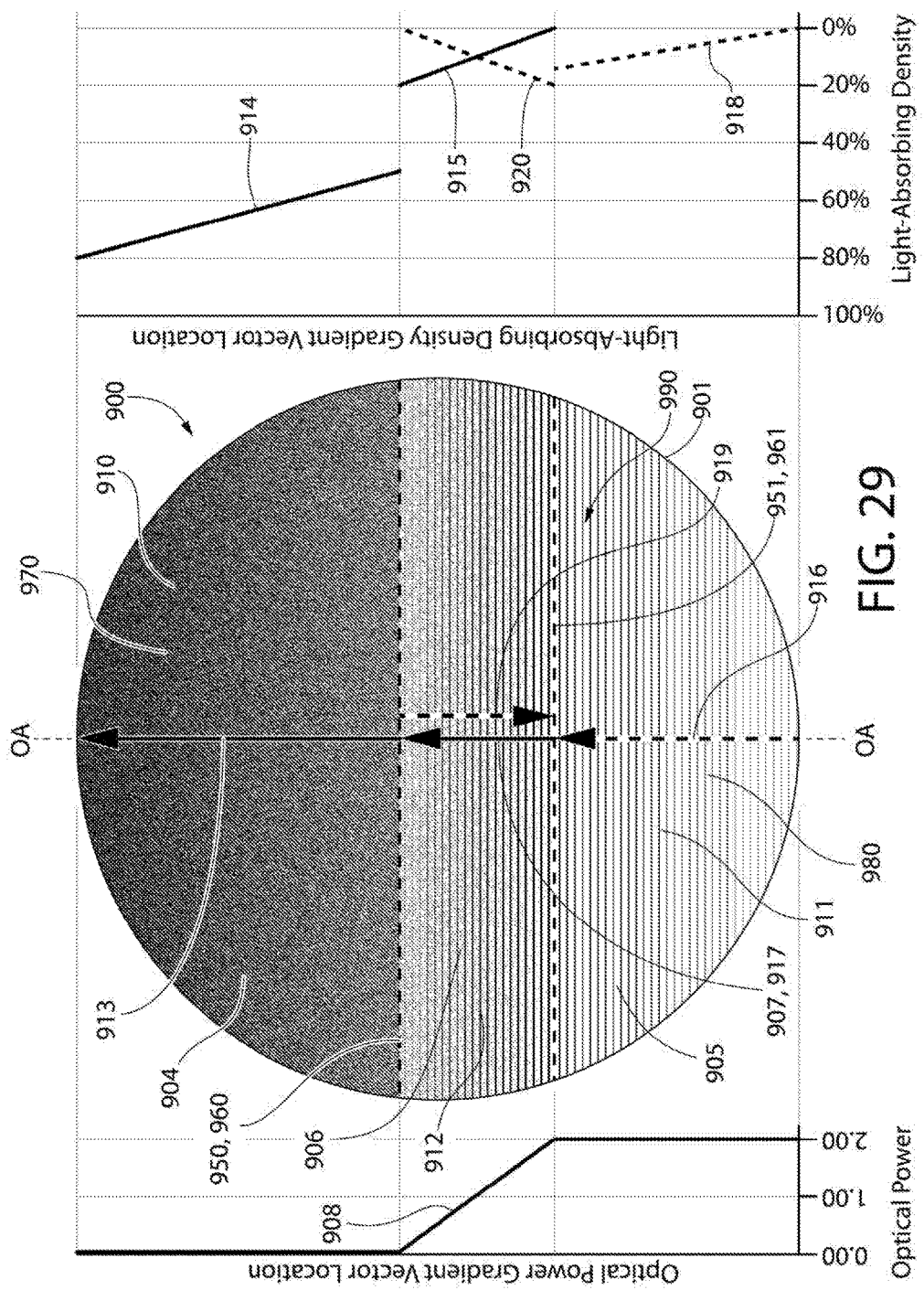
FIG. 29 is a schematic representation of an ophthalmic lens, in the form of a tri-focal lens, having a light-blocking layer comprising first and second light-blocking compositions having different return characteristics that have been applied in a pattern that is based on the optical power characteristics of the optical substrate according to an embodiment of the present invention.
Figure 31:
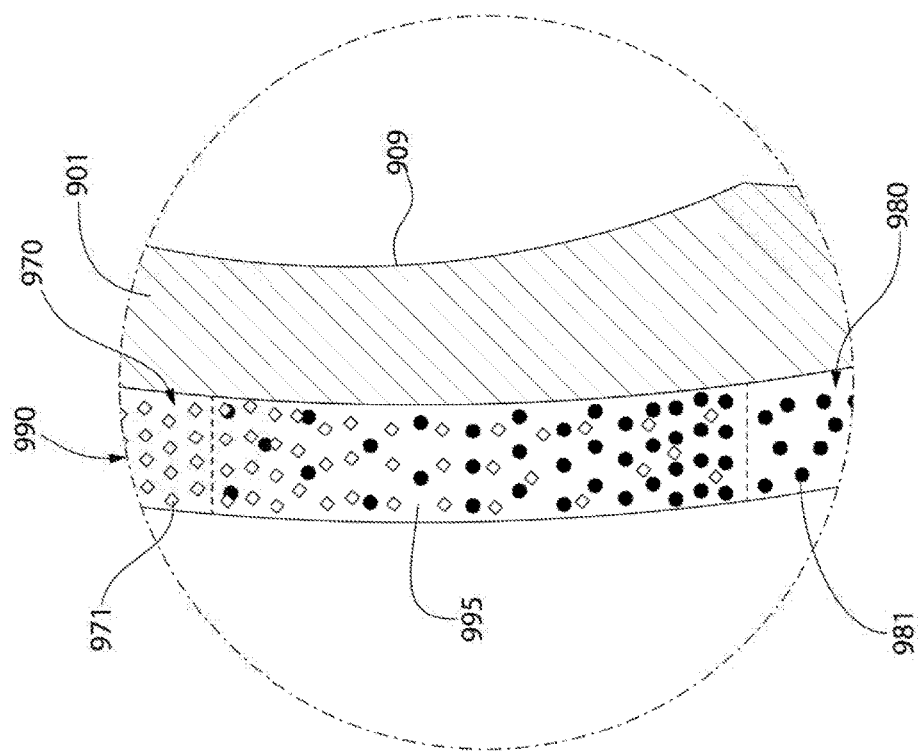
FIG. 31 is a close-up of area XXXI of FIG. 30.
Figure 30:
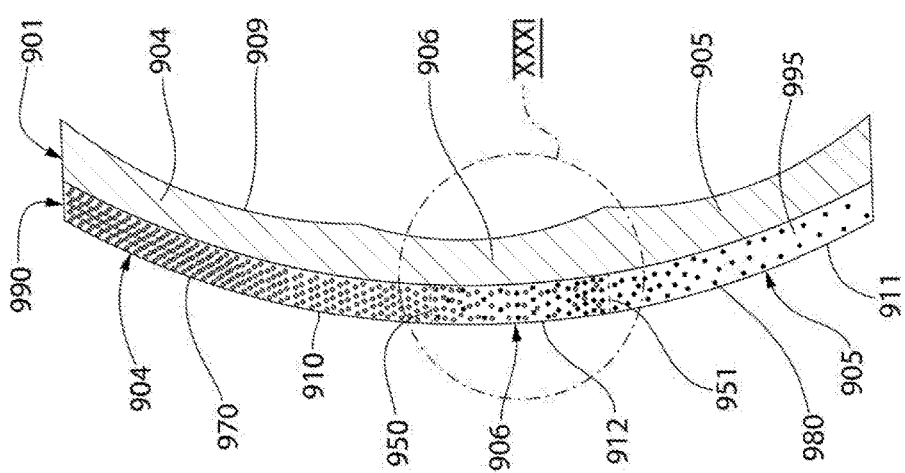
FIG. 30 is a cross-sectional schematic according to one embodiment of the ophthalmic lens of FIG. 29 wherein the light-blocking layer is formed as a singular monolithic layer.

Referring now to FIGS. 29-31 concurrently, an optical article 900 according to an embodiment of the present invention is illustrated. The optical article 900 is identical to the optical article 700 of FIG. 7 with the exception that a color-changing layer 990 comprising two different color-changing compositions 970, 980 are applied to the optical substrate 901 (described in greater detail below). Thus, except as set forth below, the discussion above for the optical article 100 is applicable to the optical article 900. Additionally, the optical article 900 can be formed based on a suitably modified version of the prescription (and corresponding formation method) discussed above in relation to FIGS. 13-16. Moreover, while a specific example of a pattern in which the two different color-changing compositions 970, 980 is exemplified, it is to be understood that the principles set forth below can be used to create patterns that have zones aligned with the optical properties of the optical substrates, as discussed above in relation to FIGS. 8-12C. Finally, a light-blocking lens may be created using the method discussed above for FIGS. 17A-20B in which the coating includes the two different color-changing compositions 870, 880.

The optical article 900 is in the form of a corrective tri-focal lens. The optical article 900 comprises an optical substrate 901 upon which a color-changing layer 990 is applied. The color changing layer 990 is formed by a combination of both the first color-changing composition 970 and the second color-changing composition 980. The first and second color changing compositions 970, 980 are selected and applied in a specific pattern on the optical substrate 901 within the color-changing layer 990 so that the different optical regions 904-906 of the optical article 900 exhibit different return characteristics upon cessation of the relevant activation energy.

For example, the decay time and the average rate of decay for photochromic materials when transitioning from dark (i.e., the activated state) to clear (i.e., the non-activated state) are characteristics of the material that differ between different photochromic materials and different dilutions of the same photochromic material. Thus, one photochromic composition may transition from dark to clear faster than another photochromic composition (or at least have a greater average rate of decay). Thus, in this aspect of the invention, the selection of the first and second compositions 970, 980 can be undertaken, along with their placement on the optical substrate 901 so that the different optical regions 904-906 exhibit different return characteristics. For example, it may be desirable to have a near viewing region return from colored-to-clear faster than the distance viewing region when the user enters an indoor environment from the outside.

Figure 34:
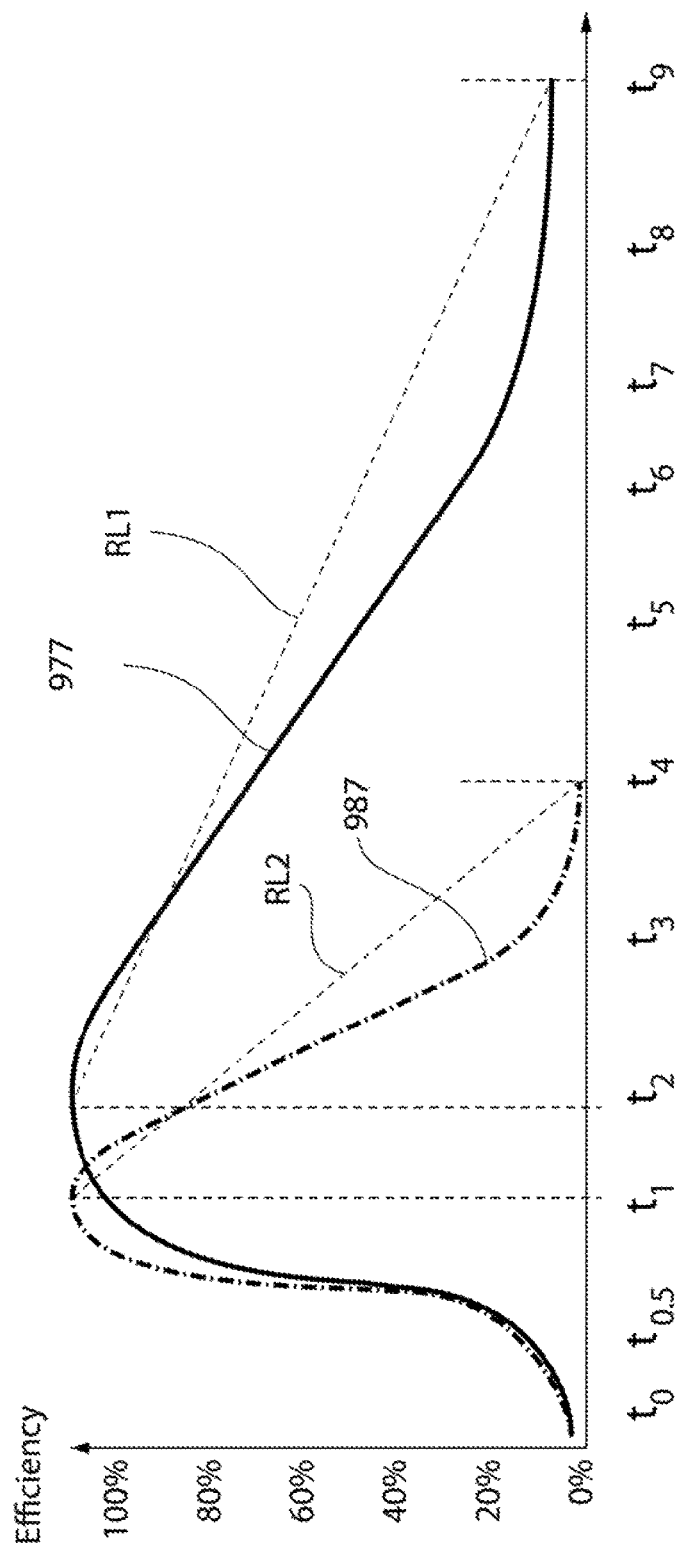
FIG. 34 is a graph of efficiency vs. time showing rise and return profiles for two color-changing compositions having different color-changing materials.

Referring now to FIG. 34, a comparison of rise and return profiles 977, 987 are shown for one suitable pair of first and second color-changing compositions 970, 980 according to this aspect of the present invention. In this embodiment of the first and second color-changing compositions 970, 980, the first color-changing composition 970 comprises a first color-changing material, such as a first photochromic material, while the second color-changing composition 980 comprises a second color-changing material that is different than the first color-changing material, such as a second photochromic material. For this embodiment, the first and second color-changing compositions 970, 980 have the same amount (i.e., percent by weight) of the first and second color-changing material respectively. The y-axis is the efficiency of the color-changing compositions 970, 980 wherein 0% is clear and 100% is the darkest the color-changing compositions 970, 980 will get upon exposure to the relevant activation energy. The x-axis represents typical time durations.

As can be seen from the rise and return profile 977 of the first color-changing composition 970, at time $t_0$ the first color-changing composition 970 is subjected to its activation energy (e.g., sunlight for a photochromic composition). As a result, the first color-changing composition 970 transitions from a non-activated state (e.g., clear) to an activated state (e.g., colored) until it reaches its maximum at time $t_2$. At time $t_2$, application of the activation energy to the first color-changing composition 970 is ceased. Thus, the first color-changing composition 970 transitions from the activated state to the non-activated from time $t_2$ to time $t_9$. Thus, the decay time for the first color-changing composition 970 is the time period from time $t_2$ to time $t_9$. The first color-changing composition 970 has a first average rate of decay, which is the slope of the reference line RL1.

As can be seen from the rise and return profile 987 of the second color-changing composition 980, at time $t_0$ the second color-changing composition 980 is subjected to the same activation energy as the first color-changing composition 970 (e.g., sunlight for a photochromic composition). As a result, the second color-changing composition 980 transitions from a non-activated state (e.g., clear) to an activated state (e.g., colored) until it reaches its maximum at time $t_1$. At time $t_1$, application of the activation energy to the second color-changing composition 980 is ceased. Thus, the second color-changing composition 980 transitions from the activated state to the non-activated from time $t_1$ to time $t_4$. Thus, the decay time for the second color-changing composition 980 is the time period from time $t_1$ to time $t_4$. The second color-changing composition 980 has a second average rate of decay, which is the slope of the reference line RL2.

All environmental conditions are the same when generating the first and second rise and return profiles 977, 987. Despite this, due to the first and second color-changing materials being different from one another, the decay time for the first color-changing composition 970 is greater than the decay time for the second color-changing composition 980. Additionally, the rate of decay for the first color-changing composition 970 is less than the rate of decay for the second color-changing composition 980.

In one embodiment, each of the first and second color-changing compositions 970, 980 is a photochromic composition. In another embodiment, each of the first and second color-changing compositions 970, 980 is a thermochromic composition. In another embodiment, each of the first and second color-changing compositions 970, 980 is an electrochromic composition.

Suitable specific selections for the first color-changing material of the first color-changing composition 970 include photochromic materials such as PH-2135 "Red" from CHROMTECH, with an optical density at λmax of 2.05 and a half-time color decay at λmax of 87 seconds. Examples of the suitable selections for the second color-changing material of the second color-changing composition 980 include PH-2171 "Yellow" from CHROMTECH, with an optical density at λmax of 1.26 and a half-time color decay at λmax of 27 seconds.

In an embodiment the first and second color-changing compositions 970, 980 have the same photochromic material in different dilutions (X % and Y % respectively) in a base coat. They have the same rate of rise and the same rate of decay. However, because they have different dilutions, their maximum efficiency will be different and, thus, their decay times are different. For example, the time to-maximum-efficiency also referred to as rise/coloration time and the decay-time, also referred to as discoloration time, typically measured in half time of the color decay, may differ.

Referring back to FIGS. 29-31, the first color-changing composition 970 and the second color-changing composition 980 have been applied to the optical substrate 901 so that each has a light-blocking density gradient (when exposed to the activation energy). The first and second color-changing compositions 970, 980 can be selected as discussed above in FIGS. 34-35. In the exemplified arrangement, the color density gradients of both the first and second color-changing compositions 970, 980 are based on the different optical regions 904-906 of the optical substrate 901. More specifically, the optical substrate 901 comprises a first optical region 904, a second optical region 905, and a third optical region 906 located between the first and second optical regions 904, 905.

A first boundary/interface 950 exists between the first optical zone 904 and the third optical zone 906. Similarly, a second boundary/interface 951 exists between the second optical zone 905 and the third optical zone 906.

In the exemplified embodiment, the first optical region 904 is a distance viewing region located in an upper portion of the optical substrate for a user to look therethrough when viewing objects at a far distance. The second optical region 905 is a near viewing region located in a lower portion of the optical substrate 901 for the user to look therethrough when viewing objects that are in close proximity. The third optical region 906 is a transition viewing region (or an intermediate viewing region) that assists the user in transitioning between the near and distance viewing regions and/or viewing objects located at intermediate distances. The different optical powers between the optical regions 904-906 is dictated by one or more optical curves 909 formed on a rear surface of the optical substrate 901.

The optical substrate 901 is a vision correcting ophthalmic lens and, thus, has been configured so that each of the first, second, and third optical regions 904-906 provide the necessary vision correcting properties for the intended user, such as providing added optical power (which sometimes referred to as add power). As can be seen in the optical power graph on the left side of FIG. 29, the first optical region 904 has a first average optical power. The second optical region 905 has a second average optical power. The second average optical power is different than the first average optical power. In the exemplified embodiment, the second average optical power is greater than the first optical power. However, in another embodiment, the second average optical power is less than the first optical power. Whether the second average optical power is greater or less than the first optical power will depend on whether the user for which the optical article 900 is being created is farsighted or nearsighted.

The first optical region 904 has a substantially fixed optical power (about 0 diopters in the example) while the second optical region 805 also has a substantially fixed optical power (about 2 diopters in the example). In another embodiment, the first optical region 804 may have an optical power that changes along the optical axis OA (i.e., an optical power gradient). Similarly, the second optical region 905 may also have an optical power that changes along the optical axis OA. The direction of any such change in optical power within each of the first and second optical zones will be determined by the vision-correcting needs of the user.

The third optical region 906 has an optical power gradient that transitions from the first average optical power to the second average optical power. The optical power gradient of the third optical region 906 extends along an optical power gradient vector 907. The optical power gradient vector 907 is coincident with the optical axis OA. As can be seen in the optical power graph on the left side of FIG. 29, the optical power gradient of the third optical region 906 has an optical power gradient profile 908 (taken along the optical power gradient vector 907). The optical power gradient profile 908, in the exemplified embodiment, is linear. In another embodiment, the optical power gradient profile 908 may take on other shapes, such as curved, hyperbolic, parabolic, linear, stepped, and combinations thereof.

As mentioned above, in certain embodiments the first and second optical zones, 904, 905 have a varying optical power and, thus comprise first and second optical power gradients respectively. In one such embodiment, the third optical power gradient of the third optical zone 906 will have an average rate of change that is greater than the average rate of change of the first optical power gradient. In another such embodiment, the third optical power gradient of the third optical zone 906 will have an average rate of change that is greater than the average rate of change of the second optical power gradient. In a further such embodiment, the third optical power gradient of the third optical zone 906 will have an average rate of change that is greater than both the average rate of change of the second optical power gradient and the average rate of change of the first optical power gradient.

The first color-changing composition 970 is applied to the optical substrate 901 to cover both of the first and third optical regions 904, 906. The second color-changing composition 980 is applied to the optical substrate 901 to cover both of the second and third optical regions 905, 906. Thus, as best seen in FIG. 30, the color-changing layer 990 comprises only the first color-changing composition 970 in the portion that overlies the first optical region 904 and only the second color-changing composition 980 in the portion that overlies the second optical region 909. However, the color-changing layer 990 comprises both the first and second color-changing compositions 970, 980 in the portion that overlies the third optical region 906.

Thought of another way, the color-changing layer 990 comprises: (1) a first light-blocking region 910 formed over the first optical region 904 that comprises the first color-changing composition 970 and is free of the second color-changing composition 980; (2) a second light-blocking region 911 formed over the second optical region 905 that comprises the second color-changing composition 980 and is free of the first color-changing composition 970; and (3) a third light-blocking region 912 formed over the third optical region 906 that comprises both the first and second color-changing compositions 970, 980. A first boundary/interface 960 exists between the first light-blocking zone 910 and the third light-blocking zone 912. A second boundary/interface 961 exists between the second light-blocking zone 911 and the third light-blocking zone 912. In the exemplified embodiment of the optical article 900, the first boundary 960 between the first light-blocking zone 910 and the third light-blocking zone 912 is coincident with the first boundary 950 between the first and third optical regions 904, 906 along its entire length. Similarly, the second boundary 861 between the second light-blocking zone 911 and the third light-blocking zone 912 is coincident with the second boundary 951 between the second and third optical regions 905, 906 along its entire length. In other embodiments, the boundaries 960, 961 are coincident with the boundaries 950, 951 along only a portion of their length, and possibly only at the optical axis OA.

The first color-changing composition 970 is applied to the optical substrate 901 so as to have a light-blocking density gradient (when exposed to the activation energy) in each of the first and third light-blocking zones 910, 912. The light-blocking density gradient of the first color-changing composition 970 in the first light-blocking zone 910 extends along a light-blocking density gradient vector 913 and has a light-blocking density gradient profile 914. The light-blocking density gradient of the first color-changing composition 970 in the third light-blocking zone 912 extends along a light-blocking density gradient vector 917 and has a light-blocking density gradient profile 915. The light-blocking density gradient of the second color-changing composition 980 in the second light-blocking zone 911 extends along a light-blocking density gradient vector 916 and has a light-blocking density gradient profile 918. The light-blocking density gradient of the second color-changing composition 980 in the third light-blocking zone 912 extends along a light-blocking density gradient vector 919 and has a light-blocking density gradient profile 920. As can be seen, in the third light-blocking zone 912, the light-blocking density gradient profile 920 of the second color-changing composition 980 has a slope that is inverse to the slope of the light-blocking density gradient profile 915 of the first color-changing composition 970.

In the exemplified embodiment, only the third light-blocking zone 912 (which can be considered a section) of the light-blocking layer 920 comprises a combination of the first and second color-changing compositions 970, 980.

Referring solely now to FIGS. 30-31, it can be seen that the color-changing layer 990 is formed as a singular monolithic layer that includes both the first and second color-changing compositions 970, 980, wherein the third light-blocking zone comprises a mixture of the first and second color-changing compositions 970, 980. As illustrated, the circular dots of solid fill represent the second light-blocking material 981 of the second light-blocking composition 980. The unfilled squares represent the first light-blocking material 972 of the first light-blocking composition 970. In one embodiment, such a singular monolithic layer utilizes a common fluidic carrier 995 (such as a clear base coat) that carries the first light-blocking material 971 and the second light-blocking material 982. The combination of the fluidic carrier 995 and the first light-blocking material 971 is considered the first light-blocking composition 970 while the combination of the fluidic carrier 995 and the second light-blocking material 981 is considered the second light-blocking composition 980.

The singular monolithic layer (which is the color-changing layer 980) can be formed by applying the first and second color-changing compositions 970, 980 from separate sources/reservoirs at substantially the same time so that neither of the first and second color-changing compositions 970, 980 cure/dry prior to the application of the other one of the first and second color-changing compositions 970, 980. Thus, in one such embodiment, the first and second color-changing compositions 970, 980 do not mix with one another in the third light-blocking zone 912 until they are deposited on the optical substrate 901 in fluidic form. This can be achieved by a printing process wherein a first printing nozzle (or a first array of printing nozzles or a first printhead) is fluidly coupled to a source of the first color-changing composition 970 while a separate second printing nozzle (or a separate second array of printing nozzles or a separate first printhead) is fluidly coupled to a source of the second color-changing composition 980. Additionally, in order to form the light-blocking density gradients, a third printing nozzle (or a third array of printing nozzles or a third printhead) is fluidly coupled to a source of pure fluidic carrier 995 (i.e., fluidic carrier that is free of any color-changing materials). As such, the relative volumetric amounts of pure fluidic carrier 995, first color-changing composition 970, and second color-changing composition 980 being deposited can be varied across the different positions/locations of the optical substrate 901 to achieve the desired light-blocking density gradients and area of mixtures of the first and second color-changing compositions 970, 980. Suitable printing processes that can apply the color-changing layer 990 as a singular monolithic layer include non-contact printing processes, such as inkjet drop-on-demand printing processes that utilize variable drop size printing processes performed with greyscale printheads. The color-changing layer 990 can be printed in a single printing pass.

In an alternative process, the pure fluidic carrier 995, the first color-changing composition 970, and the second color-changing composition 980 may be mixed into their desired ratio prior to being deposited on the optical substrate 901. For example, the pure fluidic carrier 995, the first color-changing composition 970, and the second color-changing composition 980 may be mixed in a mixing chamber of a printhead.

As best seen in FIG., 30, the first color-changing zone 910 that overlies the first optical region 904 has a first average ratio of the first color-changing material to the second color-changing material (which is 0:X in the exemplified embodiment). The second color-changing zone 912 that overlies the second optical region 905 has a second average ratio of the first color-changing material to the second color-changing material (which is X:0 in the exemplified embodiment). The first average ratio is different than the second average ratio. Additionally, within the third color-changing zone 912 that overlies the third optical region 906, the average ratio of the first color-changing material to the second color-changing material varies along the optical axis OA.

The color-changing layer 990 has a substantially uniform thickness across its entirety.

Figure 33:
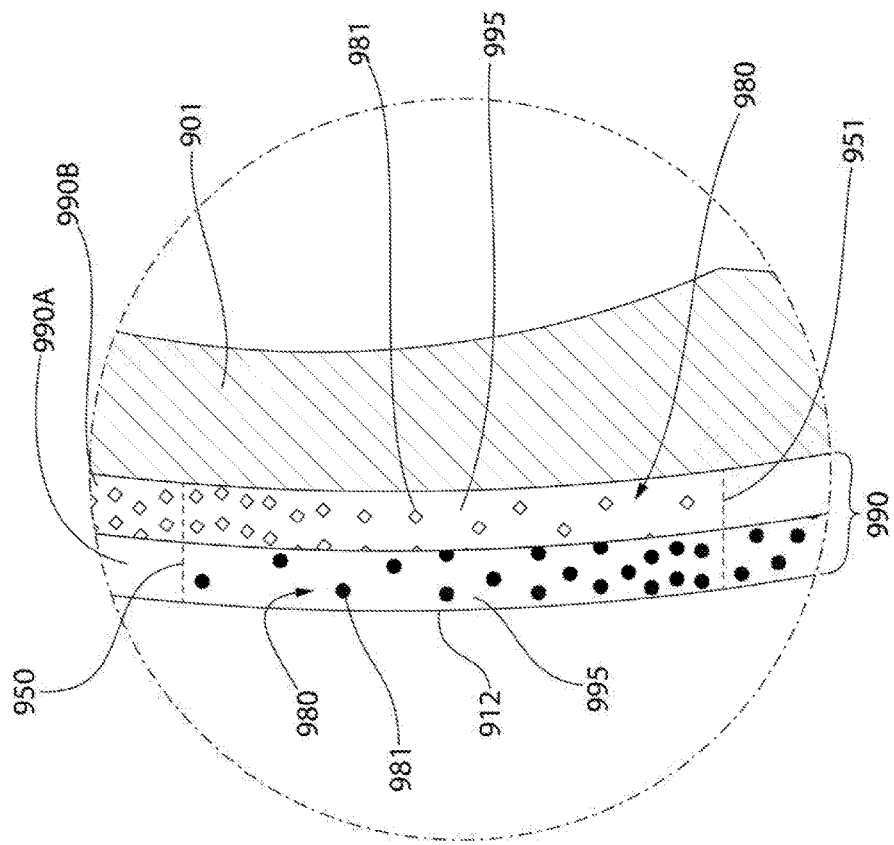
FIG. 33 is a close-up of area XXXIII of FIG. 32.
Figure 32:
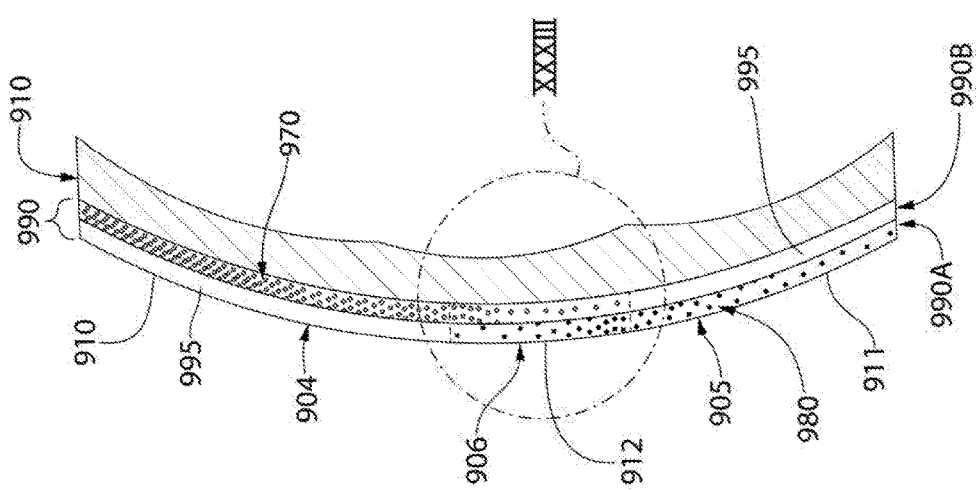
FIG. 32 is a cross-sectional schematic according to another embodiment of the ophthalmic lens of FIG. 29 wherein the light-blocking layer is formed as two distinct sublayers.

Referring now to FIGS. 29 and 32-33 concurrently, the optical article 900 will be discussed in which the color-changing layer 990 is formed as two separate sublayers 990A, 990B. All other aspects of the optical article 900 and the color-changing layer 990 are identical to that discussed above. Thus, in order to avoid redundancy only those specific differences brought about by the two separate sublayers 990A, 990B of the color-changing layer 990 will be discussed below with the understanding that all other details discussed above are applicable.

As can be seen in FIGS. 32-33, the color-changing layer 990 comprises a first sublayer 990A of the first color-changing composition 970 and a second sublayer 990B formed of the second color-changing composition 980. In the exemplified embodiment, the first and second sublayers 990A, 990B are on the same side of the optical substrate 901 and in contact with one another. In another embodiment, the first and second sublayers 990A, 990B are on opposite sides of the optical substrate 901. In another embodiment, the first and second sublayers 990A, 990B may be on the same side of the optical substrate 901 with one or more intervening layers positions therebetween.

In applying the color-changing layer 990 of this embodiment, the first sublayer 990A of the first color-changing composition 970 is applied to the optical substrate 901, such as by a printing process. As can be seen, the first sublayer 990A does not include the second color-changing composition 980. Once applied, the first sublayer 990A is allowed to dry, such as by a curing process. Once sufficiently dried, the second sublayer 990B is applied atop the first sublayer 990A. Because the first sublayer 990A has dried at this point, the first and second compositions 970, 980 do not mix but, rather, stay as distinct sublayers. While not illustrated, in one embodiment, the thickness of the first and second sublayers 990A, 990B may be varied, while at the same time the color-changing layer 990 maintains a constant thickness.

Referring now to FIG. 35, a pair of eyeglasses according to an embodiment of the present invention is shown. The eyeglasses include an eyeglass frame comprising a left eye rim that defines a left lens opening and a right eye rim that defines a right lens opening. The left and right rims are connected by a bridge. A temple arm extends from each of the left and right rims. As exemplified, first and second light-blocking lenses 675 of FIG. 20A are mounted within the left and right lens openings respectively. The near viewing region of each of the light-blocking lenses 675 is adjacent a bottom of it respective the eye rim. While the eyeglasses are having the light-blocking lens 675 of FIG. 20A mounted therein, in other embodiments, the eyeglasses can have any of the optical articles described in relation to FIGS. 1-34 mounted therein. When so mounted, the optical articles are arranged within the eyeglass frame such that they oriented within the lens opening such that bottoms of the optical articles (as shown in their respective drawings) are at the bottom of the lens openings.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A method of manufacturing a light-blocking lens comprising:
   a) selecting a lens blank having a front surface and a rear surface;
   b) printing a light-blocking composition on the front surface of the lens blank in a final lens zone of the lens blank and leaving at least a portion of a material removal zone of the lens blank free of the light-blocking composition; and
   c) edging the lens blank about a perimeter of the final lens zone to remove the material removal zone, thereby forming a light-blocking lens that is sized and shaped to match a lens opening of a frame of selected eyeglasses.

2. The method according to claim 1 wherein step a) further comprises selecting the lens blank based on an eyeglass prescription.

3. The method according to claim 2 wherein the eyeglass prescription contains vision-correction data, the method further comprising, subsequent to step a) but prior to step c):
   grinding one or more optical curves into a rear surface of the lens blank based on the vision correction data of the eyeglass prescription.

4. The method according to claim 2 wherein the eyeglass prescription contains light-blocking data, step b) further comprising:
   b-1) printing the light-blocking composition in the final lens zone in a predetermined pattern that is based on the light-blocking data of the eyeglass prescription.

5. The method according to claim 4 wherein the predetermined pattern comprises one or more light-blocking zones that are based on one or more optical regions formed by the grinding.

6. The method according to claim 5 further comprising:
   the predetermined pattern comprising a first light-blocking zone having a first average light-blocking density, a second light-blocking zone having a second average light-blocking density, and a third light-blocking zone having a third light-blocking density gradient;
   the grinding step comprising grinding the one or more optical curves into the rear surface of the lens blank to form a first optical region having a first average optical power, a second optical region having a second average optical power that is greater than the first average optical power, and a third optical region located between the first and second optical regions, the third optical region having an optical power gradient that transitions from the first average optical power toward the second average optical power, each of the first, second, and third optical regions located within the final lens zone; and
   the step b-1) comprising printing the light-blocking composition in the predetermined pattern in the final lens zone so that the first light-blocking zone overlies the first optical region, the second light-blocking zone overlies the second optical region, and the third light-blocking zone overlies the third optical region.

7. The method according to claim 1 wherein step b) further comprises:
   b-1) generating a virtual final lens zone on a computer device that corresponds to the final lens zone of the lens blank;
   b-2) generating a light-blocking map and associating the light-blocking map with the virtual final lens zone on the computer device; and
   b-3) printing the light-blocking composition on the front surface of the lens blank in accordance with the virtual final lens zone and the associated light-blocking map.

8. The method according to claim 7 wherein the step b-1) further comprises: generating: (i) a perimeter of the virtual final lens zone; (ii) a fitting point within the virtual final lens zone; and (iii) orientation indicators within the virtual final lens zone; and wherein the step b-2) further comprises generating the light-blocking map based on the fitting point and the orientation indicators.

9. The method according to claim 1 wherein step b) further comprises printing the light-blocking composition in the final lens zone and leaving a majority of the material removal zone of the front surface of the lens free of the light-blocking composition.

10. The method according to claim 8 wherein step b) further comprises printing the light-blocking composition only in the final lens zone and leaving substantially all of the material removal zone of the front surface of the lens free of the light-blocking composition.

11. The method according to claim 1 wherein the front surface of the lens blank is a contoured surface and the printing of step b) is a non-contact printing process.

12. The method according to claim 11 wherein the non-contact printing process is an inkjet drop-on-demand printing process.

13. The method according to claim 12 wherein the inkjet drop-on-demand printing process is a variable drop size printing process utilizing a greyscale printhead.

14. The method according to claim 1 wherein the light-blocking composition is a photochromic composition that is activated upon exposure to an actinic energy.

15. The method according to claim 1 wherein step b) comprises:
   b-1) printing a first light-blocking composition having a first light-blocking density onto the lens blank; and
   b-2) printing a second light-blocking composition having a second light-blocking density that is greater than the first light-blocking density onto the lens blank; and
   wherein the first and second light-blocking compositions are printed onto the lens blank to generate at least one light-blocking zone having a light-blocking density gradient.

16. The method according to claim 1 wherein step b) comprises printing a light-blocking layer on the front surface of the lens blank to cover both the final lens zone and the material removal zone, the light-blocking layer comprising the light-blocking composition in the final lens zone and being free of light-blocking composition in the portion of the material removal zone.

17. The method according to claim 16 wherein the light-blocking layer covers the entirety of the front surface of the lens blank and has a substantially constant thickness.

18. The method according claim 1 wherein steps a-c) are performed in the same optical laboratory.

* * * * *